US008099772B2

(12) United States Patent
Takada et al.

(10) Patent No.: US 8,099,772 B2
(45) Date of Patent: Jan. 17, 2012

(54) INFORMATION TERMINAL APPARATUS, INFORMATION PROCESSING APPARATUS AND INFORMATION COMMUNICATION SYSTEM

(75) Inventors: Masayuki Takada, Tokyo (JP);
Takayasu Muto, Kanagawa (JP)

(73) Assignee: Sony Corporation, Tokyo (JP)

( * ) Notice: Subject to any disclaimer, the term of this patent is extended or adjusted under 35 U.S.C. 154(b) by 70 days.

(21) Appl. No.: 12/128,473

(22) Filed: May 28, 2008

(65) Prior Publication Data

US 2008/0232586 A1 Sep. 25, 2008

Related U.S. Application Data

(62) Division of application No. 10/462,710, filed on Jun. 17, 2003.

(30) Foreign Application Priority Data

Jun. 26, 2002 (JP) ................................. 2002-185912
Aug. 12, 2002 (JP) ................................. 2002-234385

(51) Int. Cl.
*H04L 9/32* (2006.01)
*H04W 12/00* (2009.01)
*H04W 12/06* (2009.01)

(52) U.S. Cl. ....... 726/10; 726/5; 726/6; 726/7; 380/247; 380/248; 380/249; 380/250; 713/176; 713/180

(58) Field of Classification Search .................. 713/176, 713/180; 726/5, 6, 7, 10; 380/247–250
See application file for complete search history.

(56) References Cited

U.S. PATENT DOCUMENTS 5,640,452 A * 6/1997 Murphy ......................... 380/258
5,754,657 A * 5/1998 Schipper et al. ............... 380/258
(Continued)

FOREIGN PATENT DOCUMENTS

JP 9-163007 A 6/1997
(Continued)

OTHER PUBLICATIONS

Kazuhiko Yamamoto, "Security for prevention in advance (16) PGP (2)", Unix Magazine, ASCII Co., Ltd, Aug. 1, 1995,vol. 10, No. 8, pp. 76-86.

(Continued)

*Primary Examiner* — Eleni Shiferaw
*Assistant Examiner* — Tamara Teslovich
(74) *Attorney, Agent, or Firm* — Oblon, Spivak, McClelland, Maier & Neustadt, L.L.P.

(57) ABSTRACT

When transmitting position/time information calculated by means of a GPS function to a server apparatus, authentication is carried out with the server apparatus. The position/time information may be certified as legitimate measured by a portable apparatus with a GPS reception function employed by a user. When transmitting information related to the position and the time acquired from a portable phone terminal having the GPS function and a network function by means of the GPS function to the server apparatus, authentication is carried out between the portable phone terminal and the server apparatus. The position/time information is transmitted to the server apparatus, only if the server apparatus is authenticated as a legitimate counterpart for connection. A secret key holding section is provided for holding different secret keys for different apparatuses. The position/time information measured based on an electromagnetic wave received from a positioning satellite is digitally signed by means of the secret key. The identification information and the position/time information having the digital signature are then transmitted to a counterpart.

21 Claims, 45 Drawing Sheets

U.S. PATENT DOCUMENTS

| | | | | |
|---|---|---|---|---|
| 5,757,916 A | * | 5/1998 | MacDoran et al. | 380/258 |
| 5,799,082 A | * | 8/1998 | Murphy et al. | 713/179 |
| 5,898,680 A | * | 4/1999 | Johnstone et al. | 370/316 |
| 5,987,136 A | * | 11/1999 | Schipper et al. | 713/176 |
| 6,903,681 B2 | * | 6/2005 | Faris et al. | 342/357.06 |
| 6,961,541 B2 | * | 11/2005 | Overy et al. | 455/41.2 |
| 6,985,588 B1 | * | 1/2006 | Glick et al. | 380/258 |
| 7,092,943 B2 | * | 8/2006 | Roese et al. | 707/9 |
| 7,120,254 B2 | * | 10/2006 | Glick et al. | 380/258 |
| 7,295,119 B2 | * | 11/2007 | Rappaport et al. | 340/572.4 |
| 7,313,825 B2 | * | 12/2007 | Redlich et al. | 726/27 |
| 7,448,087 B2 | * | 11/2008 | Ohmori et al. | 726/27 |

FOREIGN PATENT DOCUMENTS

| | | |
|---|---|---|
| JP | 10-170625 | 6/1998 |
| JP | 10-341470 | 12/1998 |
| JP | 11-326488 | 11/1999 |
| JP | 2000-004482 | 1/2000 |
| JP | 2000-123027 | 4/2000 |
| JP | 2000-156882 | 6/2000 |
| JP | 2000-163379 | 6/2000 |
| JP | 2000-298630 | 10/2000 |
| JP | 2001-014592 | 1/2001 |
| JP | 2001-103003 | 4/2001 |
| JP | 2001-148742 | 5/2001 |
| JP | 2001-177863 | 6/2001 |
| JP | 2001-238274 | 8/2001 |
| JP | 2002-051373 | 2/2002 |
| JP | 2002-101467 | 4/2002 |
| JP | 2002-117491 | 4/2002 |
| JP | 2002-207895 | 7/2002 |
| WO | WO 00/50974 | 8/2000 |

OTHER PUBLICATIONS

Matthias Kabatnik, et al., "Location Stamps for Digital Signatures: A New Service for Mobile Telephone Networks", ICN2001, LNCS 2094, 2001 pp. 20-30 (plus cover page).

Office Action issued Apr. 6, 2010, in Japanese Patent Application Publication No. 2002-234385, filed Feb. 9, 2001.

Japanese Office Action issued on Jun. 28, 2011 in corresponding Japanese Application No. 2008-335481 (with an English Translation).

* cited by examiner

F I G. 23
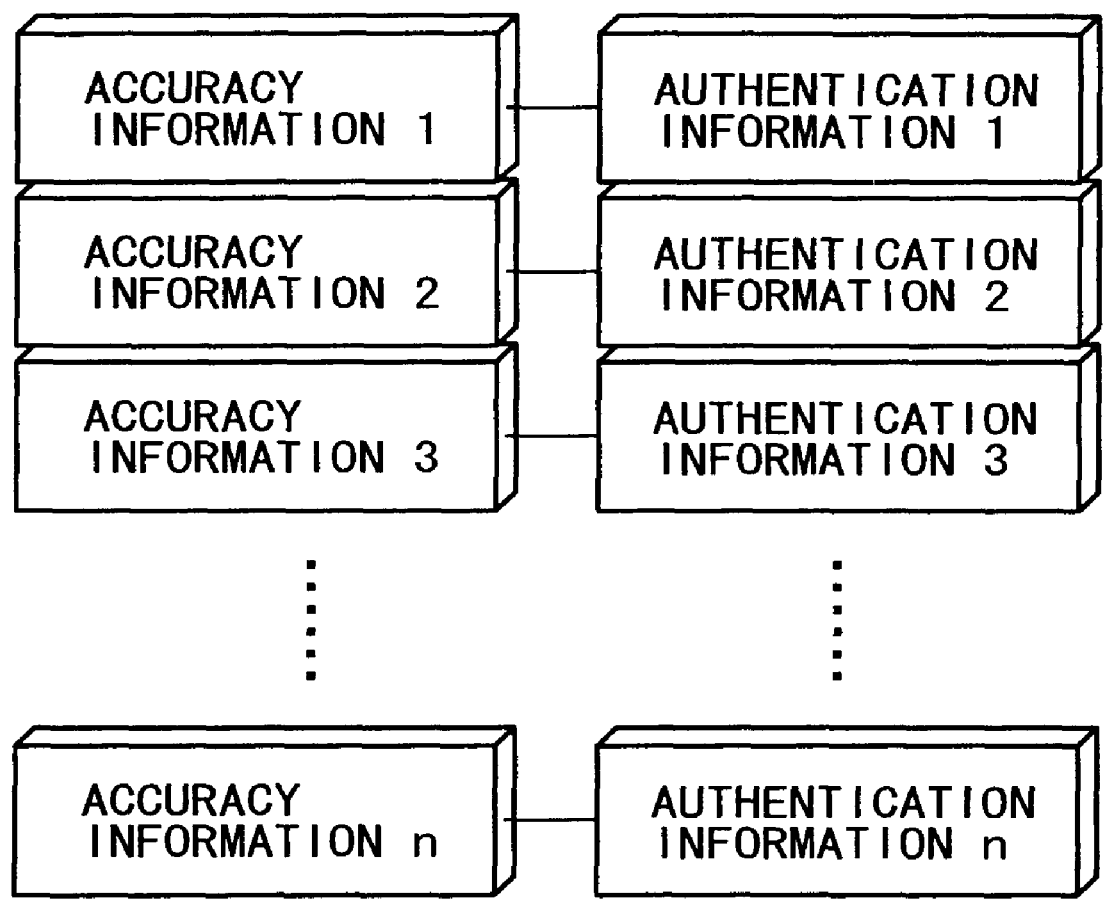

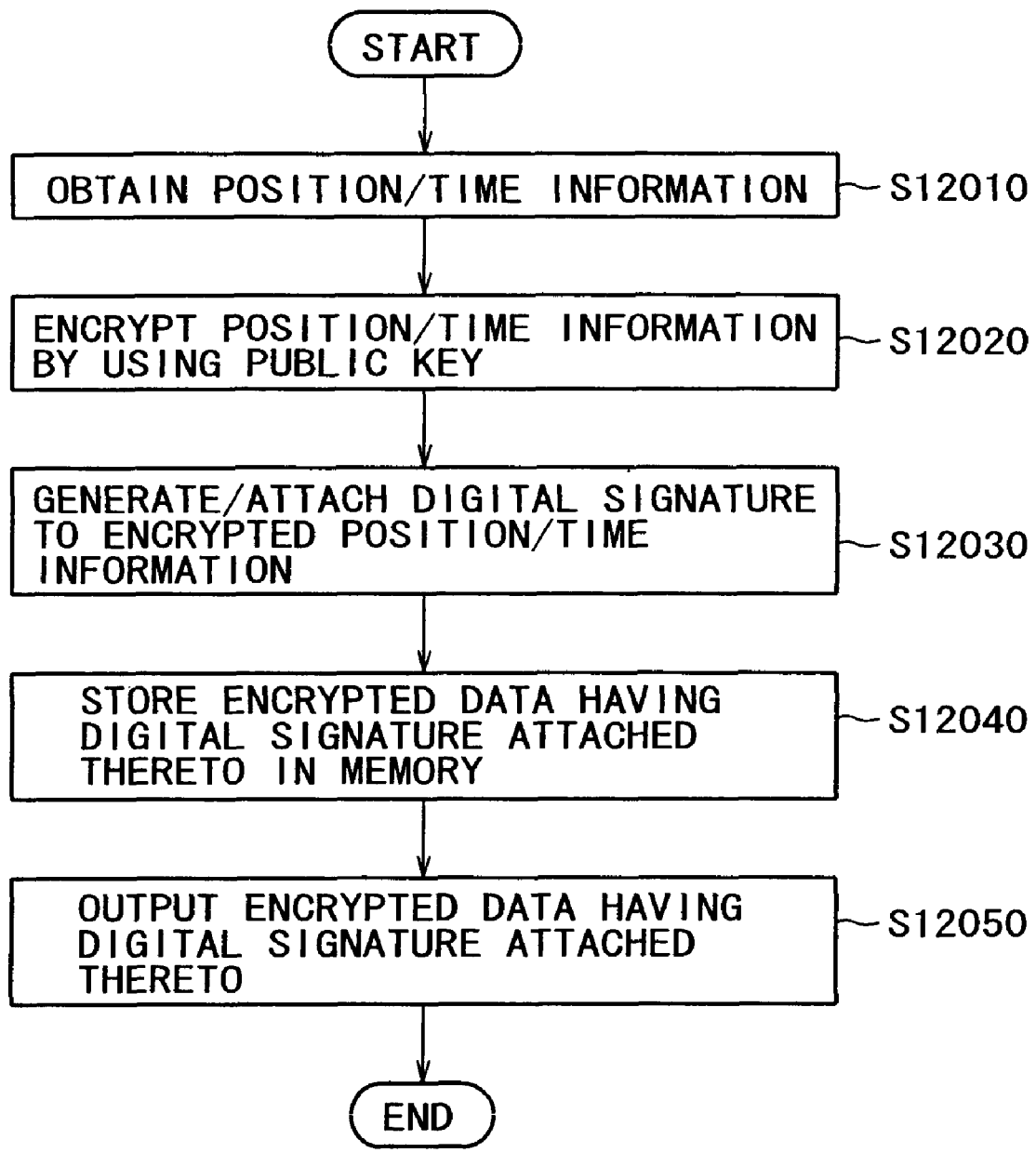

INFORMATION TERMINAL APPARATUS, INFORMATION PROCESSING APPARATUS AND INFORMATION COMMUNICATION SYSTEM

CROSS REFERENCE TO RELATED APPLICATIONS

The present application is a divisional of U.S. Ser. No. 10/462,710, filed Jun. 17, 2003 which is based on Japanese Priority Applications JP2002-185912, filed in the Japanese Patent Office on Jun. 26, 2002 and JP2002-234385, filed in the Japanese Patent Office on Aug. 12, 2002, the entire contents of which being incorporated herein by reference to the extent permitted by law.

BACKGROUND OF THE INVENTION

1. Field of the Invention

The present invention relates to an information terminal apparatus for receiving a satellite signal transmitted from an artificial satellite constituting a global navigation system, and further relates to an information processing apparatus and an information communication system that inquire such an information terminal apparatus for position and time information with respect to current position and/or current time.

2. Description of the Related Art

In recent times, a GNSS (Global navigation system) has become common for determining a position of moving object on the ground, utilizing artificial satellites orbiting around the earth. Typical global navigation systems are GPS (Global Positioning System) constructed by the United States of America, GLONASS Global navigation system constructed by the former Soviet Union, and GALILEO, which is being constructed mainly by European countries.

In the global navigation systems, when determining current position, signals are received from at least four satellites by means of a receiver installed on the moving object. On acquiring orbit information of each satellite by demodulating a signal from each satellite, a three-dimensional position and an accurate current time of the moving object are calculated, by means of simultaneous equations, based on the orbit information and time information of each satellite and a delay time of the received signal. The global navigation systems are widely used such that the receiver having a function of determining the current position and the current time as mentioned above (hereafter referred to as GPS function) is installed in a variety of vehicles and airplanes so as to guide routes and detect the current position of vehicles and airplanes. Also, portable positioning apparatus or devices having the GPS function installed therein have been conventionally used.

On the other hand, in recent years, the size and power consumption of a receiver, for example, has been reduced and therefore the GPS function is now being installed in a variety of information terminal apparatuses. Particularly, among portable phones (or a so-called cellular phones), which have become fast sophisticated and multifunctional, those having the GPS function have become remarkably popular.

It is typical that in addition to a basic call function and the GPS function such a portable phone has a network function allowing a variety of information communications with another information processing apparatus through a communication network such as the Internet. The information with respect to the current position acquired by means of the GPS function is communicated between the portable phone and another information processing apparatus by means of a network function so as to receive benefits from services related to the current position.

An example of such services to mantion may be a map display service where information related to the current position acquired by means of the portable phone having the GPS function is transmitted to a server apparatus via the communication network and a map data near and related to the current position is acquired from the server apparatus so as to display the data on a display screen. In a similar way, information may be communicated between the portable phone and the server apparatus so as to enjoy such services. Other examples are a navigation service for displaying a route from the current position to destination, a mail transmission service for sending, by email, information related to the current position to another portable phone or a computer apparatus, a peripheral information display service for displaying information related to different stores located in the peripheral areas about the current position, etc.

Further, considering that the communication network has become wider in bandwidth and reduced in cost, not only to the portable phone as mentioned above but also to a variety of information terminal apparatuses as represented by PDAs (Personal Digital Assistants) and small and light personal computer apparatuses, it is expected that a variety of services related to the current position will be more widely provided in conjunction with the GPS function and the network function.

In addition to the services, it has been considered that a network service system where moving people are to carry portable phones through which position/time information of the people is collected to manage the current positions of the moving people so as to be provided with their positions and indications corresponding to the current position and time.

SUMMARY OF THE INVENTION

In recent years, increasingly sophisticated and downsized information terminal apparatuses having are often utilized in close proximity with their owners (users) as it can be seen that the portable phones tend to be carried around wherever their owner goes. As a result, the current position of the information terminal apparatus may be considered as the current position of the user himself/herself.

Accordingly, the current position and the current time acquired by means of the GPS function provided in the information terminal apparatus are information data for specifying where and when the user was. The current position acquired by means of the GPS function is calculated very precisely with accuracy of the order of tens of meters to a few meters. Based on the current position, it is not difficult to specify in which store the user is or where in a building the user is at a particular time or further to assume what the user is doing. Therefore the information related to the current position and the current time acquired by means of the GPS function is information to specify the user's activity and has a characteristic as very important individual, personal information for the user.

However, in a conventional service employing the portable phone having the GPS function, the information related to the current position calculated at the particular time is transmitted/received via the communication network without any particular protection. Therefore the information may be read by a third party who is not targeted by the user, so that the personal information of the user may leak in this sense.

Taking a service utilizing the portable phone having the GPS function as an example, until a communication route is established between the portable phone and a base station or the server apparatus, communication of identification information for specifying the portable phone or the user is carried out. However, once the communication route is established, position information is transmitted/received similarly to other miscellaneous data. Further, when the position information is communicated via an open communication network that is employed by general public users, such as the Internet, there is high risk that a third party may leak the position information.

In addition, in network services and network systems, it is important that the position/time information sent from a portable apparatus be legitimate data sent from the portable apparatus. If it is not the case, there is a problem in that information communication may not be carried out as targeted by an information provider or a manager.

However, in a conventional collection method of collecting position/time information from the user of the portable apparatus, the transmitted position/time information cannot be determined whether it is really legitimate information measured by the portable apparatus with a GPS reception function used by the user.

For instance, there has been no means to detect that a position/time information sent from an apparatus other than the portable apparatus with the GPS reception function differs from the actual position/time information thereof if the apparatus sent the information as if position/time information were sent by the portable apparatus with the GPS reception function.

Conversely, even though the position/time information is really the legitimate information measured by the portable apparatus with the GPS reception function used by the user, conventionally there is no means to verify the legitimacy.

In view of the above, the present invention has been conceived and seeks to provide an information terminal apparatus for preventing information related to the current position and the current time calculated by means of the global navigation system, that is position/time information, from being leaked to a third party who is not targeted by a user, and allowing the position/time information to be safely and reliably communicated between an information processing apparatus and the information terminal apparatus through a communication network. Further, the present invention seeks to provide an information processing apparatus and an information communication system for inquiring such an information terminal apparatus on the position/time information. In addition, the present invention has been conceived in order to provide an information processing apparatus which employs information related to the current position and the current time calculated by means of the global navigation system and information related to the information processing apparatus authenticated with respect to its connection so as to carry out an entirely novel encryption process.

An information terminal apparatus according to a first preferred embodiment of the present invention includes a reception means for receiving a satellite signal transmitted from an artificial satellite constituting a global navigation system, a communication means for transmitting/receiving a variety of information data to/from an information processing apparatus via a communication network, and an authentication means for authenticating by determining whether the information processing apparatus is a legitimate counterpart for connection according to authentication information transmitted/received by the communication means so as to allow the communication means to transmit position/time information related to its own current position and/or current time calculated from the satellite signal only if authenticated as a legitimate counterpart for connection.

When the thus constituted information terminal apparatus tries to transmit the position/time information to the information processing apparatus, the transmission of the position/time information is permitted only if the authentication means authenticates that the information processing apparatus is a legitimate counterpart for connection. Therefore, even when the transmission of the position/time information is requested by a third party who is not targeted by a user, the transmission can be reliably avoided by the authentication means so that the position/time information which may be personal information to specify the user's activity may be prevented from leaking to the third party who is against the user's intention.

In addition to the structure like the first preferred embodiment of the present invention, in an information terminal apparatus according to a second preferred embodiment of the present invention, the communication means transmits information used for calculation of an own current position and/or current time included in the satellite signal, through the information processing apparatus, as the position/time information. In the above structure, not the information directly indicating the current position or the current time of the information terminal apparatus calculated from the satellite signals, but the information to be needed to calculate the current position or the current time out of information data included in the satellite signals is transmitted as the position/time information from the information terminal apparatus to the information processing apparatus. According to the structure, the current position or the current time is not calculated from the satellite signals on the information terminal apparatus side but may be calculated on the information processing apparatus side so that it is not necessary for the information terminal apparatus side to be provided with computation capability needed for calculating the current position and the current time, thereby reducing a circuit scale and power consumption for an operation circuit installed in the information terminal apparatus. As for this case, when it is necessary to display the current position and the current time which are acquired from the satellite signal on the information terminal apparatus side, it is enough only to acquire the current position and the current time calculated on the information processing apparatus side via a communication network.

In addition to the structure of the first preferred embodiment of the present invention, an information terminal apparatus according to a third preferred embodiment of the present invention further comprises a calculation means for calculation of an own current position and/or current time according to the satellite signals, and the communication means transmits information indicative of its own current position and/or current time calculated by the calculation means as the position/time information. By providing such structure, the information terminal apparatus may calculate the current position and the current time from the satellite signals by the calculation means. Therefore, even when the information terminal apparatus is not connected to the information processing apparatus, the information terminal apparatus may employ information such as the current position calculated from the satellite signals by displaying the current position on a display section, for example. Further, even when the current position is continuously displayed, it is not necessary to maintain the connection with the information processing apparatus.

In addition to the structure of the first preferred embodiment of the present invention, an information terminal apparatus according to a fourth preferred embodiment of the present invention further comprises a calculation means for calculation of an own current position and/or current time according to the satellite signals, still further having a condition determination means for determining whether its own current position and/or current time calculated by the calculation means matches a predetermined condition with respect to the position and/or the time, and the communication means transmits, to the information processing apparatus, the result of determination by the condition determination means as the position/time information. In this structure, only the result of determination indicating whether the current position and the current time calculated from the satellite signals are in conformity with the predetermined condition is transmitted to the information processing apparatus as the position/time information with respect to own current position and/or current time. As for this case, not the direct and precise information indicative of the current position and the current time but only the result of determination is transmitted to the information processing apparatus, to thereby improve the confidentiality of the personal information specifying the user's activity.

Information related to the "condition" used for the determination by the condition determination means may be acquired by the communication means from the information processing apparatus by providing an information terminal apparatus according to a fifth preferred embodiment, or may be stored beforehand in a variety of memory apparatuses such as RAM (Random Access Memory), ROM (Read Only Memory) provided in an information terminal apparatus according to a sixth preferred embodiment. Since the condition used for the determination may be acquired from the information processing apparatus, the determination may be carried out for a variety of conditions according to a situation, thus reducing a storage area necessary for holding the condition. On the other hand, the condition used for the determination may be stored in a storage means provided for the information terminal apparatus so that it is not necessary to acquire a condition from the information processing apparatus each time the current position or time is updated, thereby continuously carrying out a process of determining whether the condition is satisfied even when it is not connected to the information processing apparatus.

In addition to the structure of the sixth preferred embodiment of the present invention, in the information terminal apparatus according to the fifth preferred embodiment of the present invention, the storage means has stored information therein related to the information processing apparatus for connection according to the condition, the communication means transmits the result of determination by the condition determination means to the information processing apparatus corresponding to the satisfied condition. In the above structure, the result of determination is transmitted to the information processing apparatus corresponding to the satisfied condition, and services from the information processing apparatus with respect to the current position and the current time are selectively employed to thereby facilitate providing flexible and diversified information data to the user.

In addition to the first preferred embodiment of the present invention, the information terminal apparatus according to the sixth embodiment of the present invention further includes an accuracy changing means for changing accuracy of the current position and/or the current time included in the position/time information according to a request from a user or according to the information processing apparatus for connection. In the above structure, precise information related to the current position and the current time is transmitted to a particular counterpart for connection, for example. On the other hand, intentionally degraded information may be transmitted to another counterpart for connection, to thereby avoid transmitting unnecessarily accurate information related to a position and time as personal information specifying the user's activity.

In addition to the structure of the first preferred embodiment of the present invention, in the information terminal apparatus according to the seventh preferred embodiment of the present invention, the communication means acquires identification information for identifying each information processing apparatus from the information processing apparatus as the authentication information, and the authentication means notifies the user of the authentication information, and determines that the information processing apparatus is a legitimate counterpart for connection when the user inputs information identifying that the information processing apparatus is the legitimate counterpart. In the above structure, the information terminal apparatus may ask (inquire) the user whether the position/time information can be transmitted without any trouble to the information processing apparatus so that the position/time information may be selectively transmitted according to the user's choice.

In addition to the structure of the first preferred embodiment of the present invention, in an information terminal apparatus according to a ninth preferred embodiment of the present invention, the communication means acquires data string information including a predetermined data string from the information processing apparatus, and the authentication means determines that the information processing apparatus is a legitimate counterpart for connection when the data string information acquired by the communication means matches predetermined data string information. This structure provides authentication by determining whether the data string information acquired from the information processing apparatus as authentication information matches the predetermined data string information, or authentication of a so-called password system is carried out. According to this structure, authentication is performed and a most primitive and simple method and therefore does not need high computation capability when performing the authentication so as to realize the simple method of a considerable high speed. The data string information may include not only a character string indicating a group of consecutive characters including the alphabet, numerals, HIRAGANA (a set of Japanese syllabary characters), KATAKANA (another set of Japanese syllabary characters), Chinese characters, etc., but also binary data.

In addition to the first preferred embodiment of the present invention, an information terminal apparatus according to a tenth preferred embodiment of the present invention further includes an encryption means for encrypting and/or decrypting, by means of a predetermined encryption system, a variety of information data transmitted/received by the communication means. In the above structure, a variety of information data including the authentication information communicated between the information terminal apparatus and the information processing apparatus may be encrypted, to thereby prevent the variety of information data from leaking to the third party who is not targeted by a user.

In the structure of an eleventh preferred embodiment of the present invention, the encryption means may generate a key based on the position/time information and encrypt and/or decrypt the variety of information data by means of the key. Information related to a procedure for generating the key from the position/time information may be stored within a predetermined information terminal apparatus, or acquired from the information processing apparatus when generating the key. In the above structure, information which may be decrypted only at a predetermined location and at a predetermined time may be transmitted/received to/from the information processing apparatus, to thereby prevent the position/time information to be the user's personal information from leaking and provide flexible and diversified services.

When encrypting the information communicated between the information terminal apparatus and the information processing apparatus, the structure of an information terminal apparatus according to a thirteenth preferred embodiment of the present invention may be adopted so as to employ a common key encryption system using a common key, or the structure of an information terminal apparatus according to a fifteenth preferred embodiment of the present invention may be adopted so as to employ a public key encryption system using a public key and a secret key. When employing the common key encryption system, an encryption/decryption procedure is relatively simple so that a simple and small operation circuit may perform an encryption process and a decrypting process for communication information at considerably high speed. When employing the public key encryption system, although it needs a process which requires more complicated calculation compared with the common key encryption system, a more secure encryption may be applied to the communicated information.

In addition to the structure of the thirteenth preferred embodiment of the present invention, in an information terminal apparatus according to a twelfth preferred embodiment of the present invention, the authentication means utilizes the common key and communicates predetermined authentication information to the information processing apparatus so as to perform authentication. In particular, random numbers are generated on the information terminal apparatus side, for example. After encrypting the random numbers by means of the common key on the information processing apparatus side, then they are returned to the information terminal apparatus side. When the random numbers decrypted by means of the common key on the information terminal apparatus side are in conformity with the original random numbers, an authentication procedure such as authenticating the information processing apparatus as a legitimate counterpart is carried out. In this way, authentication information used for authenticating (in this example of preferred embodiment of the present invention, the random numbers correspond to the authentication information) is encrypted to prevent a third party who is not targeted by a user from "spoofing", so as to carry out authentication more reliably.

In addition to the structure of the fifteenth preferred embodiment of the present invention, in the information terminal apparatus according to a thirteenth embodiment of the present invention, the authentication means utilizes the public key system and communicates an electronic signature to the information processing apparatus so as to perform authentication. As to the public key encryption system, each counterpart for connection generally has each secret key so that, on performing authentication, an information processing apparatus for connection may be specified as a result of communication of the electronic signature. The public key of the counterpart needed when performing authentication, may be stored beforehand in the information terminal apparatus, or externally acquired as needed, via the communication network.

In addition to the structure of the first preferred embodiment of the present invention, in the information terminal apparatus according to a fourteenth embodiment of the present invention, only if the information processing apparatus is authenticated that it is a legitimate counterpart for connection, the authentication means allows the communication means to acquire assist information used for capturing the satellite signals. In the above structure, only if the authentication is legitimately performed, the assist information is acquired from the information processing apparatus so that the assist information may be prevented from leaking to a third party who is not targeted by a user, thus reducing a possibility that the current position of the user may be assumed based on the assist information.

The information terminal apparatus according to the fifteenth preferred embodiment of the present invention includes a position/time calculation means for receiving a satellite signal transmitted from an artificial satellite constituting a global navigation system so as to calculate its own current position and/or current time from the satellite signal, a communication means for transmitting/receiving a variety of information data to/from an information processing apparatus via the communication network, an authentication means for authenticating by determining whether the information processing apparatus is a legitimate counterpart for connection according to authentication information transmitted/received by the communication means, and an encryption means for generating a key based on information related to the information processing apparatus authenticated by the authentication means and current position and/or time information calculated by the position/time calculation means so as to encrypt and/or decrypt a variety of information data transmitted/received by the communication means.

The thus constituted information terminal apparatus may perform the encryption process by means of the key generated based on the current position and the current time calculated from the satellite signals and the information related to the information processing apparatus which has been authenticated for its connection. Therefore, when a legitimate connection with the information processing apparatus is established, only if the information terminal apparatus exists at a predetermined location or, only if it is at a predetermined time, or only if it is at the predetermined location and at the predetermined time, encryption and decryption of the information may be performed, which allows an entirely new encryption process.

The information terminal apparatus according to the sixteenth preferred embodiment of the present invention includes a communication means for transmitting/receiving a variety of information data through a communication network to/from an information processing apparatus which receives a satellite signal transmitted from an artificial satellite constituting a global navigation system, and an authentication means for authenticating that the information terminal apparatus has rights to acquire the position/time information by communicating authentication information to the information terminal apparatus by the communication means when acquiring, by the communication means, position/time information related to a current position and/or a current time, calculated from the satellite signal, of the information terminal apparatus.

The thus constituted information processing apparatus has a structure in which authentication between the information terminal apparatus and the information processing apparatus is carried out when the position/time information is acquired from the information terminal apparatus. Therefore even when the authentication is requested by the information terminal apparatus in order to prevent the position/time information from being transmitted to the third party that is not targeted by a user, the position/time information may be acquired by performing the authentication properly.

In addition to the structure of the nineteenth preferred embodiment of the present invention, an information processing apparatus according to a seventeenth preferred embodiment of the present invention further comprises a calculation means for calculating a current position of the information terminal apparatus. By providing the structure, the information terminal apparatus does not calculate the current position or the current time from the satellite signal but the information processing apparatus may calculate it so that it is not necessary to have a computation capability necessary for calculating the current position and the current time on the information terminal apparatus side. In this case, the position/time information communicated between the information terminal apparatus and the information processing apparatus does not directly indicate the current position or the current time but it is original information for calculating the current position and the current time, so that it may be rendered difficult to specify the position or the time if the position/time information is intercepted by the third party who is not targeted by a user.

In addition to the structure of the nineteenth preferred embodiment of the present invention, an information processing apparatus according to an eighteenth preferred embodiment of the present invention further comprises an encryption means for encrypting and/or decrypting, by means of a predetermined encryption system, a variety of information data transmitted/received by the communication means. In the above structure, a variety of information data including the authentication information communicated between the information terminal apparatus and the information processing apparatus may be encrypted, to thereby prevent the variety of information data from leaking to the third party who is not targeted by a user.

In addition to the structure of a twentieth preferred embodiment of the present invention, in the information processing apparatus according to the nineteenth preferred embodiment of the present invention, the communication means transmits/receives a variety of information data to/from another information processing apparatus interconnected via the communication network, and the authentication means determines whether the another information processing apparatus is a legitimate counterpart for connection according to authentication information transmitted/received to/from the another information processing apparatus when inquired by the another information processing apparatus for a position of the information terminal apparatus at a predetermined time, and allows the communication means to transmit the information related to the position of the information terminal apparatus only if such another information processing apparatus is authenticated as a legitimate counterpart for connection. In this structure, a counterpart to which the position/time information is transmitted from the information terminal apparatus is limited to a predetermined information processing apparatus. Other information processing apparatuses inquire the predetermined information processing apparatus for the position/time information of a portable terminal apparatus. By providing the above structure, while the number of targets to be authenticated by the information terminal apparatus is limited to the minimum, the predetermined information processing apparatus performs a relay process so as to respond to inquiries from many information processing apparatuses. Accordingly, it is not necessary for the information terminal apparatus to perform authentication for each of many counterparts for connection, thereby simplifying a procedure necessary for authentication and considerably reducing a possibility that the position/time information or the like may leak between the information terminal apparatus and the information processing apparatus.

In the information communication system according to the twentieth preferred embodiment of the present invention, the information terminal apparatus is connected to the information processing apparatus via the communication network, the information terminal apparatus receives the satellite signal transmitted from the artificial satellite constituting the global navigation system, and the information processing apparatus inquires the information terminal apparatus on the position/time information related to the current position and/or the current time, calculated from the satellite signal, of the information terminal apparatus. The authentication information is communicated between the information terminal apparatus and the information processing apparatus so as to perform authentication. Only if the information processing apparatus is authenticated as a legitimate counterpart for connection, transmission of the position/time information is permitted from the information terminal apparatus to the information processing apparatus.

When the thus constituted information communication system tries to communicate the position/time information between the information terminal apparatus and the information processing apparatus, the transmission of the position/time information is permitted only if the authentication means authenticates that the information processing apparatus is a legitimate counterpart for connection. Therefore, the position/time information may be prevented from being transmitted to the third party who is not targeted by the user, for example.

In addition, a portable apparatus according to a twenty first preferred embodiment includes: a secret key holding section for holding different secret keys for different apparatuses, an identification information holding section for holding identification information of the apparatus or identification information of a user of the apparatus, a digital signature means for digitally signing position/time information measured based on an electromagnetic wave received from a positioning satellite, the position/time information indicating the position where and the time when the electromagnetic wave is received, by means of the secret key held in the secret key holding section, and a communication means for transmitting, to a communication counterpart, the identification information held in the identification information holding section and the position/time information having the digital signature attached thereto.

According to the above construction of the twenty-first preferred embodiment, the digital signature is carried out by means of the secret key secretly held in the portable apparatus and the position/time information having the digital signature attached thereto is sent to the communication counterpart.

Based on the identification information sent from the portable apparatus via the communication means, the communication counterpart acquires the public key corresponding to the identification information for verifying the digital signature. Then, by means of the acquired public key, the digital signature attached to the position/time information sent from the portable apparatus through the communication means is verified. As a result of the verification, the communication counterpart may acknowledge that the position/time information is legitimate when the verification is completed or that the position/time information has been altered and is illegitimate when the verification is not completed.

As for a twenty-second preferred embodiment of the invention, a portable apparatus includes a public key holding section for holding a public key of a communication counterpart to be notified of the position/time information, and an encryption means for encrypting the position/time information by means of the public key of the communication counterpart, the public key being held in the public key holding section, prior to the digital signature.

According to the twenty-second preferred embodiment of the present invention, the position/time information is encrypted by means of the public key of the counterpart to be notified of the position/time information, prior to the digital signature. Thus, the communication counterpart verifies the digital signature attached to the encrypted position/time information sent from the portable apparatus via the communication means so as to determine whether the encrypted position/time information is legitimate information or illegitimate information.

In the case of the twenty-second preferred embodiment of the present invention, the encrypted position/time information may be decrypted if the public key used for the encryption corresponds to the communication counterpart, however, if it is a public key corresponding to another person, the encryption can not be decrypted so that the position/time information is kept secret. When the person provides a third person to be notified of the position/time information with the encrypted position/time information, the third person decrypts the encrypted position/time information by means of his or her secret key.

Therefore, in the case of the twenty-second preferred embodiment of the present invention, only specified counterparts are conveniently provided with position/time information.

As for a twenty-third preferred embodiment of the present invention, an electronic apparatus as described in the first preferred embodiment of the present invention includes a public key holding section for holding a public key of the communication counterpart, and an encryption means for encrypting the position/time information having the digital signature attached thereto by means of the public key of the communication counterpart held in the public key holding section, the digital signature being generated by the digital signature means.

In the case of the twenty-third preferred embodiment of the present invention, the information to be sent to the communication counterpart is encrypted by means of the public key of the communication counterpart. Therefore, the communication counterpart firstly decrypts the received information by means of a secret key. If it is decrypted successfully, the information is considered to be sent to the communication counterpart.

Based on the identification information sent from the portable apparatus via the communication means, the communication counterpart acquires the public key corresponding to the identification information for verifying the digital signature. Then, by means of the acquired public key, the digital signature attached to the position/time information sent from the portable apparatus through the communication means is verified. As a result of the verification, the communication counterpart may acknowledge that the position/time information is legitimate when the verification is completed or that the position/time information has been altered and is illegitimate when the verification is not completed.

In the case of the twenty-third preferred embodiment of the present invention, when communicating from the portable apparatus to the communication counterpart, even if communication data is intercepted, the information is kept secret because is encrypted.

A twenty-fourth preferred embodiment of the present invention includes a secret key holding section for holding different secret keys for different apparatuses, an identification information holding section for holding identification information of the apparatus or identification information of a user of the apparatus, a digital signature means for digitally signing position/time information measured based on an electromagnetic wave received from a positioning satellite, the position/time information indicating the position where and the time when the electromagnetic wave is received, by means of the secret key held in the secret key holding section, and a storage means for storing the position/time information having the digital signature attached thereto so as to be read externally.

As for the twenty-fourth preferred embodiment of the present invention, the position/time information having the digital signature attached thereto is stored in the storage section so as to be externally read so that the stored data may be read as needed. The read information is verified for the digital signature, to thereby determine whether the position/time information is legitimate information.

When the information terminal apparatus according to the present invention tries to transmit the position/time information to the information processing apparatus, the transmission of the position/time information is permitted only if the authentication means authenticates that the information processing apparatus is a legitimate counterpart for connection. Therefore, the position/time information may be reliably prevented if it is requested to transmit to the third party who is not targeted by the user, for example, so that the position/time information which may be personal information to specify the user's activity may be prevented by the authentication means from leaking to the third party who is against the user's intention.

The information terminal apparatus according to the preferred embodiments of the present invention may perform the encryption process by means of the key generated based on the current position and the current time calculated from the satellite signals and the information related to the information processing apparatus which has been authenticated when being connected. Therefore, when a legitimate connection with the information processing apparatus is established, only if the information terminal apparatus exists at a predetermined location or, only if it is at a predetermined time, or only if it is at the predetermined location and at the predetermined time, encryption and decryption of the information may be performed, which is an entirely novel encryption process. Accordingly, the information processing apparatus may provide an entirely new service by means of such an information terminal apparatus.

The information processing apparatus according to the present invention has a structure in which authentication between the information terminal apparatus and the information processing apparatus is carried out when acquiring the position/time information from the information terminal apparatus. Therefore even when the authentication is requested by the information terminal apparatus in order to prevent the position/time information from being transmitted to a third party that is not targeted by a user, the position/time information may be acquired by performing the authentication properly.

When the information communication system according to the preferred embodiments of the present invention tries to communicate the position/time information between the information terminal apparatus and the information processing apparatus, the transmission of the position/time information is permitted only if the authentication means authenticates that the information processing apparatus is a legitimate counterpart for connection. Therefore, the position/time information may be prevented from, for example, being transmitted to the third party who is not targeted by the user.

According to the preferred embodiments of the present invention, information related to the current position and the current time calculated by means of the global navigation system that is the position/time information may be prevented from being leaked to a third party who is not targeted by a user and the position/time information may be safely and reliably communicated between the information terminal apparatus and the information processing apparatus through the communication network. Therefore a variety of services employing the position/time information may be safely realized with preventing the personal information from leaking to outside.

As described above, according to the preferred embodiments of present invention, the portable apparatus attaches the digital signature to the position/time information so that position/time information altered by another portable apparatus may be detected by verifying the digital signature so as to prevent the position/time information from being altered.

Further, the digital signature may increase a degree of legitimacy of the position/time information.

Still further, the position/time information may be encrypted by means of the public key of the particular counterpart, so that the position/time information may be kept secret except for the particular, legitimate counterpart.

BRIEF DESCRIPTION OF THE DRAWINGS

The above and other objects, features and advantages of the present invention will become more apparent to those skilled in the art from the following description of the presently preferred exemplary embodiments of the invention taken in conjunction with the accompanying drawings, in which:

FIG. 23 is a schematic representation for explaining accuracy changing information used for the thirteenth exemplary process performed between the portable phone and the server apparatus in the information provision system;

FIG. 45 is a flow chart for explaining a signal processing operation of the IC card installed in the portable phone terminal according to the fourth preferred embodiment with respect to the authentication employing the user identification information.

DESCRIPTION OF THE PREFERRED EMBODIMENTS

Preferred embodiments of the present invention will be described hereafter with reference to the accompanying drawings. As an information terminal apparatus to which the preferred embodiment of the present invention is applied, a portable phone having a positioning function utilizing an artificial satellite will be described by way of example.

Firstly, with reference to FIG. 1 a general structure of an information provision system realized by applying the preferred embodiment of the present invention will be described.

Figure 1:
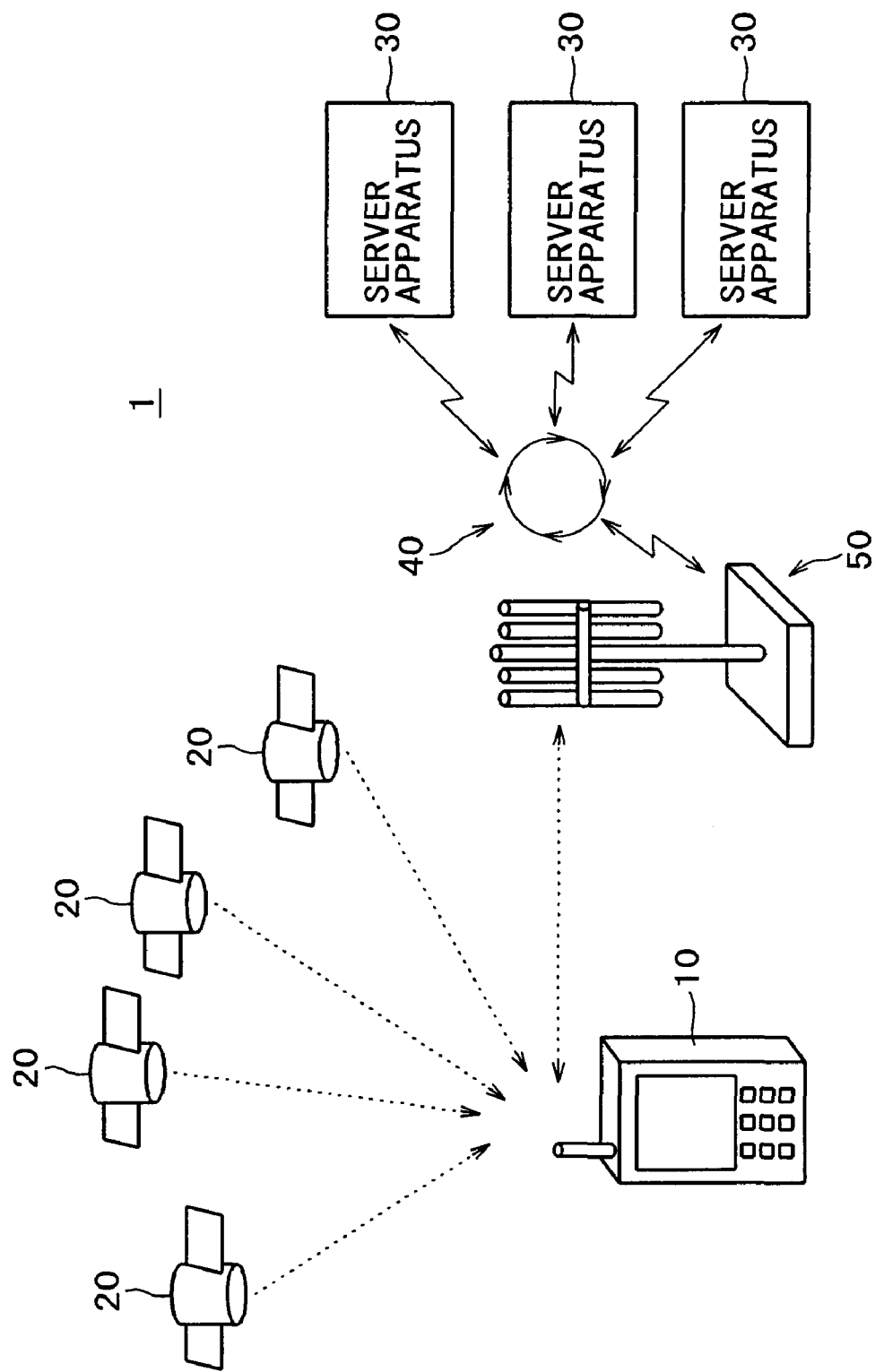
FIG. 1 is a schematic view showing an example of an information provision system realized by applying the preferred embodiment of the present invention thereto.

As shown in FIG. 1 the information provision system 1 includes a portable phone terminal 10 having a positioning function using a GPS (hereafter referred to as GPS function), a plurality of artificial satellites 20 (hereafter referred to as GPS satellites 20) constituting the GPS, a server apparatus 30 for providing a variety of information data to the portable phone terminal 10, and a communication base station 50 which communicates by radio with the portable phone terminal 10 and is connected to the server apparatus 30 via a communication network 40. The information provision system 1 may have either only one or a plurality of server apparatus(es) 30 subject to connection to the portable phone terminal 10.

The portable phone terminal 10 carries out radio communication with the communication base station 50 and has a call function for performing a audio call between the portable phone terminal 10 and another telephone set via the communication base station 50 and a telephone network. Further, besides the call function, the portable phone terminal 10 has the GPS function for receiving a signal (hereafter referred to as GPS signal) transmitted from each of the GPS satellites 20, and a transmission/reception function for establishing a transmission route between the portable phone terminal 10 and the server apparatus 30 via the communication base station 50 and the communication network 40 and transmitting/receiving a variety of information data to/from the server apparatus 30 (hereafter referred to as network function).

In this case it is necessary for the server apparatus 20 to determine which of the portable phone terminals 10 has sent position/time information, so that the portable phone terminals 10 send certain identification information (hereinafter the certain identification information is referred to as user ID) to the server apparatus 20. The user ID includes identification information for specifying a person using the portable phone terminal 10 and identification information for specifying the portable phone terminal 10.

As for the user ID, an apparatus identification signal (apparatus ID) assigned to each of the portable phone terminals 10 may be used, for example. A telephone number assigned to each of the portable phone terminals 10 may be used as the user ID. A user of the portable phone terminal 10 may register identification information comprising specific numbers, signs which is distinguishable from other users in the server apparatus 20 beforehand so as to use the registered identification information as his or her user ID. As will be described in the following, in the first through the third preferred embodiments, the apparatus ID assigned to each apparatus of the portable phone terminal 10 is used as the user ID.

In this case, each portable phone terminal 10 is provided with a GPS positioning function and may be any suitable one that has a position/time information transmitting function to the server apparatus 20 and, of course, not be limited to one that has the same structure.

An application for sending the position/time information from the portable phone terminal 10 to the server apparatus maybe installed in the portable phone terminal beforehand, or the portable phone terminal may download and acquire such an application through the Internet from the server apparatus 20.

Based on the position/time information collected from one or more portable phone terminals 10, the server apparatus 20 offers services such as providing information to a person being present at a particular time and at a particular location, or may provide a service in which the collected information is transferred to a particular destination registered with the server apparatus 20.

Figure 2:
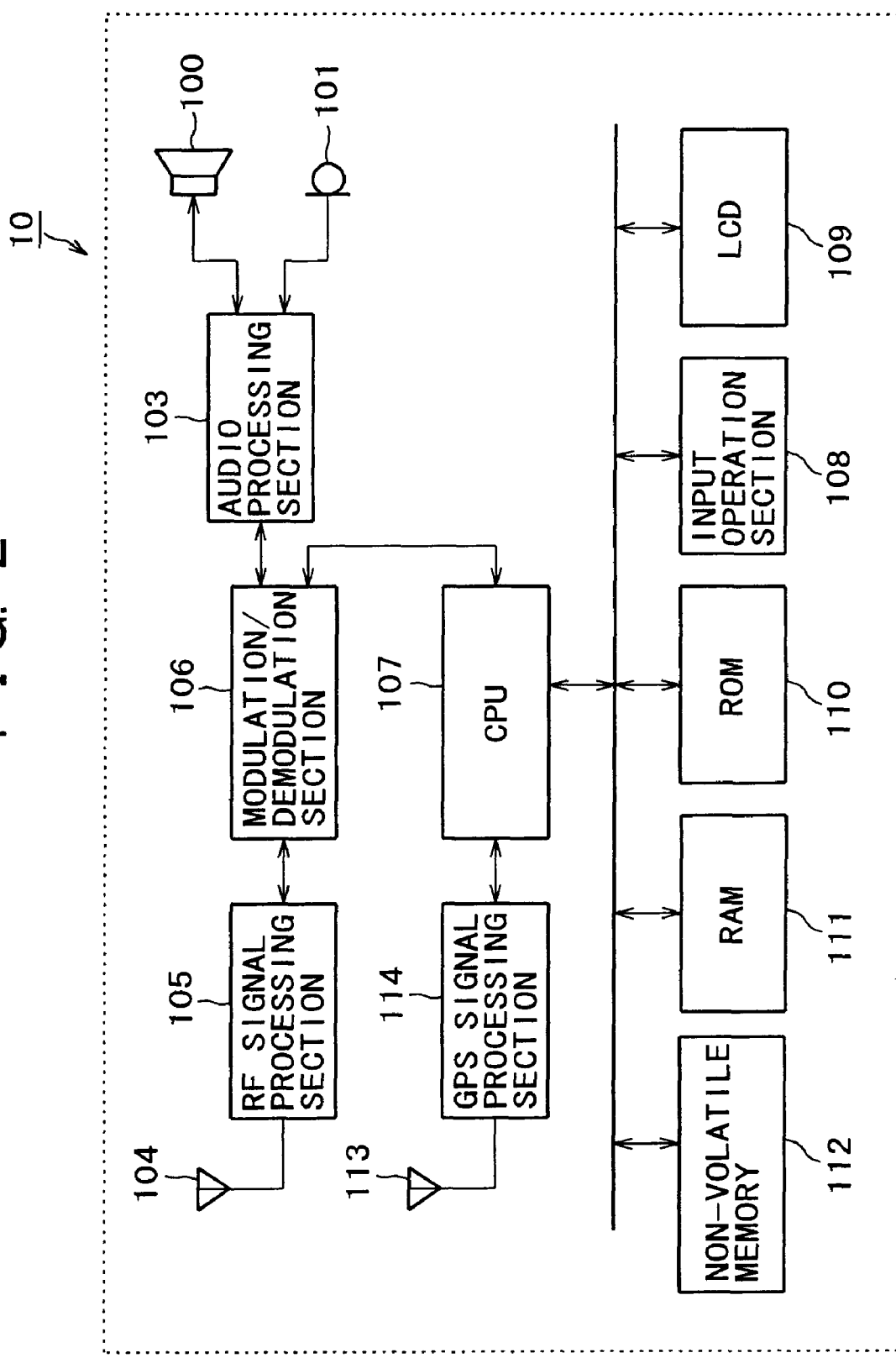
FIG. 2 is a schematic block diagram showing an example of structure for a portable phone provided in the information provision system.

Now referring to FIG. 2, an exemplary preferred embodiment of the portable phone terminal 10 will be described. As shown in FIG. 2 the portable phone terminal 10 includes a speaker 100, a microphone 101, an audio processing section 103, an RF antenna 104, an RF signal processing section 105, a modulation/demodulation section 106, a CPU (Central Processing Unit) 107, an input operation section 108, a liquid crystal display section (hereafter simply referred to as LCD) 109, a ROM (Read Only Memory) 110, a RAM (Random Access Memory) 111, a non-volatile memory 112, a GPS antenna 113, and a GPS signal reception section 114.

The speaker 100 converts and outputs an electric audio signal outputted from the audio processing section 103 to a audio. A user listens to the audio outputted from the speaker 100. The microphone 101 converts a audio produced by the user to an electric audio signal so as to be outputted to the audio processing section 103. The audio processing section 103 processes the audio signal provided by the microphone 101, such as amplification, conversion to a digital signal, pressure compression, addition of error correcting signal, etc., and outputs the resulting baseband signal to the modulation/demodulation section 106. The audio processing section 103 processes the baseband signal outputted from the modulation/demodulation section 106 such as band compression, error correction process, conversion to an analogue signal, amplification, etc., and outputs the resulting audio signal to the speaker 100.

The RF antenna 104 receives a radio wave transmitted from the communication base station 50, and transmits a signal outputted from the RF signal processing section 105 to the communication base station 50 as a radio wave. The RF signal processing section 105 amplifies a signal received by the RF antenna 104 and converts the signal into an RF signal which is a signal of a predetermined frequency component. The converted RF signal is subjected to a variety of filtering processes, then outputted to the modulation/demodulation section 106. Further, the RF signal processing section 105 mixes a modulated signal outputted from the modulation/demodulation section 106 with an output from a frequency synthesizer (not shown) to be converted into a predetermined frequency then amplified and outputted to the RF antenna 104.

The modulation/demodulation section 106 modulates the signal outputted from the RF signal processing section 105 into the baseband signal and outputs the resulting audio signal to the audio processing section 103. If the resulting signal by modulating includes information other than audio, the information is outputted to the CPU 107. The baseband signal outputted from the audio processing section 103 modulates a high frequency signal, and the resulting modulated signal is outputted to the RF signal processing section 105. Further, when the CPU 107 inputs a request for transmitting information other than audio to the server apparatus 30 via the communication base station 50, the modulation/demodulation section 106 processes the information such as coding, modulation, etc., and outputs the resulting signal to the RF signal processing section 105.

The CPU 107 operates according to a procedure described in a software program stored in the ROM 110 so as to transmit/receive a variety of signals and information to/from each section constituting the portable phone terminal 10, to control operation of each section and performs a variety of operation processes for the externally acquired information.

The input operation section 108 has a plurality of input buttons provided on a body of the portable phone terminal 10. By operating the input operation section 108, the user carries out a variety of input operations with respect to operations of the portable phone terminal 10 such as an input operation of telephone number of a called party, a request operation for acquiring information from the server apparatus 30, etc. The input operation section 108 converts the operations inputted by the user into electric signals to be provided to the CPU 107. Based on information outputted from the CPU 107, the LCD 109 displays a variety of information data under control of a drive circuit (not shown).

The ROM 110 has a variety of information data such as a software program describing an operation of the CPU 107 written therein beforehand. The variety of information data written in the ROM 110 is read under control of the CPU 107. Even when a power supply of the portable phone terminal 10 is turned off, the information written in the ROM 110 is not lost. The RAM 111 has a function, as a temporary storage area necessary for performing each process in the CPU 107. For example, information such as a telephone number inputted through the input operation section 108 is temporarily stored. The non-volatile memory 112 is provided to mainly store information specific to the user which may be necessary as the user uses the portable phone, such as a telephone book showing a relationship between a telephone number and a name of the called party, and information necessary for establishing connection to the server apparatus 30. According to a request from the CPU 107, the information is freely read and stored. The information written in the non-volatile memory 112 is not lost even when the power supply of the portable phone terminal 10 is turned off.

The GPS antenna 113 receives the GPS signal transmitted from the GPS satellites 20 and outputs it to the GPS signal reception section 114. The GPS signal reception section 114 performs a capture process, a demodulation process, etc. for the GPS signal received by the GPS antenna 113 in order to extract information included in the GPS signal and calculate a current time and a current position of the portable phone terminal 10 according to the extracted information. The GPS signal reception section 114 outputs the calculated current position and current time to the CPU 107. It should be noted that, in the portable phone terminal 10, only the extraction of the information from the GPS signal is performed at the GPS signal processing section 114 and an operation for calculating the current position and the current time may be carried out by the CPU 107.

The preferred embodiment of the portable phone terminal 10 is not limited to the circuit structure as shown in FIG. 2. For example, there may be provided a vibrator or a light emitting apparatus for informing the user of an incoming call. In this example of preferred embodiment of the present invention, an encryption process and an authentication process which will be described in the following may be realized by means of the operation carried out by the CPU 107, however a dedicated circuit may be provided for these processes. The portable phone terminal 10 includes dedicated circuits for respectively performing encryption process and the authentication process to thereby reduce an computation capability necessary for the CPU 107 and effectively perform the encryption process and the authentication process at a high rate.

Figure 3:
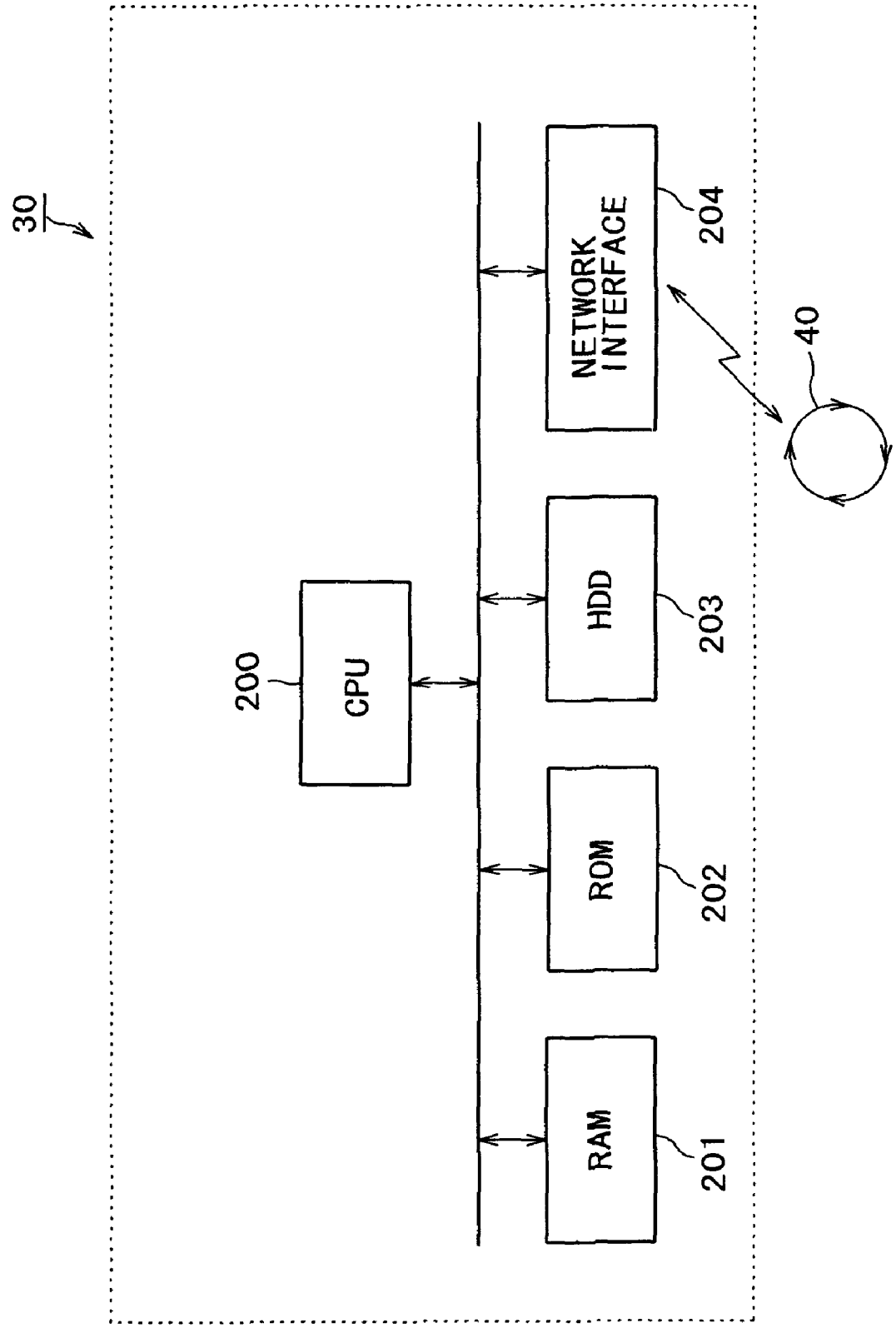
FIG. 3 is a schematic block diagram showing an example of structure for a server apparatus provided in the information provision system.

Referring now to FIG. 3 an example of structure for the server apparatus 30 according to a preferred embodiment of the present invention will be described. As is shown in FIG. 3, the server apparatus 30 includes a CPU 200, a RAM 201, a ROM 202, a hard disk drive (hereafter referred to as HDD) 203, and a network interface 204.

The CPU 200 operates according to a procedure described in a software program stored in the HDD 203 so as to transmit/receive a variety of information data to/from each section constituting the server apparatus 30, to control operation of each section and performs a variety of operation processes. The RAM 201 has a function of performing as a temporary storage area necessary for carrying out each process in the CPU 200. Further, information necessary for starting up the server apparatus 30 are stored in the ROM 202 beforehand in a non-rewritable manner. Stored in the HDD 203 are the software program describing the procedure of the CPU 200, information for specifying the portable phone terminal 10 to be provided with a connection request, a variety of information data necessary for providing a variety of services, etc.

The network interface 204 is connected to the communication network 40 and has a function where a variety of information data are communicated between the server apparatus 30 and other information processing apparatuses including the portable phone terminal 10 through the communication network 40.

The server apparatus 30 is not limited to the above-described structure, and therefore may further include an input section for inputting a variety of operations by the user, a display section for notify the user of information processed by the CPU 200 and an operation of the server apparatus 30.

In the thus constituted information provision system 1, the transmission route is established between the portable phone terminal 10 and the server apparatus 30 by using the network function of the portable phone terminal 10. According to the request made by the user of the portable phone terminal 10, the server apparatus 30 provides the portable phone terminal 10 with a variety of information data. When information related to the current position of the portable phone terminal 10 is provided to the server apparatus 30, for example, when a map provision service for indicating a map related to the current position, an information provision service for providing information related to different stores located in the vicinity of the current position, an information providing service with respect to a route from the current position to a predetermined location, a notifying service where the current position of the portable phone terminal 10 is provided to other information processing apparatus, etc. are utilized, the position/time information acquired by means of the GPS function of the portable phone terminal 10, that is information indicative of the current position of the portable phone terminal at the current time is sent to the server apparatus 30. For example, information with respect to a map or stores around the current position is transmitted from the server apparatus 30 to the portable phone terminal 10. The information may be displayed on the LCD 109 of the portable phone terminal 10, information related to the current position of the portable phone terminal 10 is transmitted from the server apparatus 30 to another information processing apparatus, or the like.

Since the call function and the network function of the portable phone terminal 10 is equivalent or similar to those conventionally and widely used, descriptions thereof will be omitted for the present description. In the following, with reference to FIG. 4, the GPS function of the portable phone terminal 10 will be described in light of a process where the server apparatus 30 acquires position/time information from the portable phone terminal 10.

When the portable phone terminal 10 is requested by the user for an available service with respect to a current position, or requested by the server apparatus 30 to transmit the current position, the portable phone terminal 10 receives the GPS signal transmitted from the GPS satellites 20 (reference to step S10). Then the portable phone terminal 10 demodulates the received GPS signal so as to acquire the GPS satellites' orbit information and temporal information included in the GPS signal. Based on the orbit information and the temporal information and a delay time of the received GPS signal, a three dimensional position and an accurate current time of the portable phone terminal 10 are calculated by solving simultaneous equations (reference to step S11). Then, the portable phone 10 transmits information indicative of the resulting current position and the current time to the server apparatus 30 as indicated by an arrow S12 in FIG. 4.

When calculating the current position and the current time from the GPS signals, it is necessary for the portable phone 10 to receive the GPS signal from at least four GPS satellites 20. The reason is that there is a difference between an internal time provided in the portable phone terminal 10 and a time of an atomic clock provided in each of the GPS satellites 20 so that pseudo distances from at least four GPS satellites 20 are needed to calculate four unknown parameters which are three dimensional positions and the accurate current time having removed an effect of the difference.

Figure 4:
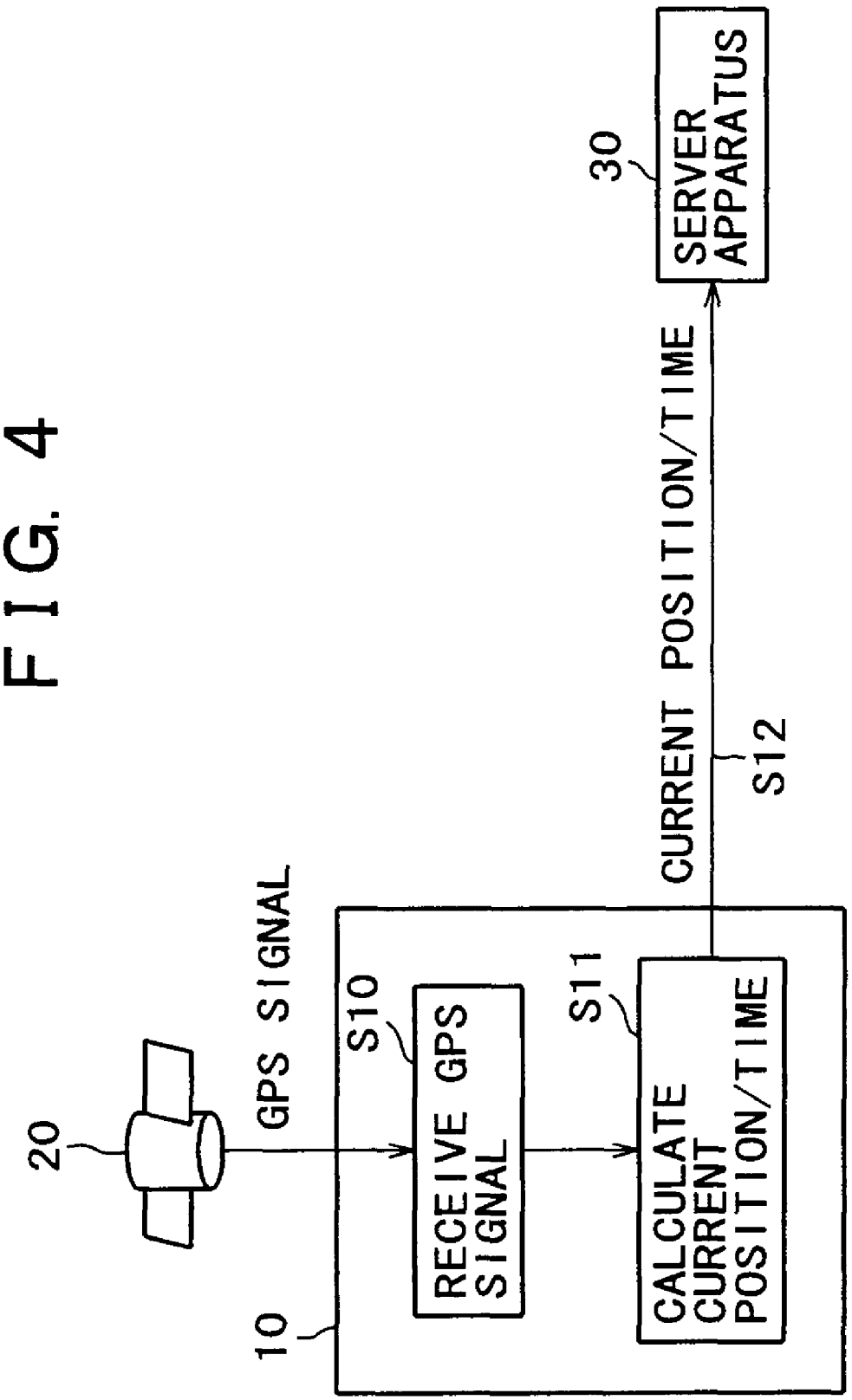
FIG. 4 is a schematic representation for explaining a GPS function in the portable phone provided in the information provision system.
Figure 5:
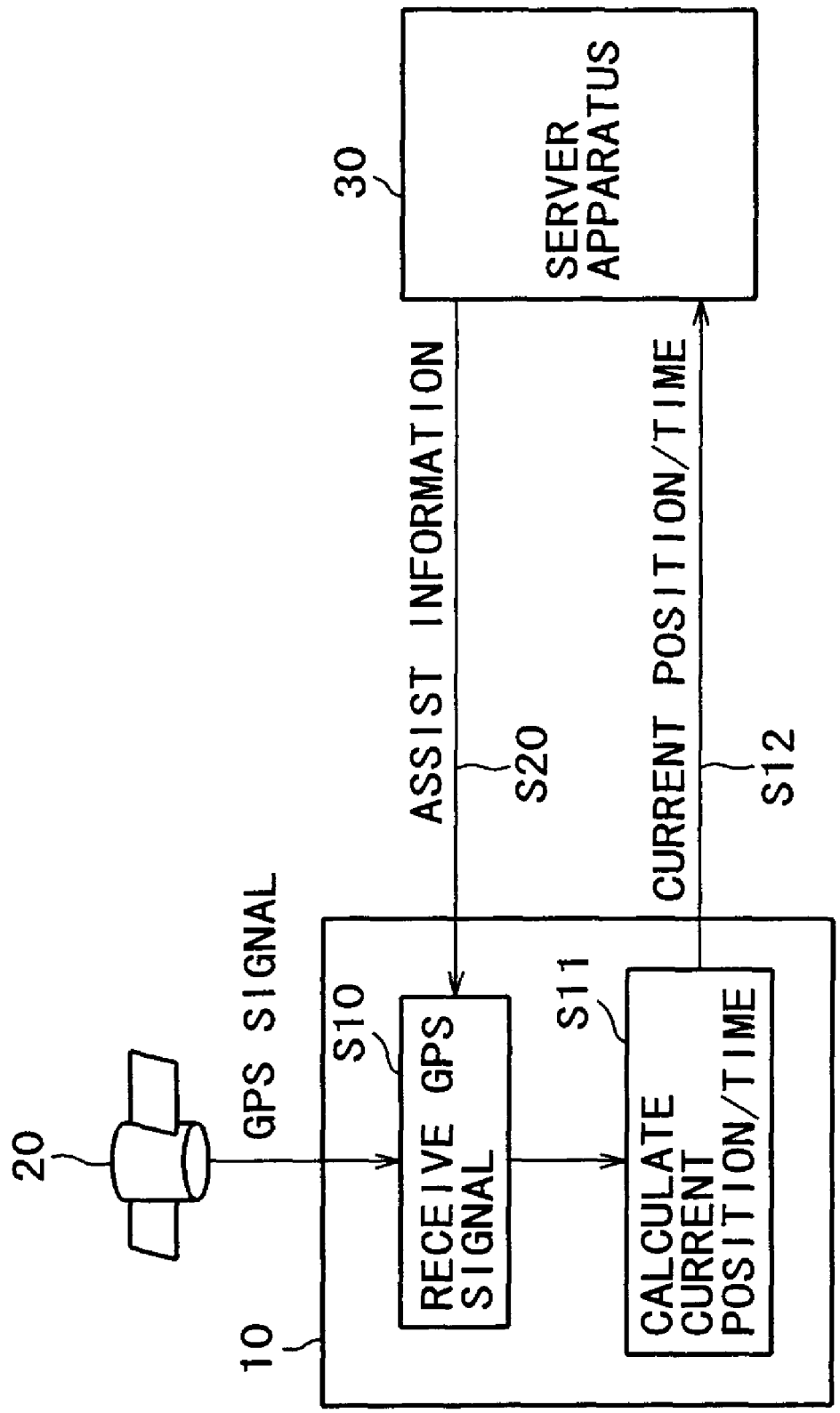
FIG. 5 is another schematic representation for explaining a GPS function in the portable phone provided in the information provision system.

In addition, in the example as shown in FIG. 4, the process from the reception of the GPS signal to the calculation of the current position and the current time is completed within the portable phone terminal 10, however, as shown in FIG. 5, a variety of information data employed to effectively capture the GPS signal at a high rate (hereafter referred to as assist information) may be acquired from the server apparatus 30 (reference to step S20) so that the GPS signal may be received by means of the assist information.

The assist information may be, for example, information indicative of the GPS satellites 20 whose GPS signals can be received in an area where the portable phone terminal 10 is assumed to exist and at the current time, the orbit information with respect to each GPS satellite 20, information for correcting information included the GPS signal of each GPS satellite 20, etc.

It may not be necessary to acquire the assist information from the server apparatus 30 every time the current position and the current time are calculated. For example, the once acquired assist information may be held in a storage section of the portable phone 10 for a predetermined period during which a GPS signal may be captured by using the assist information held in the storage section. Further, in FIG. 5, the server apparatus from which the portable phone terminal 10 acquires the assist information and the server apparatus transmitting the current position and the current time are shown as the same apparatus, however these apparatuses may be respectively separated ones.

Figure 6:
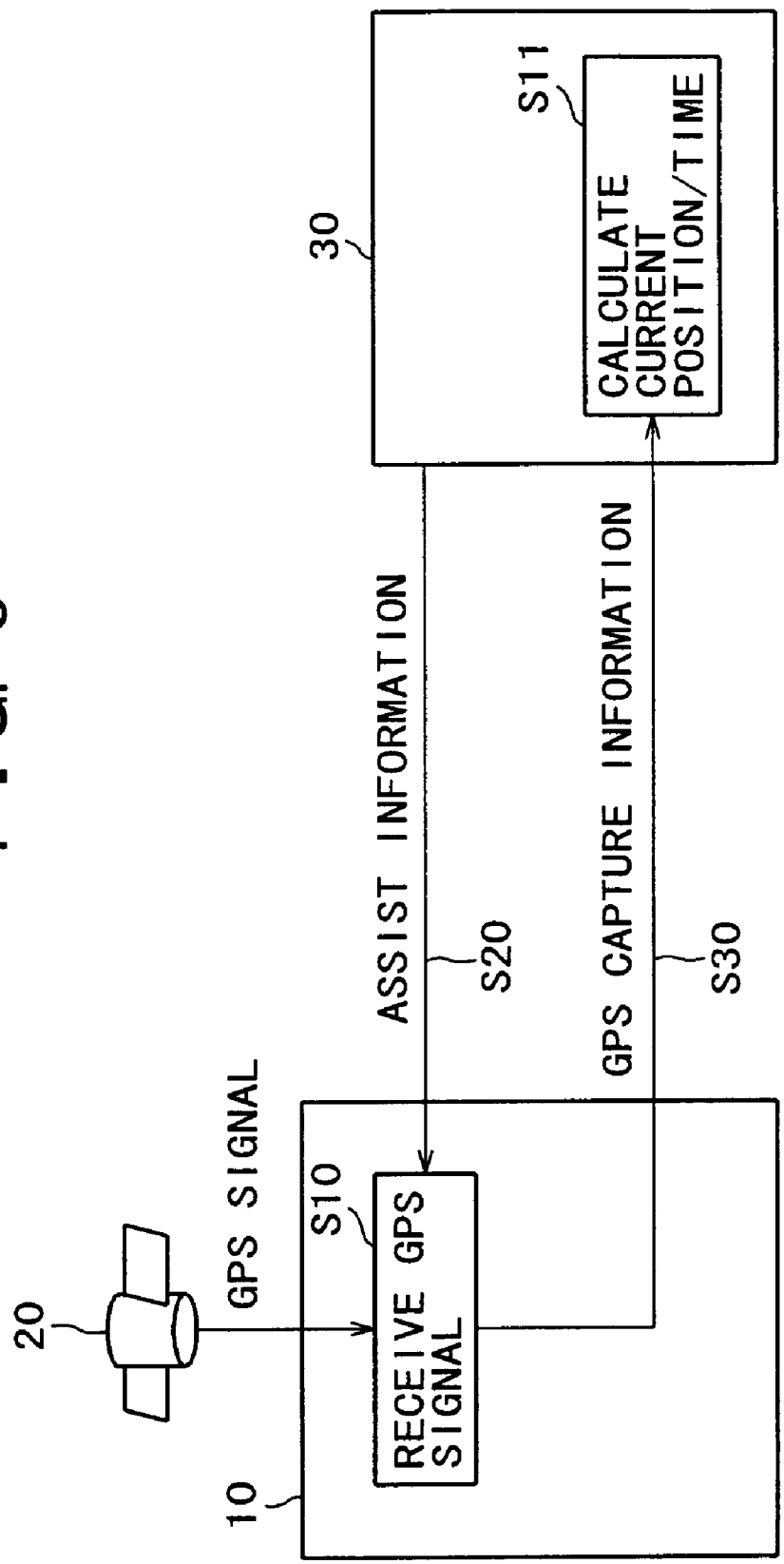
FIG. 6 is still another schematic representation for explaining a GPS function in the portable phone provided in the information provision system.

In the examples as shown in FIG. 4 and FIG. 5, based on the received GPS signals the portable phone terminal 10 itself performs the calculation process of the current position and the current time, however, as shown in FIG. 6, the information acquired by capturing and demodulating the GPS signals by means of the portable phone terminal 10 that is GPS capture information prior to the calculation of the current position and the current time may be transmitted from the portable phone terminal 10 to the server apparatus 30 (reference to step S30) and the server apparatus 30 may calculate the current position and the current time according to the GPS capture information.

In this way, by having the server apparatus 30 calculate the current position and the current time, it is not necessary for the portable phone terminal 10 to have the operation needed for the calculation, thus reducing a circuit scale and power consumption for an operation circuit installed in the portable phone terminal 10. Further, in FIG. 6, the server apparatus from which the portable phone terminal 10 acquires the assist information and the server apparatus transmitting the GPS capture information are shown as the same apparatus, however these apparatuses may be respectively separated ones.

In an information provision service 1, when the server apparatus 30 acquires the position/time information from the portable phone terminal 10, as mentioned above, the information indicative of the current position and the current time, the assist information, the GPS capture information, etc. are communicated between the portable phone terminal 10 and the server apparatus 30. These information data are capable of specifying a current position of the portable phone terminal 10 at a predetermined time and, considering that the portable phone terminal 10 is carried by the user, such information data have a characteristic as important personal information that may specify the user's activity. Accordingly, it is important to prevent the information data from being intercepted and leaked to a third part that is not targeted by the user.

In the information provision service 1, when trying to transmit/receive, between the portable phone terminal 10 and the server apparatus 30, the information indicative of the current position and the current time, the assist information, the GPS capture information, etc. or information related to the current position and the current time calculated from the GPS signal received by the portable phone terminal 10, or information used for calculating the current position and the current time from the GPS signal, the authentication is carried out between the portable phone terminal 10 and the server apparatus 30. Only if the authentication is successfully completed, the information related to the position and the time may be communicated.

In view mainly of the above-described authentication process, various processes carried out between the portable phone terminal 10 and the server apparatus 30 will be described in the following with reference to the drawings.

First Example of Process

Figure 7:
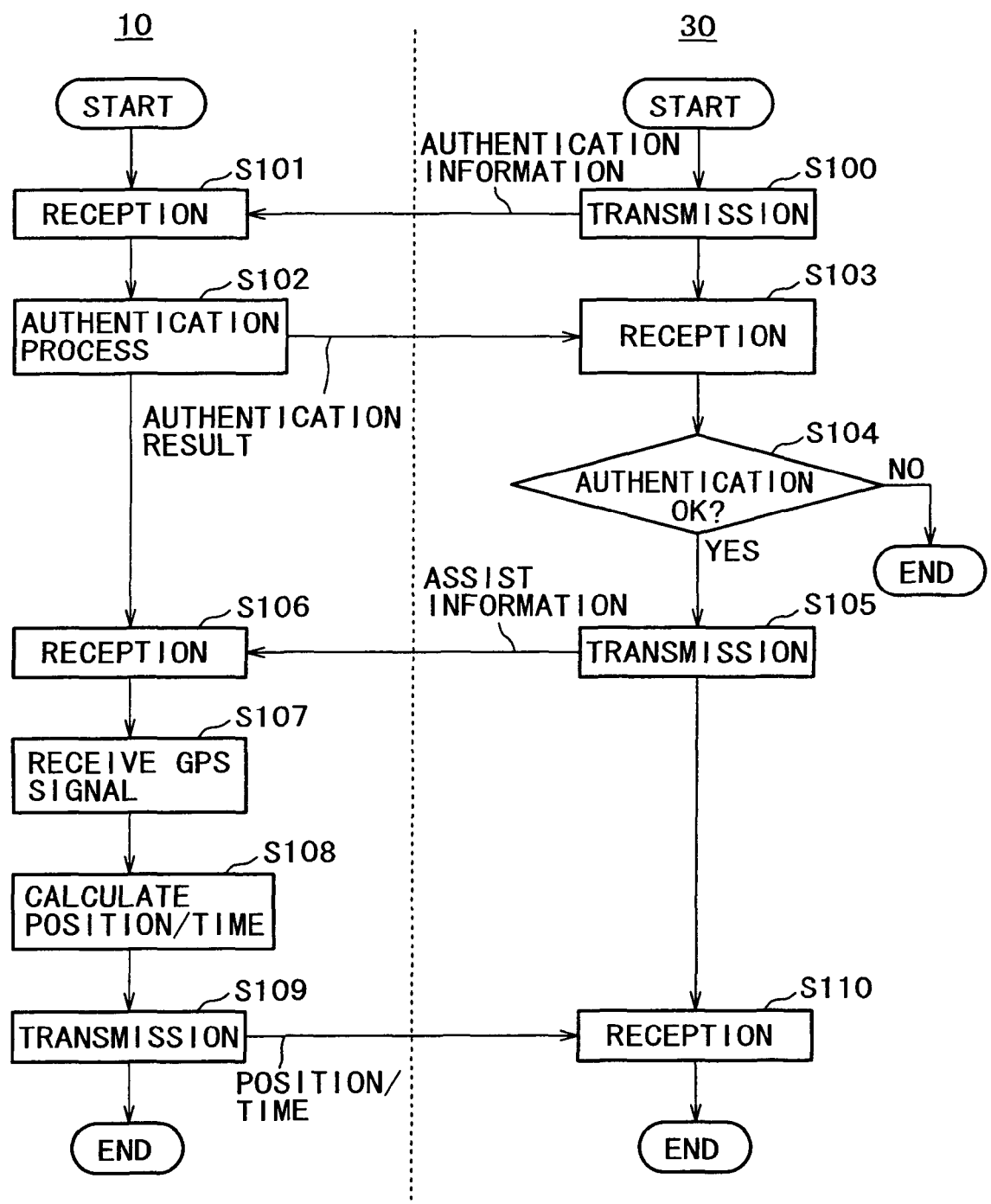
FIG. 7 is a flow chart for explaining a first exemplary process performed between the portable phone and the server apparatus in the information provision system.
Figure 8:
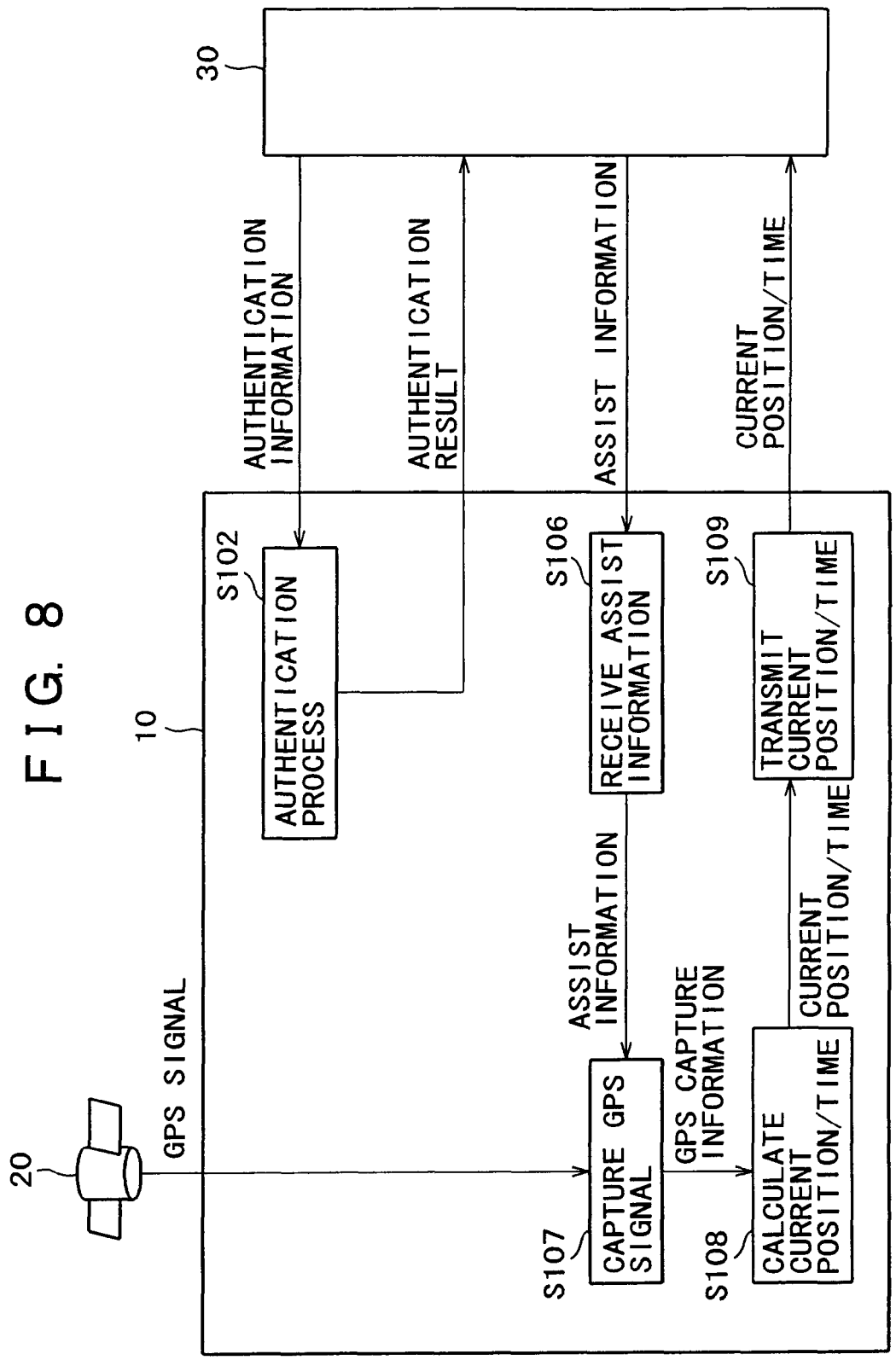
FIG. 8 is a schematic representation for explaining the first exemplary process performed between the portable phone and the server apparatus in the information provision system.

A first example of process for performing the most basic authentication will be described with reference to the flow chart as shown in FIG. 7 and the schematic representation as shown in FIG. 8. FIG. 8 schematically illustrates a series of processes as shown in FIG. 7 in light of processes for the portable phone terminal 10. We assume hereinafter that a communication route is established between the portable phone 10 and the server apparatus 30 via the communication base station 50 and the communication network 40 so that a variety of information data are communicated between the portable phone terminal 10 and the server apparatus 30.

Under this status, when the user of the portable phone terminal 10 request utilization of a service related to the current position and when the server apparatus 30 starts a process of acquiring information related to the current position from the portable phone terminal 10, the portable phone terminal 10 and the server apparatus 30 operate as follows.

Firstly, in step S100, the server apparatus 30 transmits authentication information for performing an authentication process in the portable phone terminal 10 to the portable phone terminal 10. Then, in step S101 the portable phone terminal 10 receives the authentication information transmitted from the server apparatus 30. In step S102, using the authentication information, the portable phone terminal 10 performs the authentication process based on a predetermined authentication algorithm and transmits the result of authentication to the server apparatus 30. The authentication process is realized in such a way that the CPU 107 provided in the portable phone terminal 10 performs various operation processes. The portable phone terminal 10 may include an authentication circuit specialized in the authentication process so that the authentication circuit carries out the authentication process.

In step S103 the server apparatus 30 receives the authentication result transmitted from the portable phone terminal 10, then in step S104 determines whether the portable phone terminal 10 has carried out authentication legitimately. As a result of the determination if the authentication is not permitted, the series of processes in which the portable phone terminal 10 acquires the current position are ended. When the authentication is permitted the assist information is transmitted to the portable phone terminal 10 in step S105.

Next, in step S106 the portable phone terminal 10 receives the assist information then, in step S107, receives the GPS signal by means of the GPS antenna 113 so as to capture the GPS signal based on the assist information by means of the GPS signal reception section 114. Then, in step S108 the portable phone terminal 10 performs a modulation process for the GPS signal captured by the GPS signal reception section 114 so as to calculate the current position and the current time. The calculation may be carried out by means of the GPS signal reception section. The GPS capture information may be outputted from the GPS signal reception section and the CPU 107 may perform the calculation based on the GPS capture information.

Next, in step S109 the portable phone terminal 10 transmits the calculated current position and current time to the server apparatus 30. Then, in step S110 the server apparatus 30 receives the current position and the current time transmitted from the portable phone terminal 10.

According to the series of processes described above, the process of transmitting the current position and the current time from the portable phone terminal 10 to the server apparatus 30 is completed. Thereafter, according to a request made by the portable phone 10, the server apparatus 30 transmits a variety of information data related to the current position to the portable phone terminal 10, for example.

By performing the series of processes as described above, the portable phone terminal 10 and the server apparatus 30 carry out authentication process by means of the authentication information, then the assist information, the current position and the current time are communicated. Therefore, in the situation where the server apparatus 30 is guaranteed as a legitimate counterpart for connection, the user of the portable phone terminal 10 may transmit the current position and the current time to be important personal information for specifying his or her behavior to the server apparatus 30 and safely enjoy a variety of services related to the current position.

Contrary to the above, by sending the authentication information from the portable phone terminal 10 to the server apparatus 30 and performing the authentication process based on the authentication information received by the server apparatus 30, so-called mutual authentication may be realized. By carrying out the above authentication process, a business operator providing services by means of the server apparatus 30 may confirm that the portable phone 10 is a legitimate receiver to be provided with the services so as to securely provide the information related to the current position, which is particularly effective for charging on information providing services.

The example as shown in FIG. 7 illustrates that the assist information is transmitted from the server apparatus 30 to portable phone terminal 10 after performing the authentication process on the portable phone terminal 10 side. However, when the latest assist information is registered in advance with the RAM 111 and the non-volatile memory 112 provided in the portable phone terminal 10, for example, if the portable phone 10 does not have to acquire the assist information from the server apparatus 30, process in step S103 through step S106 may be omitted. According to the authentication result in step S102, if the authentication is permitted, then only the processes after step S107 are carried out.

The assist information may be transmitted from the server apparatus 30 to the portable phone 10 before the authentication is performed. However, considering a possibility that the current position of the portable phone 10 can be roughly determined based on the assist information it is desirable to transmit the assist information after performing the authentication.

Second Example of Process

Figure 9:
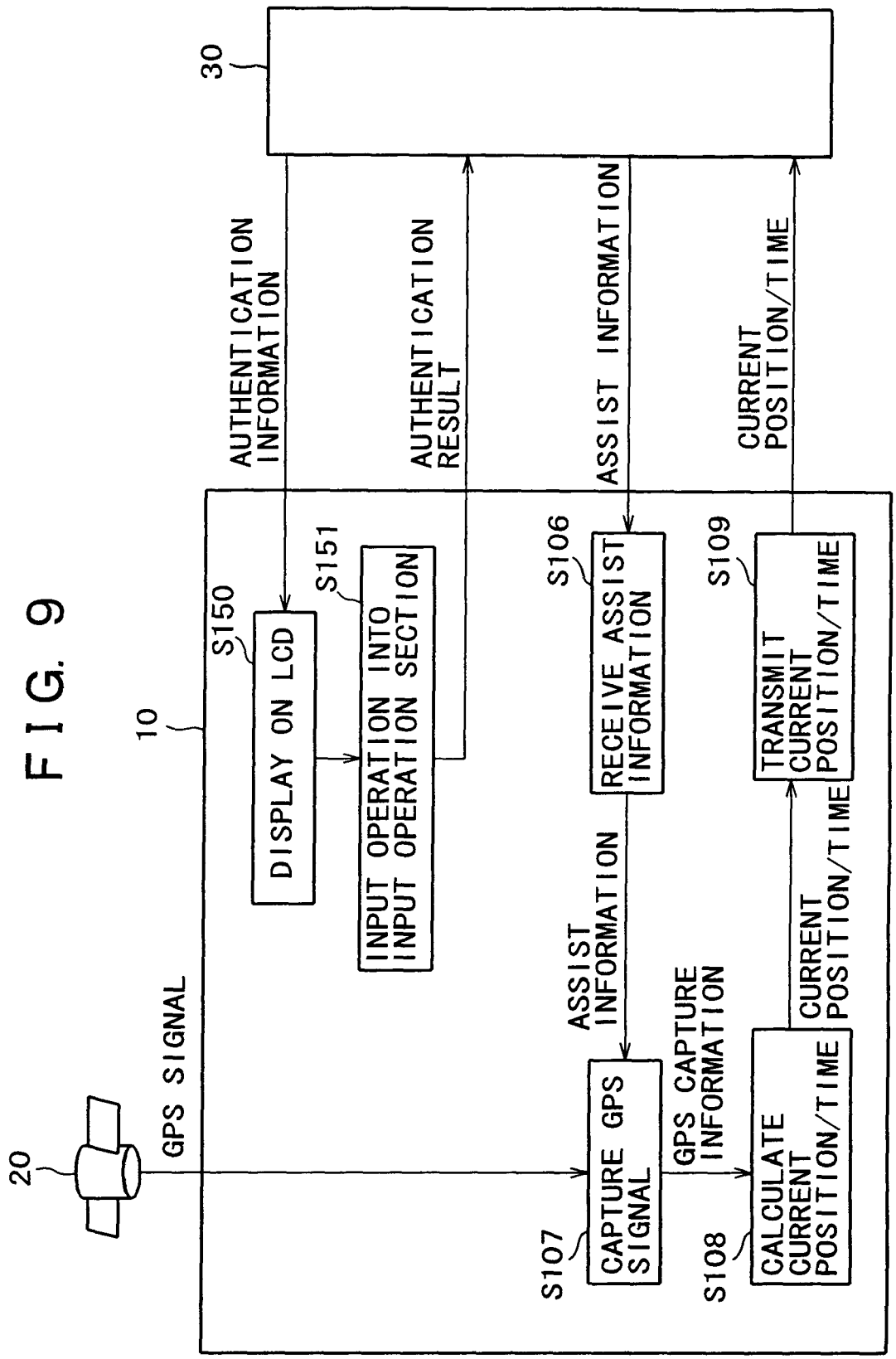
FIG. 9 is a schematic representation for explaining a second exemplary process performed between the portable phone and the server apparatus in the information provision system.

Next, based on the first example of process, are second exemplary process according to another preferred embodiment of the present invention particularly illustrating an example of the authentication process as in step S102 will be described with reference to the schematic representation as shown in FIG. 9. In the second exemplary process, as the authentication process in step S102, authentication is carried out by inquiring the user of the portable phone terminal 10 to see if he or she is a legitimate counterpart for connection, and other series of steps are equivalent to those in the first exemplary process. Therefore, in this example of preferred embodiment of the present invention, the description of the steps equivalent to those in the first example of process will not be repeated herein and the same reference numerals will be used in the figure. After the description of the second example of process, other examples will be also described. Similarly, only distinct features will be described and the same reference numerals will be used in the figures for similar steps.

In the second exemplary process, after the portable phone terminal 10 receives the authentication information transmitted from the server apparatus 30 in step S101, the authentication information is displayed on the LCD 109 provided for the portable phone terminal 10 in step S150 as shown in FIG. 9. Then the user of the portable phone terminal 10 confirms the displayed authentication information and determines whether the server apparatus 30 is a legitimate counterpart for connection so as to prompt input operation of the result of determination to the input operation section 108. In step S151, according to the user's operation inputted to the input operation section 108, the portable phone terminal 10 transmits the authentication result indicative of whether the server apparatus 30 is the legitimate counterpart for connection to the server apparatus 30.

In other words, in the second example of process, the LCD 109 provided for the portable phone terminal 10 notifies the user of the authentication information from the server apparatus 30, the operation by the user according to the authentication information is inputted through the input operation section 108, to thereby determine whether to permit the authentication. Therefore, in this example of preferred embodiment of the present invention, it is possible to inquire the user whether transmission of position/time information to the server apparatus 30 causes a problem so as to choose whether to transmit the position/time information according to a user's decision.

It should be understood that the authentication information in this example of preferred embodiment of the present invention is not particularly limited as far as the user can identify the server apparatus 30 by means of the information, so that a name, for example, a telephone number, and an IP address of the server apparatus 30 may be used.

Further, in this example of preferred embodiment of the present invention, although the user is notified of the authentication information by displaying it on the LCD 109 of the portable phone terminal 10, the apparatus or the method for notifying is not particularly limited if it is possible for the user to confirm the server apparatus 30 that is the transmitter of the authentication information. For example, the notification may be carried out by displaying the information on a display apparatus other than the LCD 109, outputting a corresponding audio to the counterpart for connection or operating a vibrator corresponding to the counterpart for connection.

Third Example of Process

Figure 10:
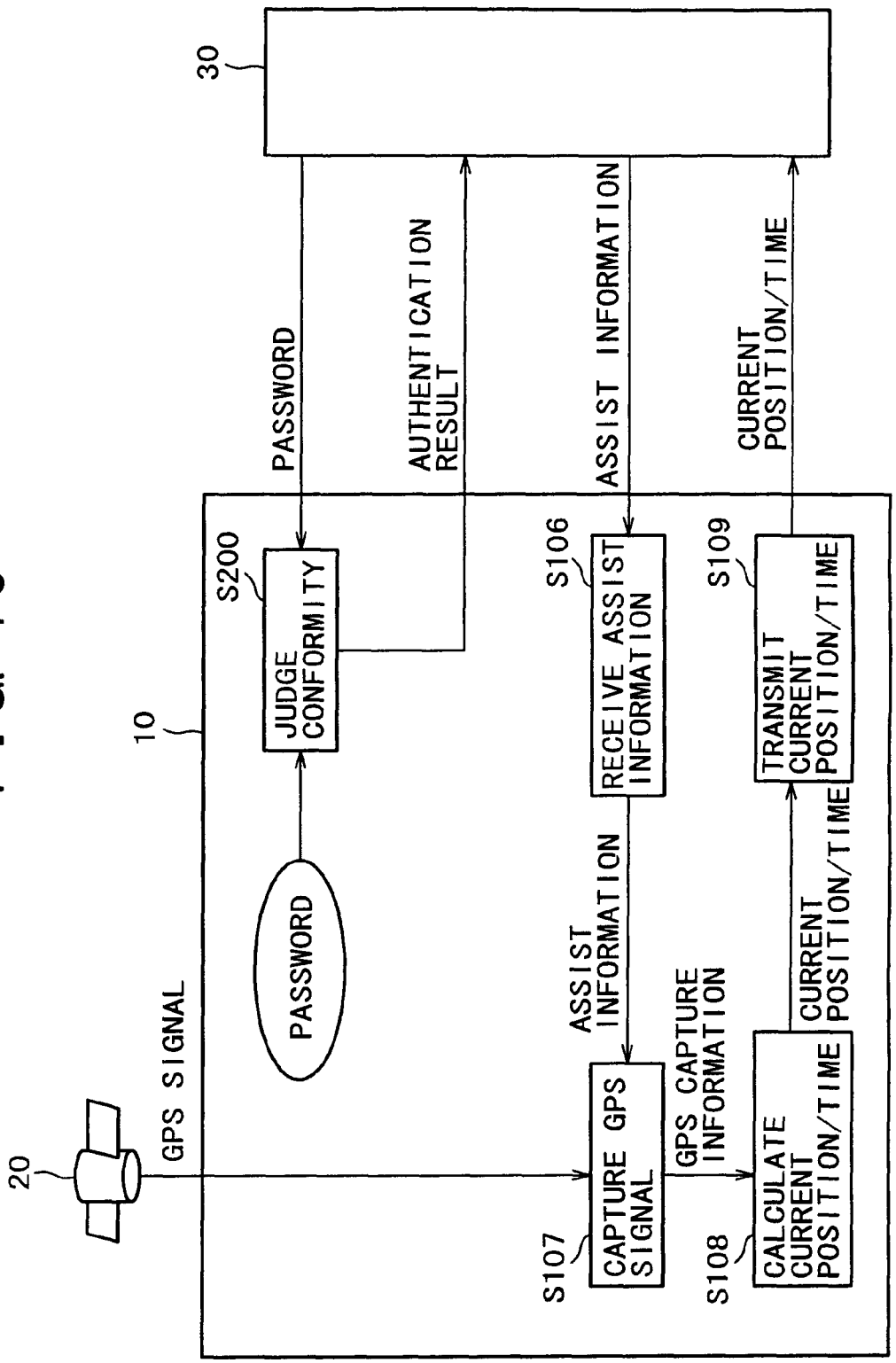
FIG. 10 is a schematic representation for explaining a third exemplary process performed between the portable phone and the server apparatus in the information provision system.

Next, based on the first example of process, the third exemplary process particularly illustrating another example of the authentication process as in step S102 will be described with reference to the schematic representation as shown in FIG. 10. In the third exemplary process, by using predetermined data string information as the authentication information, a so-called password, a password transmitted from the server apparatus 30 and a password stored in advance within the portable phone terminal 10 are compared to perform authentication.

In the third exemplary process, as shown in FIG. 10 the portable phone terminal 10 acquires the password as the authentication information from the server apparatus 30. Then, in step S200 the password acquired from the server apparatus 30 is compared with the password stored in advance in the ROM 110, the RAM 111, or the non-volatile memory 112 of the portable phone terminal 10 by means of the CPU 107 so as to determine whether those passwords are in conformity with each other, i.e., they match. As a result of the determination, if they are in conformity with each other the authentication is permitted, and if they do not match, it authentication is not permitted, then transmitting the result of authentication to the server apparatus 30.

It should be understood that the passwords are not particularly limited if they are information data not known to a third party who is not targeted by the user and available for authentication. Further, if there is a plurality of sever apparatuses 30 for connection, a plurality of passwords respectively corresponding to those for connection may be stored beforehand within the portable phone terminal 10.

Figure 11:
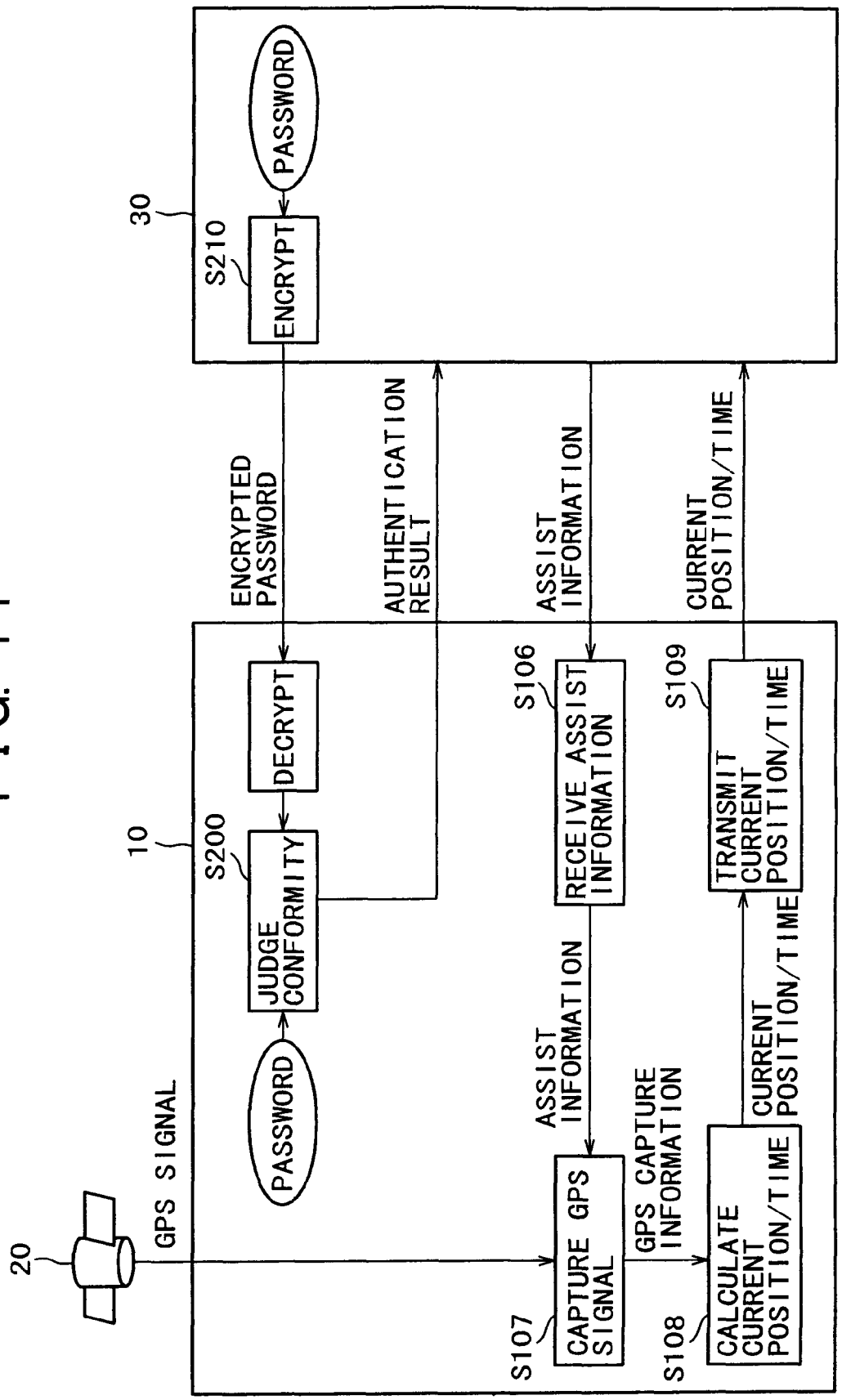
FIG. 11 is a schematic representation for explaining the third exemplary process performed between the portable phone and the server apparatus in the information provision system where encryption is carried out.

When transmitting the password from the server apparatus 30 to the portable phone terminal 10, it is preferable to encrypt the password. In particular, as shown in FIG. 11, the password transmitted from the server apparatus 30 is encrypted on the server apparatus 30 side (reference to step S210) then transmitted to the portable phone terminal 10. The portable phone terminal 10 receives the encrypted password to decrypt it, in step S211, then the authentication process as in step S200 is performed.

By performing the encryption process as described above, the password transmitted from the server apparatus 30 to the portable phone terminal 10 may be prevented from being intercepted and leaked by the third party who is not targeted by the user in the course of the communication network 40, for example.

Further, the above described encryption process and decryption process may be realized by performing a predetermined operation process in the CPU 107 and the CPU 200 respectively provided for the portable phone terminal 10 and the server apparatus 30. The encryption or the decryption may not be realized by means of the CPU 107 and the CPU 200 but realized by a dedicated encryption/decryption circuit that is provided for the portable phone terminal 10 and the server apparatus 30.

An encryption/decryption system applicable to the above described encryption process and decryption process is not specifically limited, and any encryption/decryption system that is predetermined between the portable phone terminal 10 and the server apparatus 30 may be employed. As an example of a particular encryption/decryption system may be a common key encryption system in which a common key predetermined between the portable phone 10 and the server apparatus 30 is used to perform encryption/decryption, a public key system in which a secret key not opened to a communication counterpart and a public key opened to the communication counterpart are used to perform encryption/decryption. A combination of a variety of encryption/decryption systems may also be applicable to the encryption/decryption process.

The above described encryption process and decryption process are not only effective when transmitting the password in the second exemplary process but also applicable when transmitting/receiving other various information data to/from the portable phone terminal 10 and the server apparatus 30 so as to encrypt the information data, so that not only the information related to the current position of the portable phone terminal 10 but also other information data may be prevented from being intercepted or leaked by a third party.

Fourth Example of Process

Figure 12:
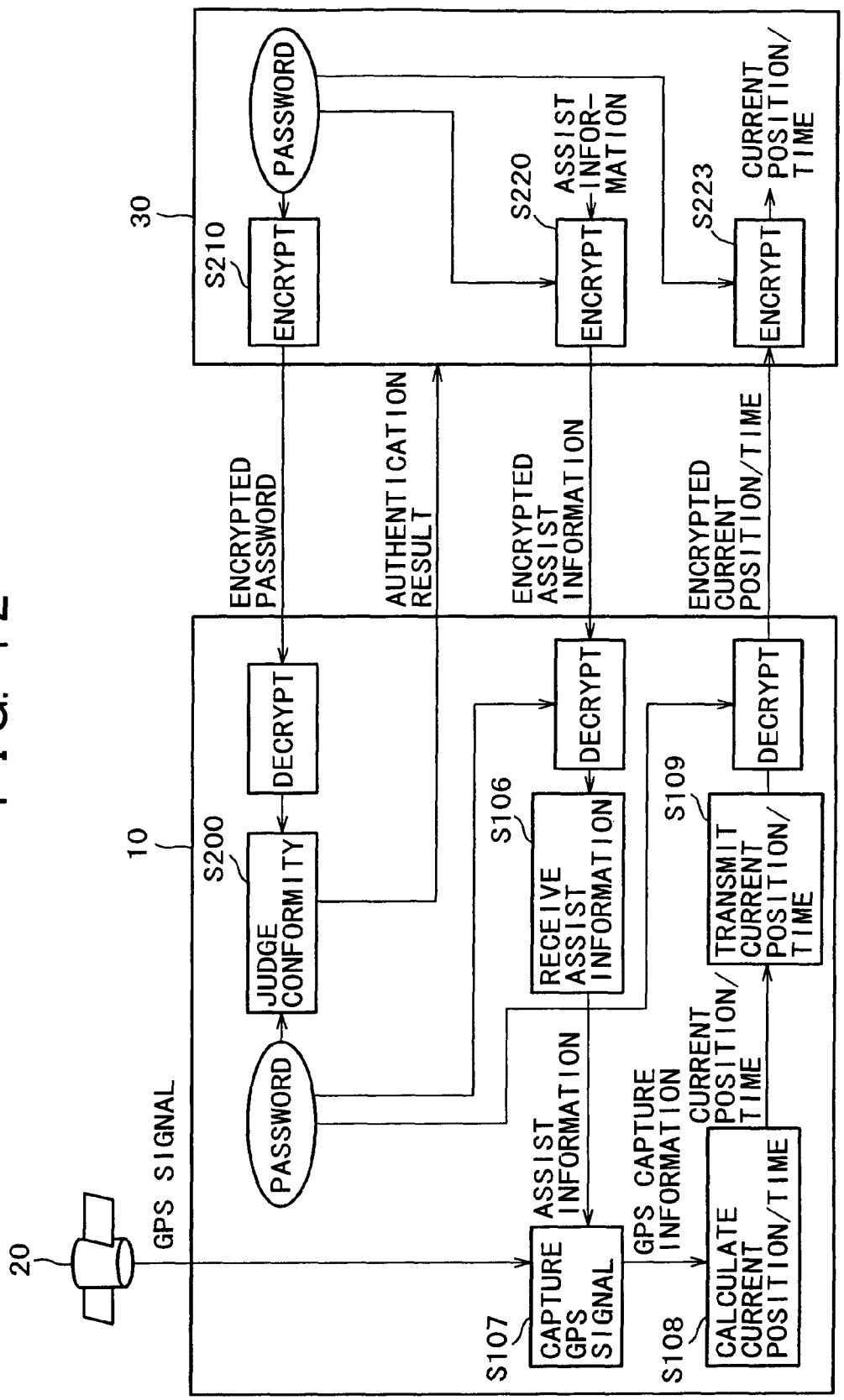
FIG. 12 is a schematic representation for explaining a fourth exemplary process performed between the portable phone and the server apparatus in the information provision system.

Now, a fourth exemplary process as schematically shown in FIG. 12 will be described according to an example of preferred embodiment of the present invention in which encryption is carried out when not only communicating a password as the authentication information but also transmitting/receiving other information. The example as shown in FIG. 12 illustrates an encryption procedure in which by using the password as the authentication information communicated between the portable phone terminal 10 and the server apparatus 30, the encryption is performed when other information data, that is the assist information and the information indicative of the current position and the current time are communicated.

In this case after the authentication process is completed between the portable phone terminal 10 and the server apparatus 30 and the authentication is permitted, when transmitting the assist information in step S105 as shown in FIG. 7, the assist information is encrypted on the server apparatus 30 side so as to be transmitted (reference to step S220) as shown in FIG. 12. Then, in step S106, as shown in FIG. 7, the encrypted assist information is received by the portable phone terminal 10 and then decrypted so as to extract the assist information (reference to step S221). Further, in step S109, as shown in FIG. 7, when transmitting the information indicative of the position and the time, as shown in FIG. 12 the information indicative of the position and the time is encrypted to be transmitted on the portable phone terminal 10 side (reference to step S222). In step S110 as shown in FIG. 7, the encrypted information is received by the server apparatus 30 and then decrypted to extract the information indicative of the position and the time (reference to step S223).

As described above, in this example of preferred embodiment of the present invention, not only the authentication information used when performing the authentication (in this example, the password corresponds to the authentication information) but also other information data communicated between the portable phone terminal 10 and the server apparatus 30 are transmitted/received in an encrypted form, whereby these information data may be prevented from being intercepted and leaked by a third party who is not targeted by the user and may be communicated safely.

In addition, in the example as shown in FIG. 12, the password as an authentication information is employed as it is for the key to encryption and decryption, information generated from the password through a predetermined procedure predetermined between the portable phone terminal 10 and the server apparatus 30 may be used as the key.

Fifth Example of Process

Figure 13:
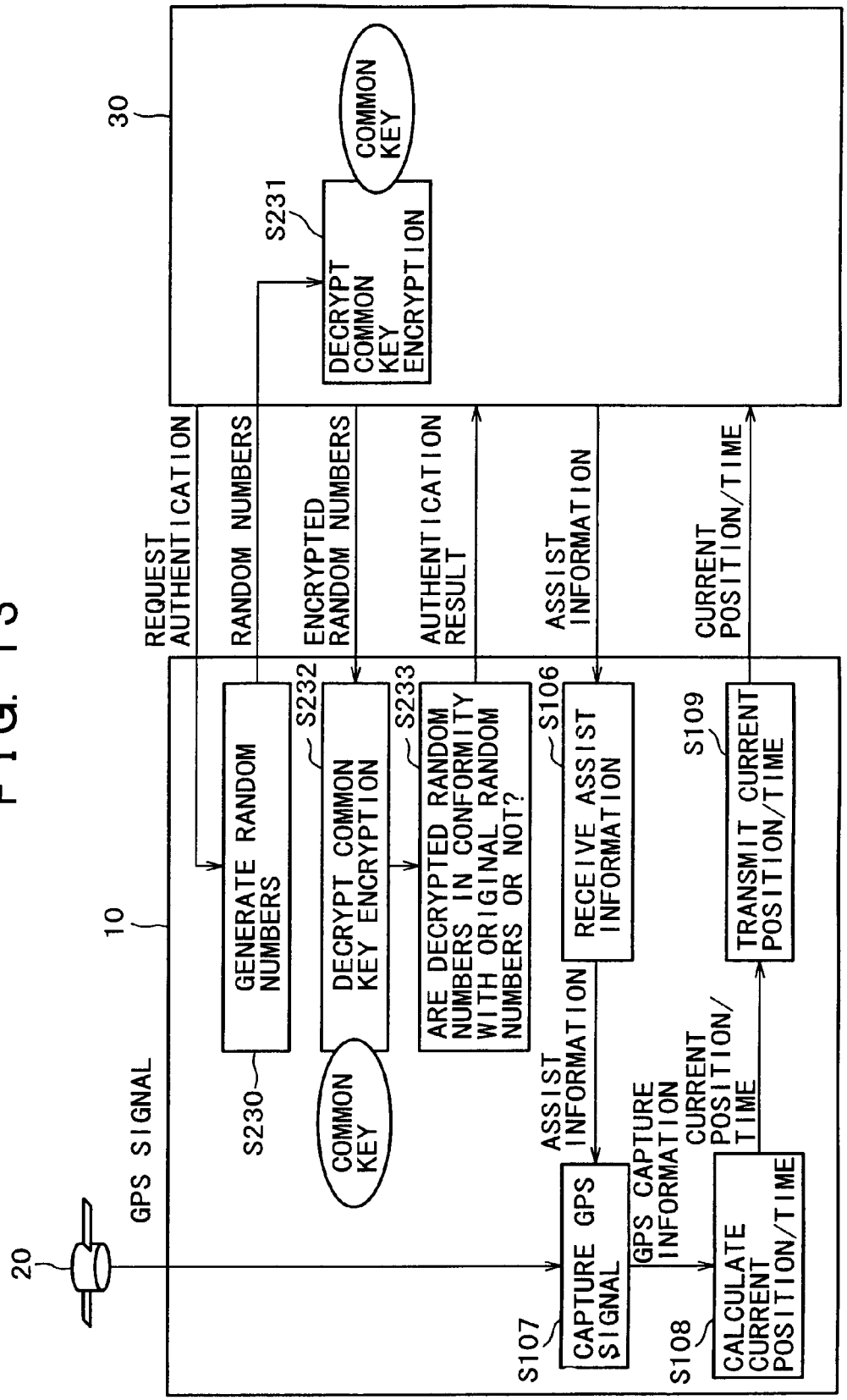
FIG. 13 is a schematic representation for explaining a fifth exemplary process performed between the portable phone and the server apparatus in the information provision system.

Next, a fifth exemplary process as shown in FIG. 13 will be described according to an example of preferred embodiment of the present invention in which the authentication is carried out between the portable phone terminal 10 and the server apparatus 30 by means of a common key encryption system. In the description of this example, a procedure of an authentication step is specific and other steps are equivalent to those in the first exemplary process. Therefore, the description of those equivalent steps will not be repeated and the same reference numerals as in FIG. 8 will be used in FIG. 13.

In the fifth exemplary process as shown in FIG. 13, when the server apparatus 30 transmits a request for starting the authentication (an authentication request) to the portable phone terminal 10, the portable phone terminal 10 which has received the authentication request generates random numbers to be transmitted to the server apparatus 30. Upon reception of the random numbers transmitted from the portable phone terminal 10, the server apparatus 30 encrypts the random numbers by means of a common key predetermined between the portable phone terminal 10 and itself, that is the common key and transmits the encrypted random numbers to the portable phone 10 (reference to step S231).

Next, the portable phone terminal 10 receives the random numbers encrypted by the server apparatus 30 and decrypts them by means of the common key (reference to step S232). Then, the portable phone 10 determines whether the random numbers transmitted from the server apparatus 30 are in conformity with the original random numbers generated in step S230. As a result of the determination, if they are in conformity with each other the authentication is considered permitted, and if they are not, it is not considered permitted, to thereby transmit the result of authentication to the server apparatus 30 (reference to step S233).

As described above, in this example of preferred embodiment of the present invention, the random numbers generated on the portable phone terminal side are compared with the results which the server apparatus 30 has encrypted the random numbers, so that whether the server apparatus 30 has the same common key as the common key carried by the portable phone terminal 10 is determined, thereby authenticating legitimacy of whether the server apparatus 30 is the counterpart for connection. The common key may be stored in advance in the ROM 110, the RAM 111, or the non-volatile memory 112 provided for the portable phone terminal 10. Further, on the server apparatus 30 side, the same common key as the common key carried by the portable phone terminal 10 may be stored beforehand in the RAM 201, ROM 202, or the HDD 203.

In this example of preferred embodiment of the present invention, although the portable phone terminal 10 performs the process of generating random numbers and the authentication process by determining whether the encrypted random numbers are in conformity with the original random numbers, these processes may be carried out on the server apparatus 30 side in order for the server apparatus 30 to authenticate the legitimacy whether the portable phone terminal 10 is the counterpart for connection. Further, the so-called mutual authentication may be easily realized by performing both authentication on the portable phone terminal 10 side and the authentication on the server apparatus 30 side.

Sixth Example of Process

Figure 14:
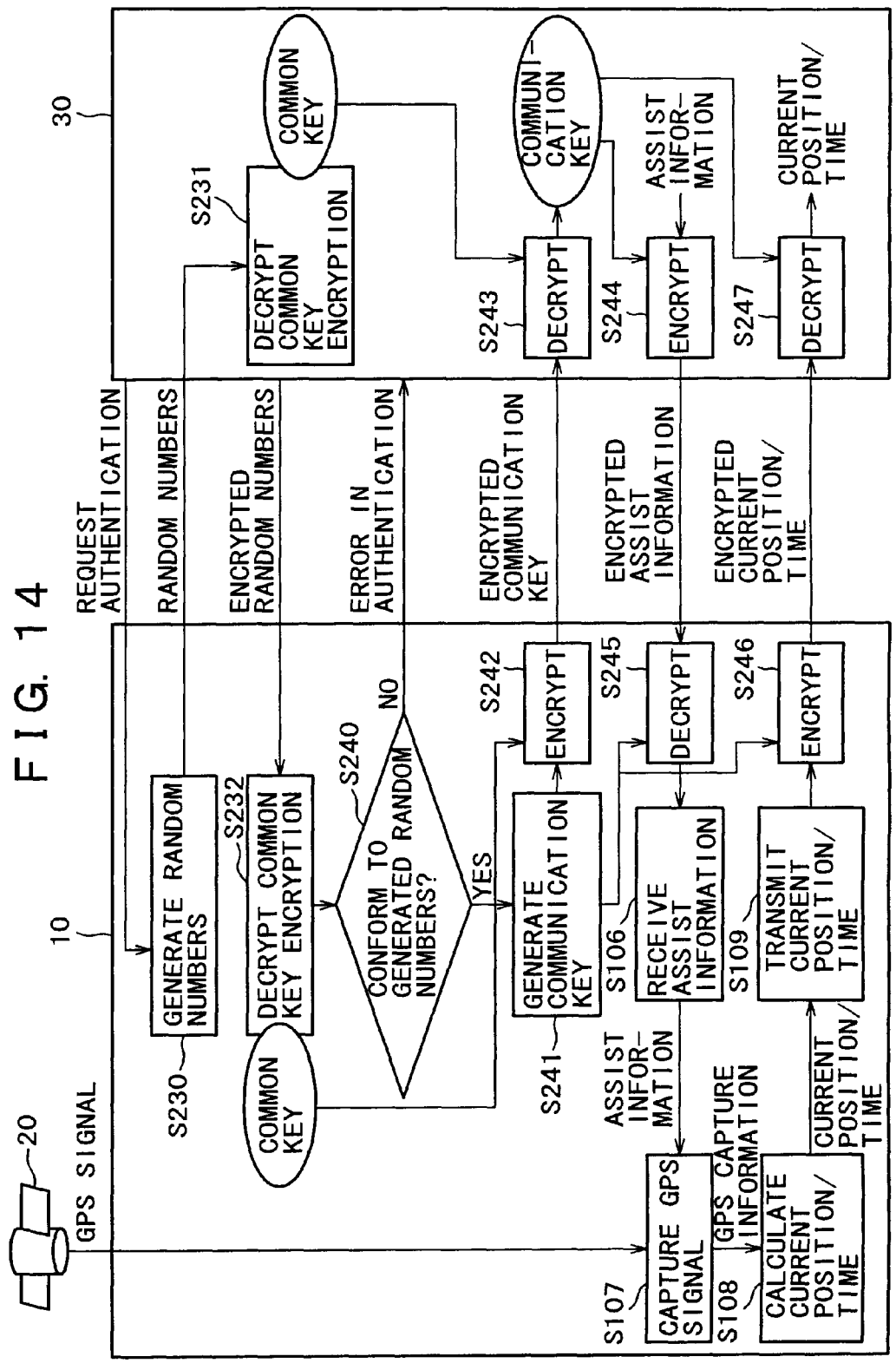
FIG. 14 is a schematic representation for explaining a sixth exemplary process performed between the portable phone and the server apparatus in the information provision system.

Next, a sixth exemplary process as shown in FIG. 14 will be described according to an example of preferred embodiment of the present invention in which encryption is carried out when the assist information and the information indicative of the position and the time are communicated in addition to the authentication by means of the common key encryption system as described in the fifth exemplary process. In this example of preferred embodiment of the present invention, compared with the fifth exemplary process as shown in FIG. 13, steps subsequent to the decryption in step S232 are characteristic.

In the sixth exemplary process, subsequent to the decryption in step S232, then in step S240 the portable phone terminal 10 determines whether the random numbers transmitted from the server apparatus 30 are in conformity with the original random numbers generated in step S230. As a result of the determination, if they are not in conformity with each other, i.e., they do not match, the authentication is not considered permitted, then a message "error in authentication" is transmitted indicating the result to the server apparatus 30. If they are in conformity with each other, a communication key is generated by means of the CPU 107 provided in the portable phone terminal 10, for example, the authentication circuit, or the encryption circuit (reference to step S241). As for the communication key, any key may be applicable if it can be used when encrypting information communicated between the portable phone terminal 10 and the server apparatus 30. For example, it may be generated in a predetermined procedure according to the random numbers generated in advance.

After encrypting the communication key by means of the common key in step S242, the portable phone terminal 10 transmits the encrypted communication key to the server apparatus 30. Next, in step S243 the server apparatus 30 receives the encrypted communication key from the portable phone terminal 10 and decrypts it by means of the common key so as to acquire the communication key. Then, in step S244 the server apparatus 30 encrypts the assist information by means of the communication key when transmitting the assist information to the portable phone terminal 10.

On the other hand, upon reception of the encrypted assist information, the portable phone terminal 10 decrypts it by means of the communication key so as to extract the assist information (reference to step S245). Subsequent to step S106 in the portable phone 10, the extracted assist information of plain text is employed.

Further, in step S109 when transmitting the information related to the position and the time from the portable phone terminal 10, the information is encrypted by means of the communication key generated in step S241 and the encrypted information is transmitted to the server apparatus 30 (reference to step S246). Upon reception of the encrypted information related to the position and the time, the server apparatus 30 decrypts the information by means of the communication key acquired in step S243 and extracts the information related to the position and the time of the portable phone 10 (reference to step S247).

As described above, in this example of preferred embodiment of the present invention, not only the authentication for the server apparatus 30 is performed on the portable phone terminal 10 side but also the information data communicated between the portable phone terminal 10 and the server apparatus 30 are transmitted/received in an encrypted form, whereby these information data may be prevented from being intercepted and leaked by a third party who is not targeted by the user and may be communicated more safely.

Seventh Example of Process

Figure 15:
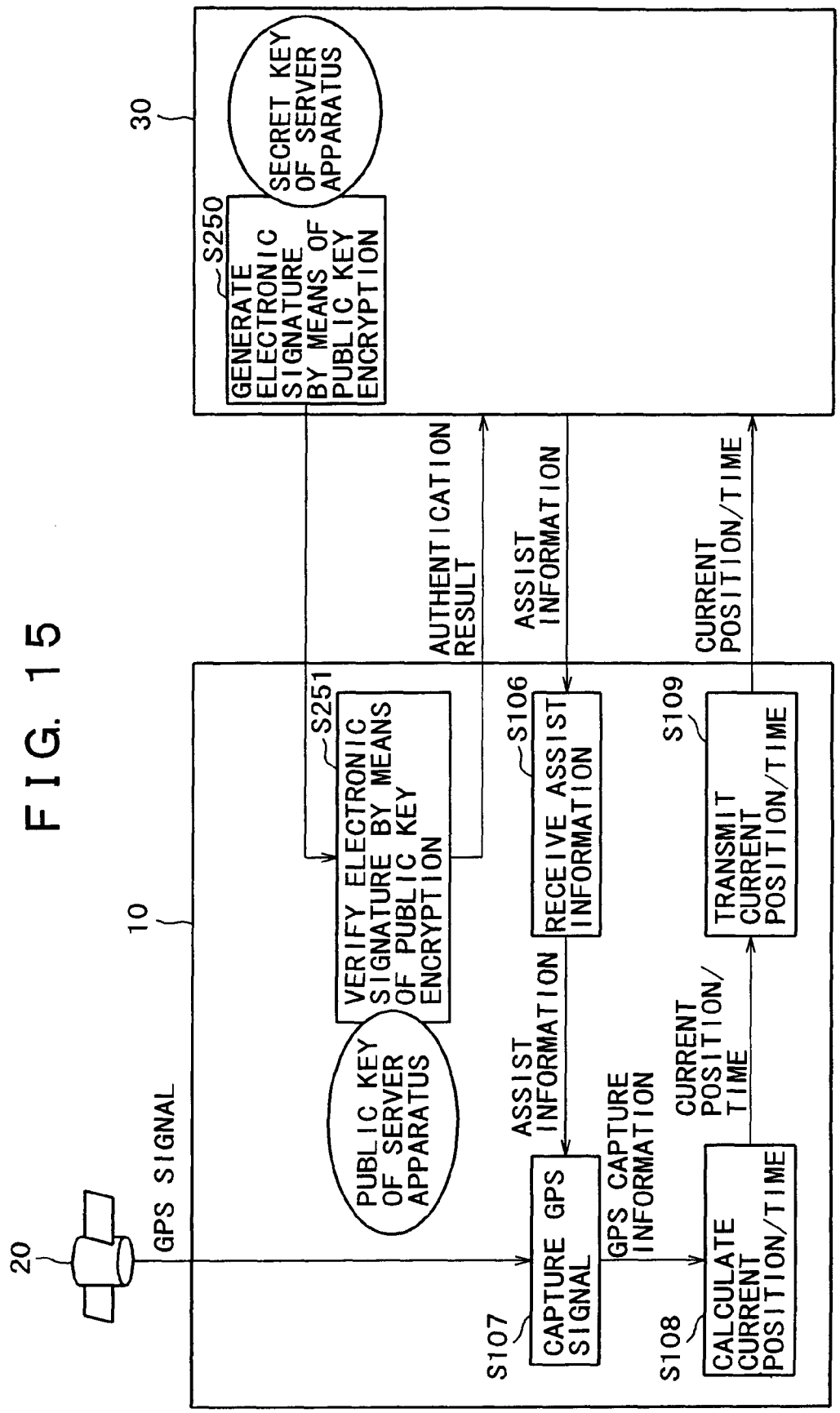
FIG. 15 is a schematic representation for explaining a seventh exemplary process performed between the portable phone and the server apparatus in the information provision system.

Next, a seventh exemplary process as shown in FIG. 15 will be described according to an example of preferred embodiment of the present invention in which authentication is carried out between the portable phone terminal 10 and the server apparatus 30 by means of the public key encryption system. In the description of this example, a procedure of an authentication step is specific and other steps are equivalent to those in the first exemplary process. Therefore, the description of those equivalent steps will not be repeated and the same reference numerals as in FIG. 8 will be used in FIG. 15.

In the seventh exemplary process as shown in FIG. 15, when starting an authentication process in the case where the server apparatus 30 acquires information related to the current position from the portable phone terminal 10, identification information identifying the server apparatus 30, for example, is encrypted by means of a secret key of the server apparatus 30 itself so as to generate an electronic signature which is transmitted together with the original identification information to the portable phone terminal 10 (reference to step S250).

Next, the portable phone terminal 10 receives the information transmitted from the server apparatus 30 and acquires the public key of the server apparatus 30 according to the identification information included in the received information. Then the portable phone terminal 10 verifies the electronic signature by means of the public key of the server apparatus 30 so as to confirm the original identification information. When the electronic signature is successfully verified, the received information is authenticated that it has been reliably transmitted from the server apparatus 30. When the electronic signature is not verified by means of the public key of the server apparatus 30, it is determined that the transmitter of the received information is not the server apparatus 30 and the authentication is not permitted. Then, the portable phone 10 transmits the result of authentication to the server apparatus 30 (reference to step S251).

As described above, the authentication may be carried out between the portable phone terminal 10 and the server apparatus 30 by communicating the electronic signature by means of the public key encryption system.

It should be understood that when the portable phone terminal 10 acquires the public key of the server apparatus 30, the portable phone terminal 10 may store public keys therein corresponding to a plurality of server apparatuses for connection, for example, and choose a public key to be used according to the received identification information for certifying the electronic signature out of the stored public keys. Further, by means of the network function of the portable phone 10, for example, another information processing apparatus connected to the communication network 40 may be inquired for the public key of the server apparatus 30 so as to acquire the public key from the information processing apparatus.

When the public keys are held within the portable phone terminal 10, as a number of the server apparatuses for connection increases, a memory area for storing the public keys increases. However, it is not necessary to inquire other information processing apparatuses for the public keys, the authentication process may be carried out at a relatively high rate. When asking other information processing apparatuses for the public keys, it needs time by as much as a number of the enquires, but it is not necessary to hold many public keys within the portable phone terminal 10, thereby performing the authentication process among many counterparts for connection with a small memory capacity. Combining these, it is possible that public keys of high frequency of usage are stored within the portable phone terminal 10 so as to inquire for external information processing apparatuses as needed.

Eighth Example of Process

Now, further developing the structure of the seventh exemplary process, the eighth exemplary process capable of providing severer encryption and more reliably performing authentication will be described with reference to FIG. 16.

Figure 16:
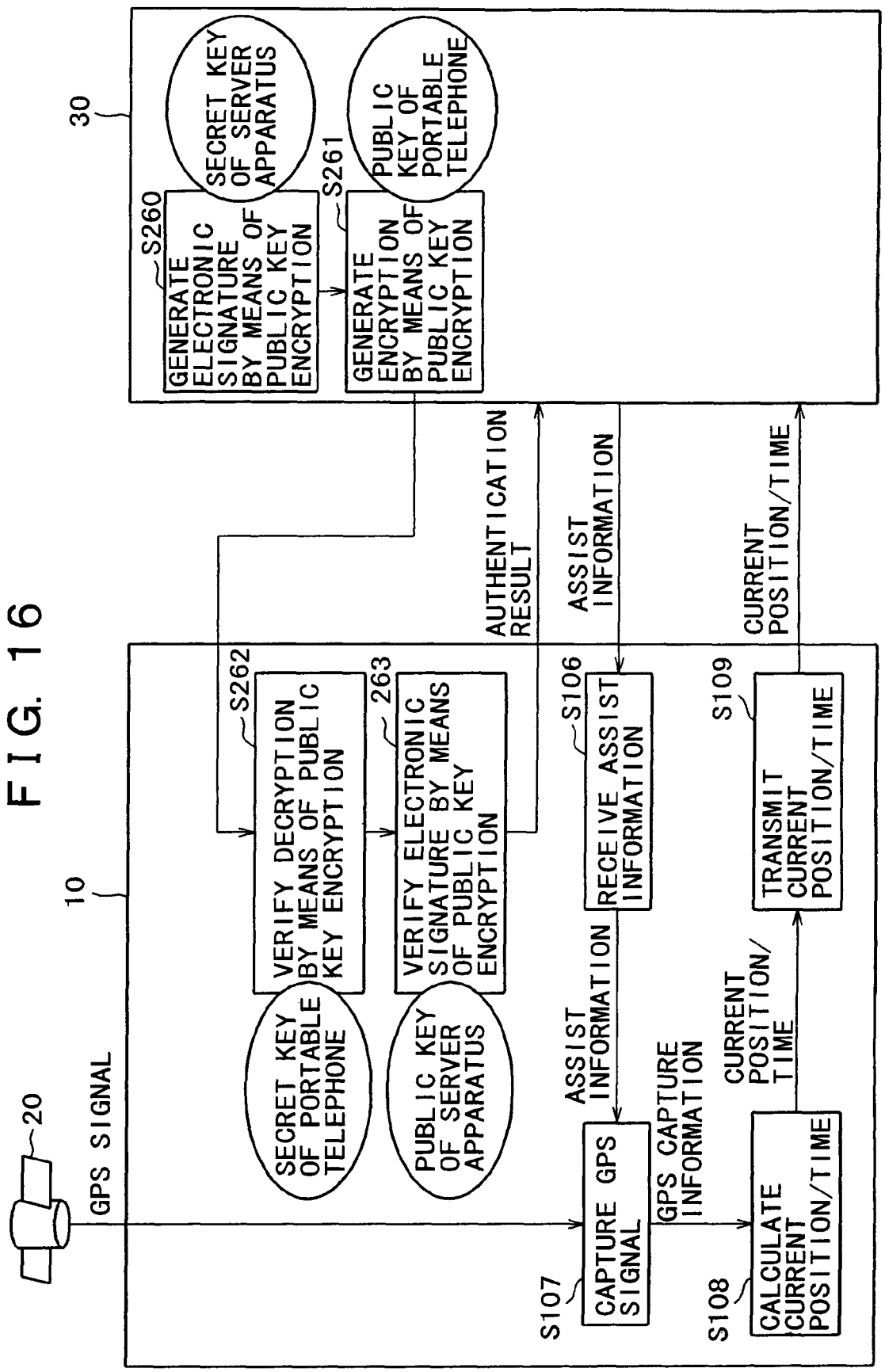
FIG. 16 is a schematic representation for explaining an eighth exemplary process performed between the portable phone and the server apparatus in the information provision system.

In the eighth exemplary process, as shown in FIG. 16, when starting an authentication process in the case where the server apparatus 30 acquires information related to current position from the portable phone terminal 10, the predetermined identification information identifying the server apparatus 30, for example, is encrypted by means of the secret key of the server apparatus 30 itself so as to generate an electronic signature which is attached to the original identification information (reference to step S260). Subsequently, in step S260, for the information generated by means of the process, the server apparatus 30 performs an encryption process by means of the public key of the portable phone terminal 10 for connection, then transmit the result to the portable phone terminal 10 (reference to step S261).

Upon reception of the encrypted information from the server apparatus 30, the portable phone terminal 10 decrypts the information by using a secret key of the portable phone terminal 10 itself (reference to step S262). Then, based on identification information included in the information encrypted through the process in step S262, portable phone 10 acquires the public key of the server apparatus 30. After verifying the electronic signature by means of the public key of the server apparatus 30, the portable phone terminal 10 determines whether it matches the original identification information. When the electronic signature is successfully verified, the received information is authenticated that it has been reliably transmitted from the server apparatus 30. When the electronic signature is not verified by means of the public key of the server apparatus 30, it is determined that the transmitter of the received information is not the server apparatus 30 and the authentication is not permitted. Then, the portable phone terminal 10 transmits the result of authentication to the server apparatus 30 (reference to step S263).

In this example of preferred embodiment of the present invention, since the information including the electronic signature of the server apparatus 30 is encrypted by means of the public key of the portable phone terminal 10, the electronic signature of the server apparatus 30 may not be detected even if the communication route between the portable phone terminal 10 and the server apparatus 30 is intercepted by a third party. Therefore, the fact that the server apparatus 30 has requested the portable phone 10 for the authentication is not leaked to the third party.

In this example of preferred embodiment of the present invention, encryption according to the public encryption system is carried out twice so that a very secure encryption may be applied. Further, since the authentication is carried out by means of both secret keys of the portable phone terminal 10 and the server apparatus 30, both the portable phone terminal 10 and the server apparatus 30 may specify respective counterparts, to thereby realize the so-called mutual authentication.

Ninth Example of Process

Figure 17:
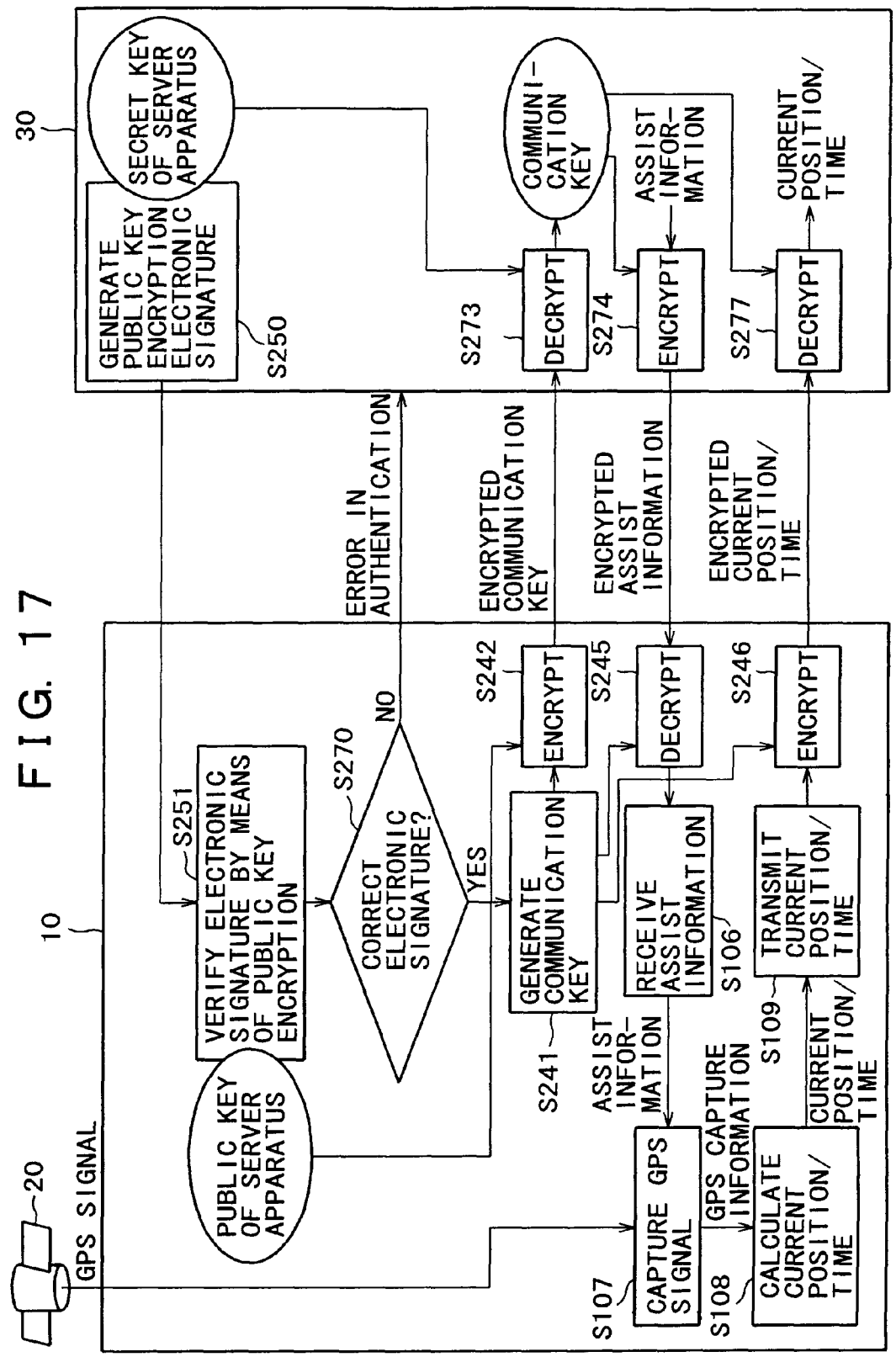
FIG. 17 is a schematic representation for explaining a ninth exemplary process performed between the portable phone and the server apparatus in the information provision system.

Next, a ninth exemplary process as shown in FIG. 17 will be described according to an example of preferred embodiment of the present invention in which encryption is carried out when the assist information and the information indicative of the position and the time are communicated in addition to the authentication by means of the public key encryption system as described in the seventh exemplary process. In this example of preferred embodiment of the present invention, compared with the seventh exemplary process as shown in FIG. 15, steps subsequent to the verification of the electronic signature in step S251 are characteristic.

In the ninth exemplary process, subsequent to the verification of the electronic signature in step S251, then in step S270 as shown in FIG. 17 the process determines whether the electronic signature acquired from the server apparatus 30 is legitimate. As a result of the determination, if it is not legitimate, the authentication is not considered permitted, to thereby transmit a message "error in authentication" indicating the result to the server apparatus 30. As the result of the determination, if the electronic signature is legitimate, a communication key is generated by means of the CPU 107, the authentication circuit, or the encryption circuit provided for the portable phone terminal 10 (reference to step S271). As for the communication key, any key may be applicable if it can be used when encrypting information communicated between the portable phone terminal 10 and the server apparatus 30. For example, according to a predetermined procedure, it may be generated every time a communication route to a counterpart for connection is established (that is, for each session).

After encrypting the communication key by means of the public key of the server apparatus in step S272, the portable phone terminal 10 transmits the encrypted communication key to the server apparatus 30. Next, in step S273, the server apparatus 30 receives the encrypted communication key from the portable phone terminal 10 and decrypts it by means of the secret key of the server apparatus 30 itself so as to acquire the communication key. Then, in step S274 the server apparatus 30 encrypts the assist information by means of the communication key when transmitting the assist information to the portable phone terminal 10.

On the other hand, upon reception of the encrypted assist information, the portable phone terminal 10 decrypts it by means of the communication key so as to extract the assist information (reference to step S275). Subsequent to step S106 in the portable phone 10, the extracted assist information of plain text is employed.

Further, in step S109 when transmitting the information related to the position and the time from the portable phone terminal 10, the information is encrypted by means of the communication key generated in step S271 and the encrypted information is transmitted to the server apparatus 30 (reference to step S276). Upon reception of the encrypted information related to the position and the time, the server apparatus 30 decrypts the information by means of the communication key acquired in step S273 and extracts the information related to the position and the time of the portable phone 10 (reference to step S277).

As described above, in this example of preferred embodiment of the present invention, not only the information data communicated when performing the authentication but also other information data communicated between the portable phone terminal 10 and the server apparatus 30 are transmitted/received in an encrypted form, whereby these information data may be prevented from being intercepted and leaked by a third party who is not targeted by the user and may be communicated more safely.

Tenth Example of Process

Figure 18:
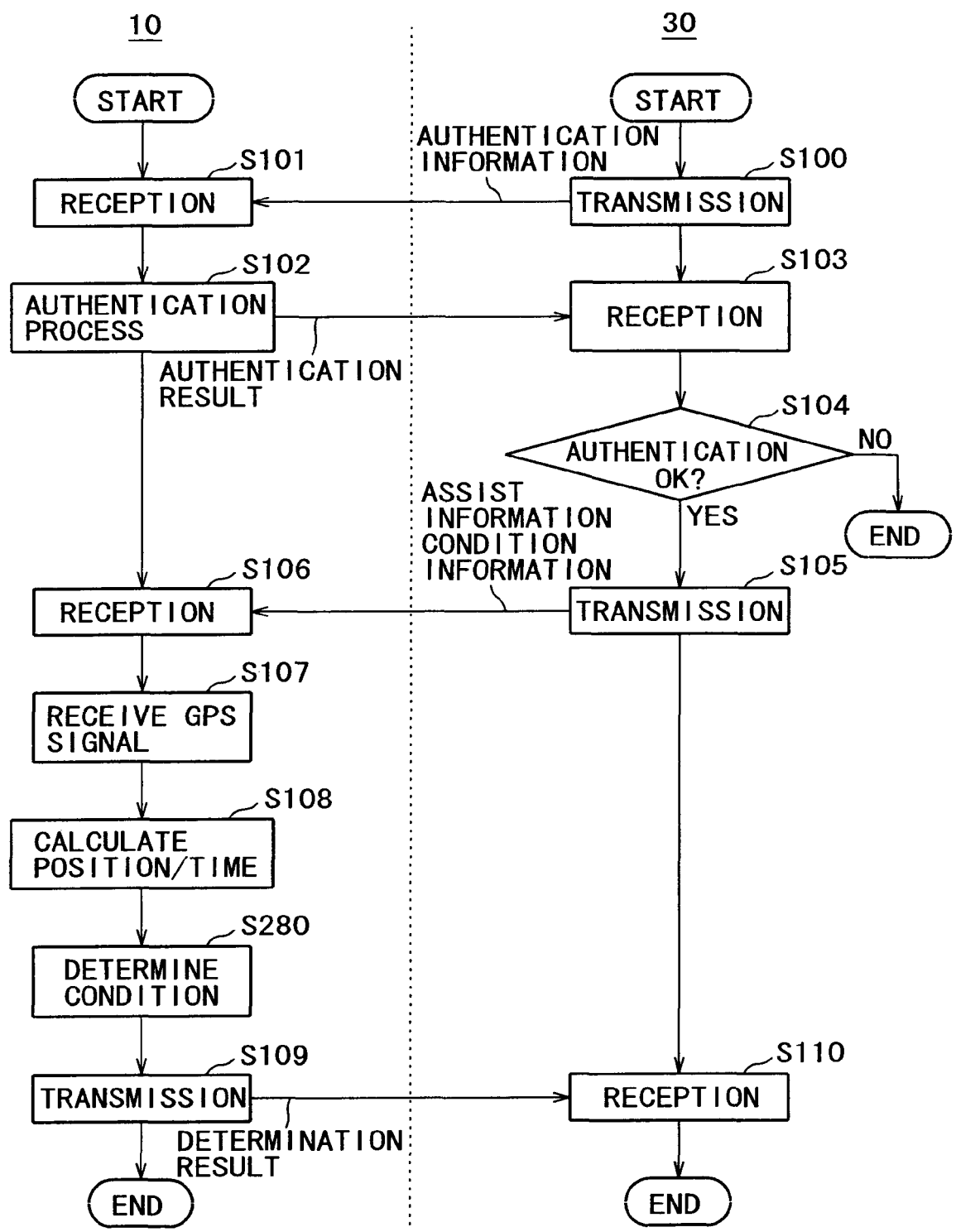
FIG. 18 is a flow chart for explaining a tenth exemplary process performed between the portable phone and the server apparatus in the information provision system.

Next, based on the first example of process there is described an example in which only a result of judging a predetermined condition transmitted from the server apparatus 30 is transmitted, without transmitting the information directly indicative of the current position and the current time from the portable phone terminal 10 to the server apparatus 30, with reference to the flow chart as shown in FIG. 18. Since the tenth exemplary process is different from the first exemplary process only in that a resulting judgment of a predetermined condition is transmitted to the server apparatus 30, the description of steps equivalent to the first exemplary process will not be repeated and the same reference numerals will be used in FIG. 18.

In the tenth exemplary process, as shown in FIG. 18, if the authentication is permitted by a process of step S100 through step S104, then in step S105 the server apparatus 30 transmits condition information indicative of a predetermined condition related to the position and the time together with the assist information to the portable phone terminal 10. By means of a process of step S106 through step S108, the portable phone terminal 10 calculates the current position and the current time of the portable phone terminal 10, then in step S280 judges the condition by means of the CPU 107, for example, according to the condition information acquired from the server apparatus 30.

The condition information indicative of "the predetermined condition related to the position and the time" is, for example, position information indicating a predetermined position range such as "a range within a predetermined radius about predetermined latitude and longitude", "inside of a circle having a diameter between two points which are represented by predetermined latitudes and longitudes" etc., time information indicating a predetermined date or time, or a combination of the position information and the time information.

In step S280, it is determined whether the position and the time calculated from the GPS signal are in conformity with the condition included in the condition information acquired from the server apparatus 30. Next, in step S109 the portable phone terminal 10 transmits the result of determination from step S280 that is the information indicative of whether the current position or the current time matches the condition to the server apparatus 30. Then the server apparatus 30 receives the information (the result of determination) in step S110 and knows whether the portable phone terminal 10 matches the condition information or whether it exists at a predetermined time and in a predetermined position range.

As described above, in this example of preferred embodiment of the present invention, without transmitting the information directly indicative of the current position and the current time of the portable phone terminal 10 to the server apparatus 30, only the result of determination with respect to the condition related to the position and the time from the server apparatus 30 is transmitted. Therefore, in this example, while preventing the information from being leaked to a third party by performing the authentication process, inquiries from the server apparatus 30 may be responded without transmitting the current position and the current time which are of high accuracy capable of specifying the user's activity precisely to the server apparatus 30.

Thus, according to this example, the current position and the current time of the portable phone terminal 10 are prevented from being specified by the server apparatus 30 at an unnecessarily high accuracy, to thereby effectively protect privacy of the user of the portable phone terminal 10.

In the following, a particular example in which the information provision service 1 with respect to this example is employed will be described. For example, we assume that a supervisor inquires the server apparatus 30 where his or her junior staff carrying the portable phone terminal 10 is. In this case, when the server apparatus 30 transmits a position range indicating "the vicinity of the office" as the condition information to the portable phone 10, if the staff carrying the portable phone terminal 10 is in a position in conformity with the condition, a result indicating the fact may be acquired by the server apparatus 30 so that the supervisor may presume that the staff is in the office. On the other hand, if the staff is not in the vicinity of the office, a result indicating that the condition has not been satisfied may be acquired by the server apparatus 30, however the place where the staff is currently cannot be known to the supervisor, to thereby protect privacy of the staff who has not come to the office.

Eleventh Example of Process

Figure 19:
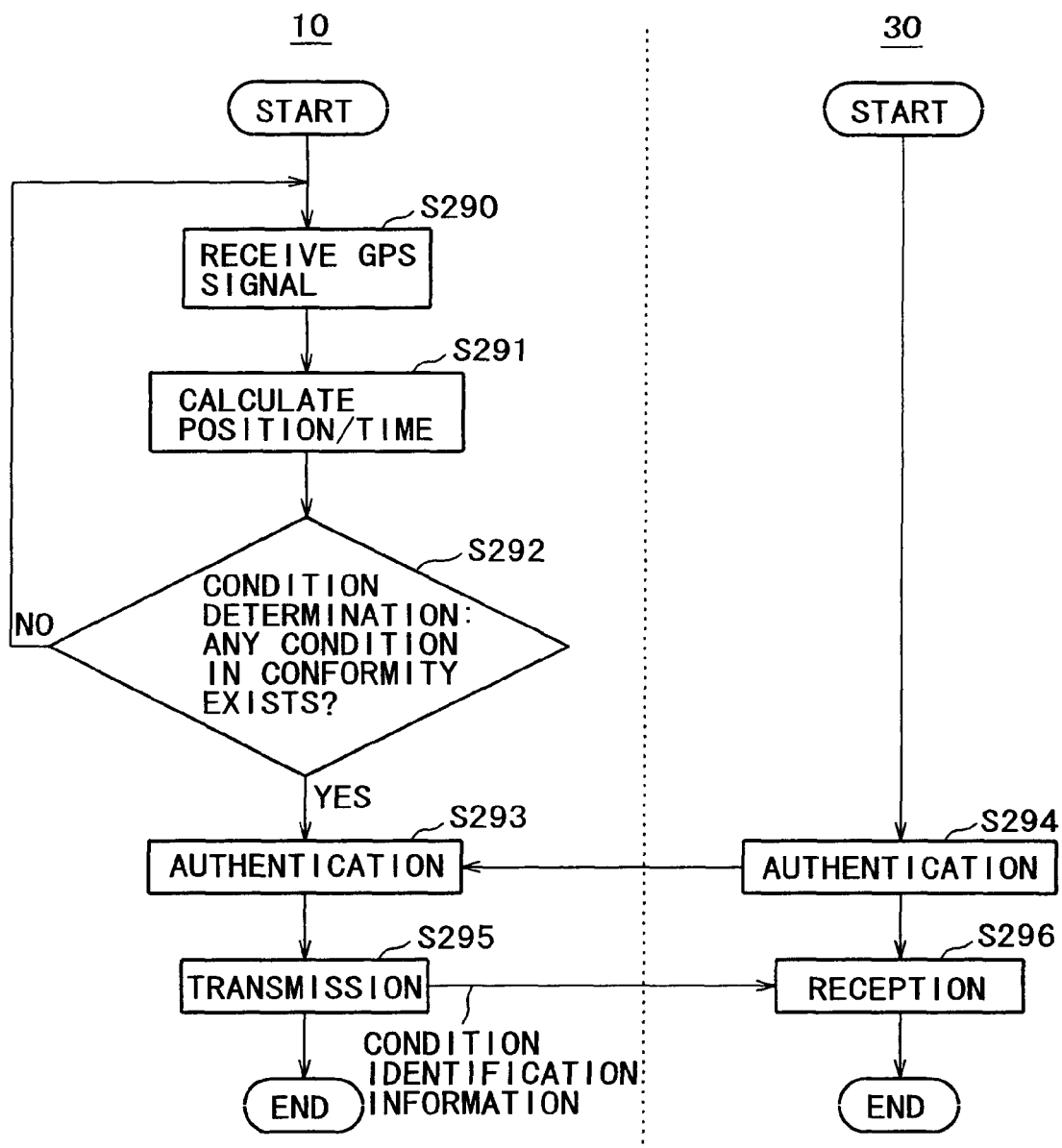
FIG. 19 is a flow chart for explaining an eleventh exemplary process performed between the portable phone and the server apparatus in the information provision system.

Next, an eleventh exemplary process illustrating an example in which a process is carried out when the condition information as described above in the tenth exemplary process is stored in advance within the portable phone terminal 10 will be described with reference to the flow chart as shown in FIG. 19.

Figure 20:
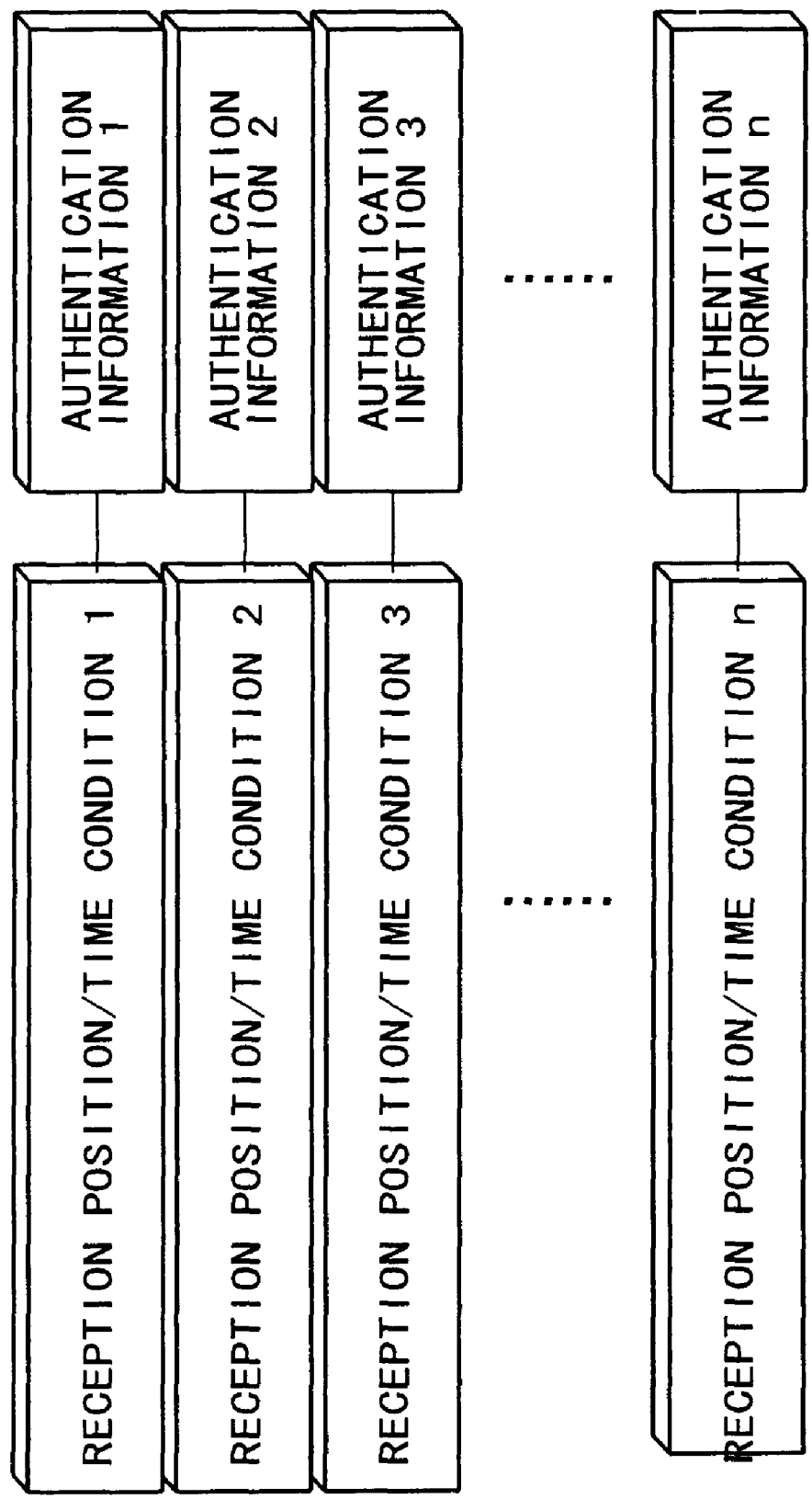
FIG. 20 is a schematic representation for explaining condition information used for the eleventh exemplary process performed between the portable phone and the server apparatus in the information provision system.

In the eleventh example, as shown in FIG. 19, we assume that the portable phone terminal 10 repeats a process of receiving the GPS signal and calculating the current position and the current time at predetermined time intervals and that the condition information as shown in FIG. 20 is held in advance within the portable phone terminal 10. As shown in FIG. 20 the condition information is held within the portable phone terminal 10, the condition information including one or more information data that is a combination of a position/time condition having position information indicating a predetermined position range, time information indicating a predetermined date or a time, or combined information of the position information and the time information, and authentication information necessary for authentication process carried out between the portable phone terminal 10 and a counterpart for connection corresponding to each position/time condition.

The condition information is stored in the ROM 110, the RAM 111, or the non-volatile memory 112 provided for the portable phone terminal 10.

In the eleventh exemplary process, in step S290 the portable phone terminal 10 receives the GPS signal by means of the GPS antenna 113 and captures the GPS signal based on the assist information by means of the GPS signal reception section 114. We assume that in this example of preferred embodiment of the present invention the assist information is held in advance within the portable phone terminal 10. Then, in step S291 the portable phone 10 performs the modulation process for the GPS signal captured by the GPS signal reception section 114 so as to calculate the current position and the current time.

Next, in step S292 the portable phone terminal 10 refers to the condition information by means of the CPU 107, for example, so as to determine whether there is a condition in conformity with the current position and the current time. As a result of the determination, when there is no condition in conformity with them, after waiting a predetermined period the process returns to step S290 and repeats the reception process of the GPS signal and the calculation process of the position and the time at regular time intervals. On the other hand, when there is a condition in conformity with them, the process goes to step S293.

In step S293 the portable phone terminal 10 refers to the condition information so as to acquire the authentication information corresponding to the condition in conformity with them in the determination process of step S292 and performs the authentication process between the portable phone terminal 10 and the server apparatus 30 by means of the authentication information.

A process, corresponding to the authentication process, on the server apparatus 30 side is shown in step S294 of FIG. 19. The authentication process carried out between the portable phone terminal 10 and the server apparatus 30 in step S293 and step S294 is not particularly limited in terms of its procedure and may be performed according to any one of the authentication processes in the above described exemplary processes or a combination of the authentication processes in the above described exemplary processes.

The authentication process in the portable phone terminal 10 is realized in such a way that the CPU 107 provided for the portable phone terminal 10 performs a variety of calculation processes. The portable phone terminal 10 may include an authentication circuit or a DSP (Digital Signal Processor) dedicated to the authentication process so as to perform the authentication process by means of the authentication circuit or the DSP. Similarly, the authentication process in the server apparatus 30 is realized in such a way that the CPU 200 provided for the server apparatus 30 performs a variety of calculation processes. Further, the server apparatus 30 may include the authentication circuit or the DSP (Digital Signal Processor) dedicated to the authentication process so as to perform the authentication process by means of the authentication circuit or the DSP.

When the authentication process between the portable phone terminal 10 and the server apparatus 30 is permitted, in step S295 the portable phone terminal 10 transmits condition identification information for identifying the condition in conformity with them determined in step S292 to the server apparatus 30. Then, in step S296 the portable phone terminal 10 receives the condition identification information transmitted from the server apparatus 30 and knows which condition matches the portable phone terminal 10 according to information included in the condition identification information.

As described above, in this example of preferred embodiment of the present invention, when the portable phone terminal 10 notifies the server apparatus 30 that the portable phone terminal 10 matches the predetermined condition related to the position and the time, the condition information held within the portable phone terminal 10 is referred to. Thus, the user of the portable phone terminal 10 may easily confirm the condition information by displaying it on the LCD 109, for example. Further, it is easy to realize operations such as registering only a condition desired by the user as the condition information and deleting a condition that the user does not desire from the condition information.

Thus, in this example of preferred embodiment of the present invention the information related to the position and the time may be prevented from being transmitted to the server apparatus 30 against the user's intention so as to protect personal information for specifying the user's activity and provide user's sense of ease when receiving services related to the position and the time.

In the following, a particular example using the information provision service 1 according to this example will be described. For example, we assume that the user of the portable phone terminal 10 acquires special sale information with respect to a predetermined store A.

In this case, a combination of a position range of "within a radius of 10 m around the store A" and the authentication information for authenticating the portable phone terminal 10 and the server apparatus providing special sale information at the store A is registered as a previously registered condition information in the portable phone terminal 10, for example. In this situation, when the user carrying the portable phone terminal 10 moves to the vicinity of the store A, the portable phone 10 judges that a condition related to the store A has been in conformity with the condition information and performs authentication between the portable phone terminal 10 and a predetermined server apparatus according to the authentication information so as to transmit the condition identification information indicating the conformity with the condition related to the store A to the server apparatus.

Then, the server apparatus transmits the special sale information related to the store A to the portable phone terminal 10 according to the received condition identification information, whereby the user of the portable phone terminal 10 may know the information related to the store A by just approaching the store A. Further, for example, a service may be provided in such a way that the server apparatus transmits information related to a coupon ticket to be used in the store A to the portable phone terminal 10 so that the portable phone terminal 10 having the coupon ticket displayed thereon is presented to a salesperson of the store A so as to enjoy a discount service in the store A.

Twelfth Example of Process

Figure 21:
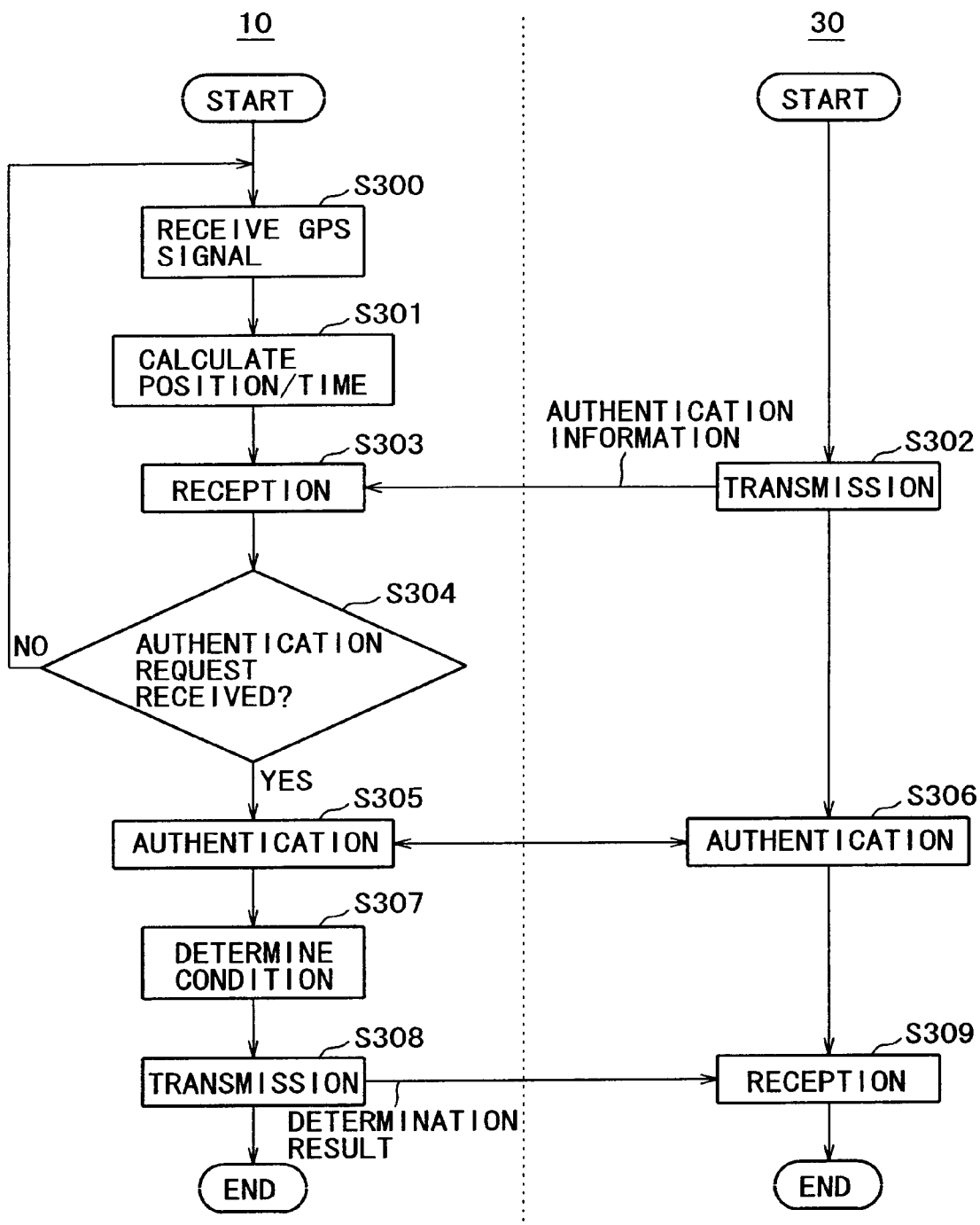
FIG. 21 is a flow chart for explaining a twelfth exemplary process performed between the portable phone and the server apparatus in the information provision system.

Next, a twelfth exemplary process according to a preferred embodiment of the present invention illustrating an example in which a process is carried out when the condition information as shown in FIG. 20 is held in advance within the portable phone terminal 10 will be described with reference to the flow chart as shown in FIG. 21. In the twelfth exemplary process, as shown in FIG. 21, we assume that the process of receiving the GPS signal so as to calculate the current position and the current time is repeated by the portable phone terminal 10 at regular time intervals.

In the twelfth exemplary process, in step S300 the portable phone terminal 10 receives the GPS signal by means of the GPS antenna 113 and captures the GPS signal based on the assist information by means of the GPS signal reception section 114. We assume that in this example of preferred embodiment of the present invention the assist information is held in advance within the portable phone terminal 10. Then, in step S301 the portable phone 10 performs the modulation process for the GPS signal captured by the GPS signal reception section 114 so as to calculate the current position and the current time.

Assuming that the server apparatus 30 starts the process of acquiring information related to the position and the time from the portable phone terminal 10, and the authentication information is transmitted to the portable phone 10 as shown in step S302, the portable phone terminal 10 receives the authentication information in step S303.

Next, in step S304 the portable phone terminal 10 determines, by means of the CPU 107, for example, whether the authentication information has been received. As a result of the determination, when it has not been received, after waiting a predetermined period the process returns to step S300 and repeats the reception of the GPS signal and the calculation of the position and the time at regular time intervals. When it has been received, the process goes to step S305.

In step S305 the portable phone terminal 10 performs the authentication process between the portable phone terminal 10 and the server apparatus 30 according to the received authentication information. A process, corresponding to the authentication process, on the server apparatus 30 side is shown in step S306 of FIG. 21. The authentication process carried out between the portable phone terminal 10 and the server apparatus 30 in step S305 and step S306 is not particularly limited in terms of its procedure and may be performed according to any one of the authentication processes in the above described exemplary processes or a combination of the authentication processes in the above described exemplary processes.

When the authentication process between the portable phone terminal 10 and the server apparatus 30 is permitted, in step S307 the portable phone terminal 10 refers to the condition information by means of the CPU 107, for example, to thereby acquire a condition related to the position and the time corresponding to the received authentication information and determine whether the current position and the current time are in conformity with the condition.

Next, in step S308 the portable phone terminal 10 transmits the result of determination from step S307 that is the information indicative of whether the current position or the current time matches the condition to the server apparatus 30. Then the server apparatus 30 receives the information (the result of determination) in step S309 and knows whether the portable phone terminal 10 matches the condition information or whether it exists at a predetermined time and in a predetermined position range.

As described above, in this example of preferred embodiment of the present invention, without transmitting the information directly indicative of the current position and the current time of the portable phone terminal 10 to the server apparatus 30, only the information indicative of the result of determination with respect to the condition related to the position and the time from the server apparatus 30 is transmitted. Therefore, in this example of preferred embodiment of the present invention, while preventing the information from being leaked to a third party by performing the authentication process, enquiries from the server apparatus 30 may be responded without transmitting the current position and the current time which are of high accuracy capable of specifying the user's activity in detail to the server apparatus 30.

Thus, according to this example, the current position and the current time of the portable phone terminal 10 are prevented from being specified by the server apparatus 30 at an unnecessarily high accuracy, to thereby effectively protect privacy of the user of the portable phone terminal 10.

In this example of preferred embodiment of the present invention, when the portable phone terminal 10 notifies the server apparatus 30 that the portable phone terminal 10 matches the predetermined condition related to the position and the time, the condition information held within the portable phone terminal 10 is referred to. Thus, the user of the portable phone terminal 10 may easily confirm the condition information by displaying it on the LCD 109, for example. Further, it is easy to realize operations such as registering only a condition desired by the user as the condition information and deleting a condition that the user does not desire from the condition information.

Thus, in this example of preferred embodiment of the present invention the information related to the position and the time may be prevented from being transmitted to the server apparatus 30 against the user's intention so as to protect personal information for specifying the user's activity and provide user's sense of ease when receiving services related to the position and the time.

Thirteenth Example of Process

Figure 22:
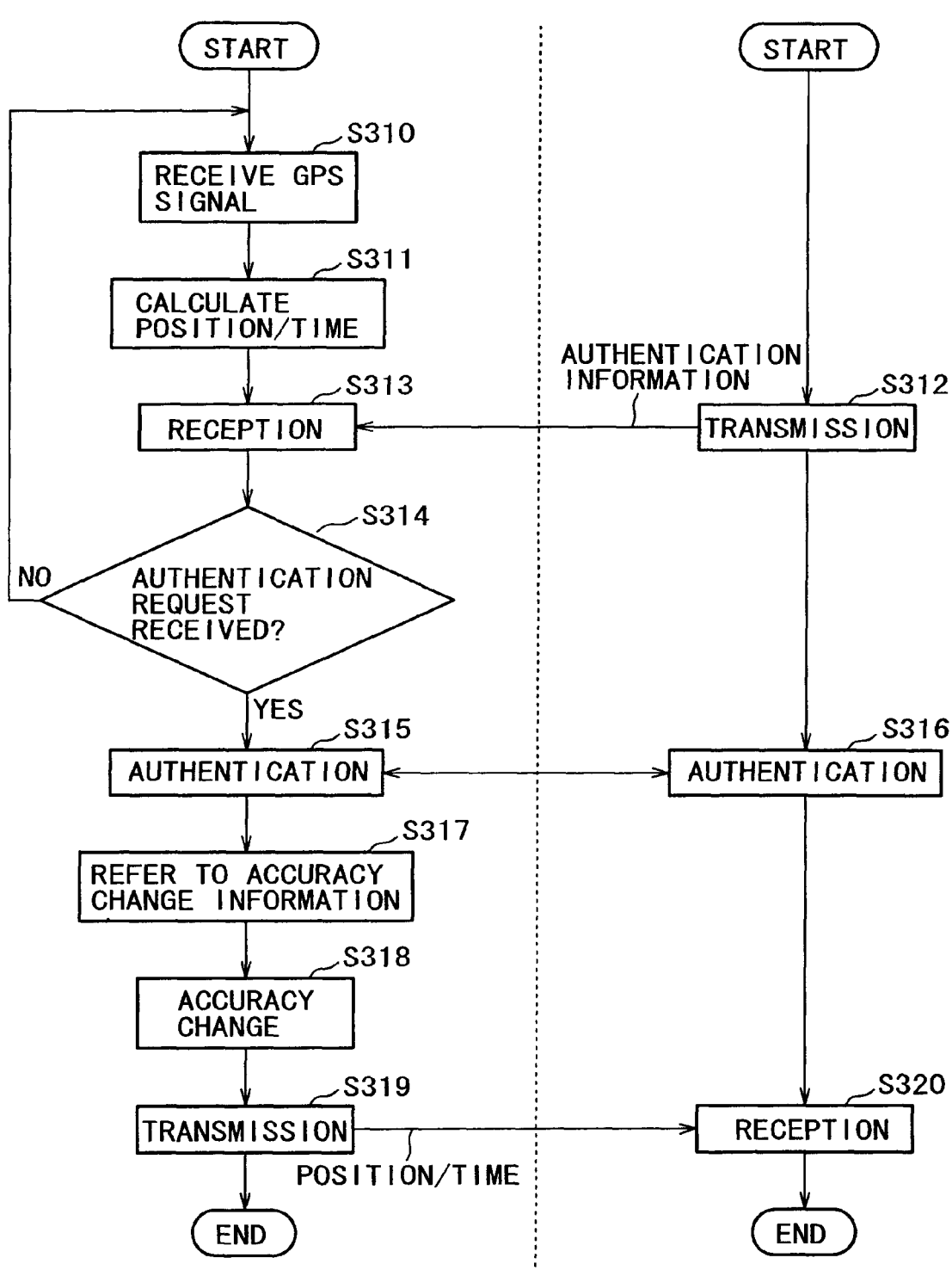
FIG. 22 is a flow chart for explaining a thirteenth exemplary process performed between the portable phone and the server apparatus in the information provision system.

Next, a thirteenth exemplary process according to a preferred embodiment of the present invention illustrating an example in which accuracy of the information related to the position and the time transmitted from the portable phone terminal 10 to the server apparatus 30 is changed will be described with reference to the flow chart as shown in FIG. 22.

In the thirteenth exemplary process, as shown in FIG. 22, we assume that the portable phone terminal 10 repeats a process of receiving the GPS signal and calculating the current position and the current time at predetermined time intervals and that the accuracy changing information as shown in FIG. 23 is held in advance within the portable phone terminal 10. In this example of preferred embodiment of the present invention, as shown in FIG. 23 the accuracy changing information is held within the portable phone terminal 10, the accuracy changing information including one or more information data that is a combination of authentication information necessary for authentication carried out between the portable phone terminal 10 and a server apparatus for connection and accuracy information set to each counterpart for connection. The accuracy information is information for designating accuracy of the information related to the position and the time when transmitted. The accuracy changing information is stored in the ROM 110, the RAM 111, or the non-volatile memory 112 provided for the portable phone terminal 10.

In the thirteenth exemplary process, in step S310 the portable phone terminal 10 receives the GPS signal by means of the GPS antenna 113 and captures the GPS signal based on the assist information by means of the GPS signal reception section 114. We assume that in this example of preferred embodiment of the present invention the assist information is held in advance within the portable phone terminal 10. Then, in step S311 the portable phone 10 performs the modulation process for the GPS signal captured by the GPS signal reception section 114 so as to calculate the current position and the current time.

Assuming that the server apparatus 30 starts the process of acquiring information related to the position and the time from the portable phone terminal 10, and the authentication information is transmitted to the portable phone 10 as shown in step S312, the portable phone terminal 10 receives the authentication information in step S313.

Next, in step S314 the portable phone terminal 10 determines, by means of the CPU 107, for example, whether the authentication information has been received. As a result of the determination, when it has not been received, after waiting a predetermined period the process returns to step S310 and repeats the reception of the GPS signal and the calculation of the position and the time at regular time intervals. When it has been received, the process goes to step S315.

In step S315 the portable phone terminal 10 performs the authentication process between the portable phone terminal 10 and the server apparatus 30 according to the received authentication information. A process, corresponding to the authentication process, on the server apparatus 30 side is shown in step S316 of FIG. 22. The authentication process carried out between the portable phone terminal 10 and the server apparatus 30 in step S315 and step S316 is not particularly limited in terms of its procedure and may be performed according to any one of the authentication processes in the above described exemplary processes or a combination of the authentication processes in the above described exemplary processes.

When the authentication process between the portable phone terminal 10 and the server apparatus 30 is permitted, in step S317 the portable phone terminal 10 refers to the accuracy changing information by means of the CPU 107, for example, to thereby acquire the received accuracy information corresponding to the authentication information. Then, in step S318 the portable phone terminal 10 performs an accuracy (precision) changing process for the current position and the current time calculated by the CPU 107 in step S311, for example.

Next, in step S319, the portable phone terminal 10 transmits the position and the time having their accuracy changed in step S318 to the server apparatus 30. Then, in step S320 the server apparatus 30 receives the position and the time of the portable phone terminal 10.

As described above, in this example of preferred embodiment of the present invention, the server apparatus 30 is authenticated whether it is a legitimate counterpart for connection. Accuracy of the position and the time calculated based on the GPS signal is transmitted to the server apparatus, after being changed for each server apparatus for connection with reference to the accuracy changing information.

At present the current position acquired by means of the GPS function is calculated very precisely on the order of from tens of meters to a few meters. Thus, a problem arises in that if the calculated current position information of high accuracy is transmitted as it is to the server apparatus 30, the behavior of the user carrying the portable phone terminal 10 may be specified at an unnecessarily high accuracy.

However, in this example of preferred embodiment of the present invention, as described above the accuracy may be changed and transmitted for each server apparatus for connection. For example, according to employing services or reliabilities of server apparatuses for connection, the information related to the position and the time may be transmitted with high accuracy or degraded information related to the position and the time may be transmitted.

In this example of preferred embodiment of the present invention, the example of process in which, with reference to the accuracy changing information, the accuracy is changed according to the received authentication information has been described. However, the procedures are not particularly limited if the accuracy of the position and the time can be transmitted to the server apparatus after the accuracy is changed in response to the user's requests or according to the server apparatus for connection.

In this example of preferred embodiment of the present invention, it has been described that the CPU 107 changes the accuracy, however, but it may be changed when the GPS signal reception section 114 calculates the position and the time from the GPS signal, the portable phone terminal 10 may include a circuit dedicated to calculation for changing the accuracy of the position and the time.

Further, particular methods for changing the accuracy may be, for example, performing a so-called round-down process or truncation process of a value of the information indicating the position and the time, adding or subtracting a useless or meaningless value to or from the value in order to increase inaccuracy.

Fourteenth Example of Process

Figure 24:
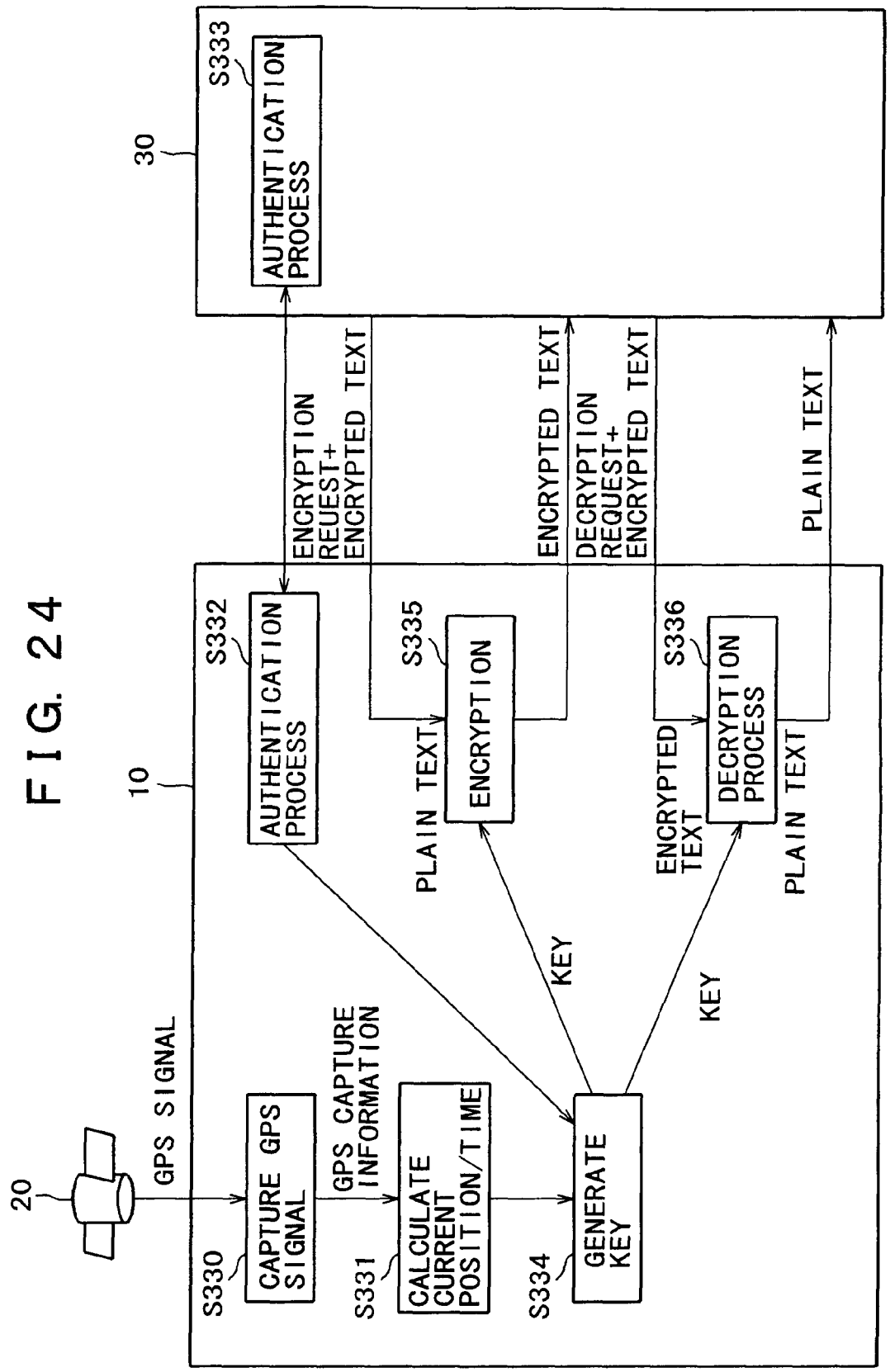
FIG. 24 is a schematic representation for explaining a fourteenth exemplary process performed between the portable phone and the server apparatus in the information provision system.

Next, a fourteenth exemplary process according to a preferred embodiment of the present invention in which the information communicated between the portable phone terminal 10 and the server apparatus 30 is encrypted or decrypted by means of an entirely new system will be described with reference to the schematic representation as shown in FIG. 24. The schematic representation of FIG. 24 centrally and schematically shows a procedure carried out in the portable phone 10. In the following, we assume that the communication route is established between the portable phone terminal 10 and the server apparatus 30 via the communication base station 50 and the communication network 40 so that a variety of information data may be communicated between the portable phone terminal 10 and the server apparatus 30. Further, hereafter, only characteristic features when performing encryption and decryption will be described and illustrated.

In this situation, in step S330 as shown in FIG. 24 the portable phone terminal 10 receives the GPS signal by means of the GPS antenna 113 and captures the GPS signal based on the assist information by means of the GPS signal reception section 114. We assume that in this example of preferred embodiment of the present invention the assist information is held in advance within the portable phone terminal 10. However, we may assume that the assist information is acquired from the server apparatus 30 similar to the processes as described above.

Then, in step S331 the portable phone terminal 10 performs the modulation process for the GPS signal captured by the GPS signal reception section 114 so as to calculate the current position and the current time. It should be understood that the calculation may be carried out by the GPS signal reception section 114 or the GPS signal reception section 114 may output the GPS capture information so as to perform the calculation by means of according to on the GPS capture information.

In the situation where the portable phone terminal 10 has acquired the current position and the current time by means of the GPS function as described above, when the user asks for receiving encryption services, or when the server apparatus 30 requests for performing the encryption, the portable phone terminal 10 carries out the authentication process between the portable phone terminal 10 and the server apparatus 30 in step S332. A process, on the server apparatus 30 side, corresponding to this authentication process is shown as step S333 in FIG. 24.

The authentication process carried out between the portable phone terminal 10 and the server apparatus 30 in step S332 and step S333 is not particularly limited in terms of its procedure and may be performed according to any one of the authentication processes in the above described exemplary processes or a combination of the authentication processes in the above described exemplary processes.

Upon permission of the authentication process between the portable phone terminal 10 and the server apparatus 30, in step S334 the portable phone terminal 10 generates a key to be used in the following encryption processes according to either or both of the current position and the current time calculated in step S331 and the information related to the authenticated server apparatus 30.

It should be understood that the key generating process in step S334 may be carried out by the CPU 107. If an encryption circuit dedicated to encryption is provided for the portable phone terminal 10, the encryption circuit may perform the key generating process. The procedure of generating the key based on the information related to the authenticated server apparatus 30 and either or both of the current position and the current time may be predefined between the portable phone terminal 10 and the server apparatus 30, or the server apparatus 30 may acquire the key via the communication network 40. When the key generating procedure is predefined, the generating procedure needs to be held within the portable phone terminal 10. For example, the generating procedure may be previously stored in the ROM 111, the RAM 11, the non-volatile memory 112 so as to be read by the CPU 107.

As for information used when generating the key, any information may be "the information related to the authenticated server apparatus 30" if it can be specified according to the result of authentication. For example, it may be the authentication information used for the authentication process in step S332, or the information selected from the information data previously stored within the portable phone terminal 10 according to the server apparatus specified as a result of the authentication.

In the situation where the key has been generated as described above, upon reception of a predetermined plain text from the server apparatus 30 and a request for encrypting the plain text, in step S335 the portable phone terminal 10 encrypts the received plain text by means of the key so as to generate encryption text to be transmitted to the server apparatus 30.

Further, upon receipt of a predetermined encryption text and a request for decrypting the encryption text from the server apparatus 30, in step S336 the portable phone terminal 10 decrypts the received encryption text by means of the key so as to generate plain text which is transmitted to the server apparatus 30. It should be understood that in step S336 the plain text may not be transmitted to the server apparatus 30 but merely displayed on the LSD 109 of the portable phone terminal 10.

Further, the encryption and the decryption in step S335 and step S336 may be carried out by the CPU 107. If the portable phone terminal 10 has an encryption circuit dedicated to the encryption, the encryption circuit may perform the encryption.

By performing the above processes, in the situation where when a legitimate connection with a predetermined server apparatus 30 has been established and the authentication has been carried out, only if the portable phone terminal 10 exists in a predetermined position or only if it is at a predetermined time, or only if it is in the predetermined position and at the predetermined time, the portable phone terminal 10 may carry out the encryption and decryption of the information, which allows an entirely new encryption process. There was not a conventional apparatus providing such an encryption process.

In the above described encryption process, since the encryption is carried out by means of not only the current position and the current time but also the information related to the authenticated server apparatus 30, the authentication between the portable phone terminal 10 and the server apparatus 30 needs to be permitted legitimately when encrypting or decrypting information. The authentication process may be any one of the case where the portable phone terminal 10 authenticates the server apparatus 30, the case where the server apparatus 30 authenticates the portable phone terminal 10, and the case where the portable phone terminal 10 and the server apparatus 30 mutually authenticate each other. However, by performing the authentication process including the authentication from the server apparatus 30 side, for example, in the case where a service using the above described encryption process is provided by the server apparatus 30, it is easy to specify the portable phone terminal 10 enjoying the service and charge on the enjoyed service.

Particular examples of services employing the above described encryption may be: a service where a person carrying the portable phone terminal 10 approaches a predetermined door which may be opened only if the person accesses a predetermined server apparatus 30 by means of the portable phone terminal 10; a service where a message may be decrypted only if a predetermined server apparatus 30 is accessed by means of the portable phone terminal 10 at a predetermined time; and a service where a person carrying the portable phone 10 approaches a predetermined place, a message may be decrypted only if the person accesses a predetermined server apparatus 30 by means of the portable phone terminal 10, for example, which can be easily realized.

Fifteenth Example of Process

Figure 25:
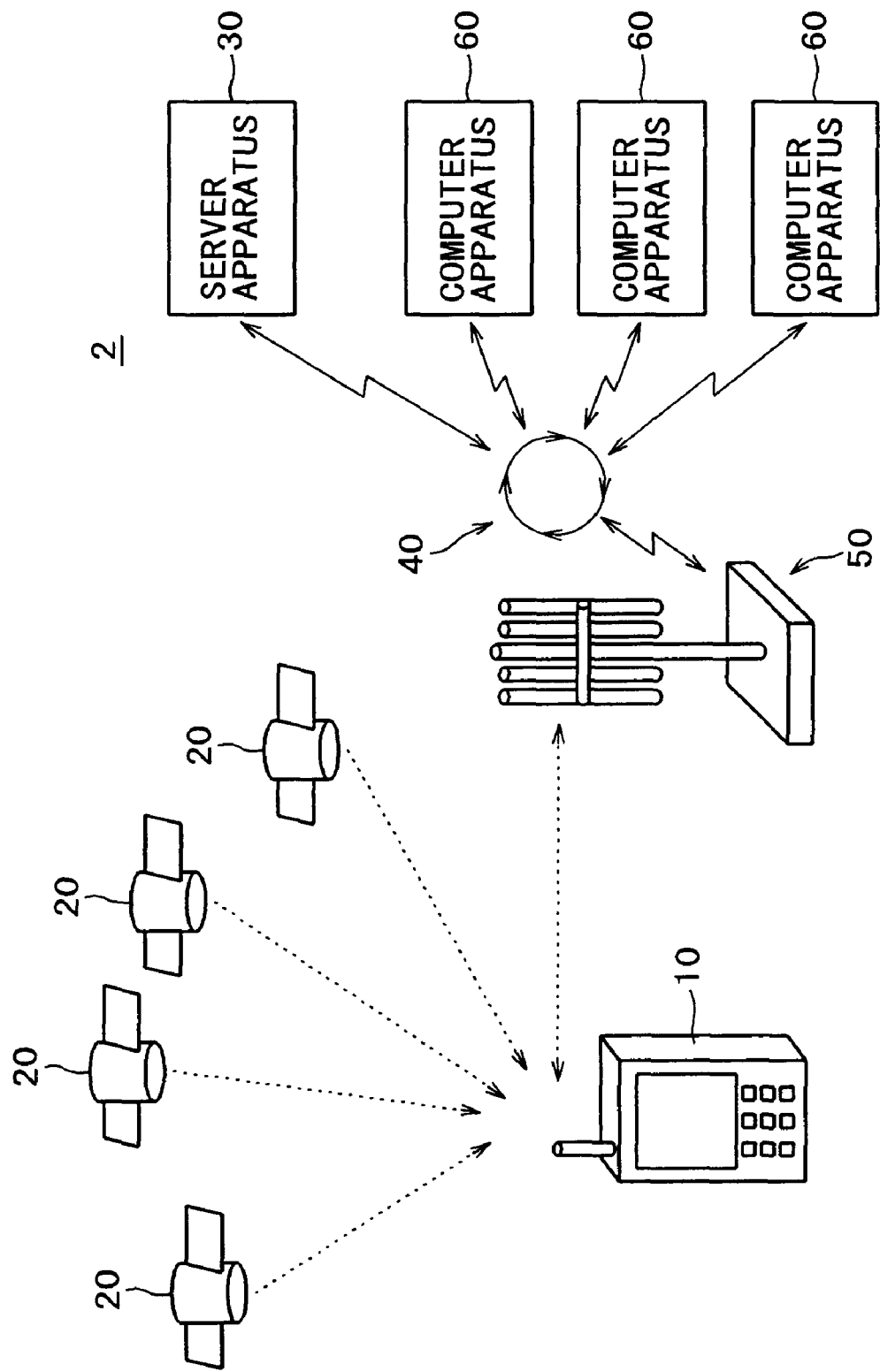
FIG. 25 is a schematic view showing another example of the information provision system realized by applying the preferred embodiment of the present invention thereto.
Figure 26:
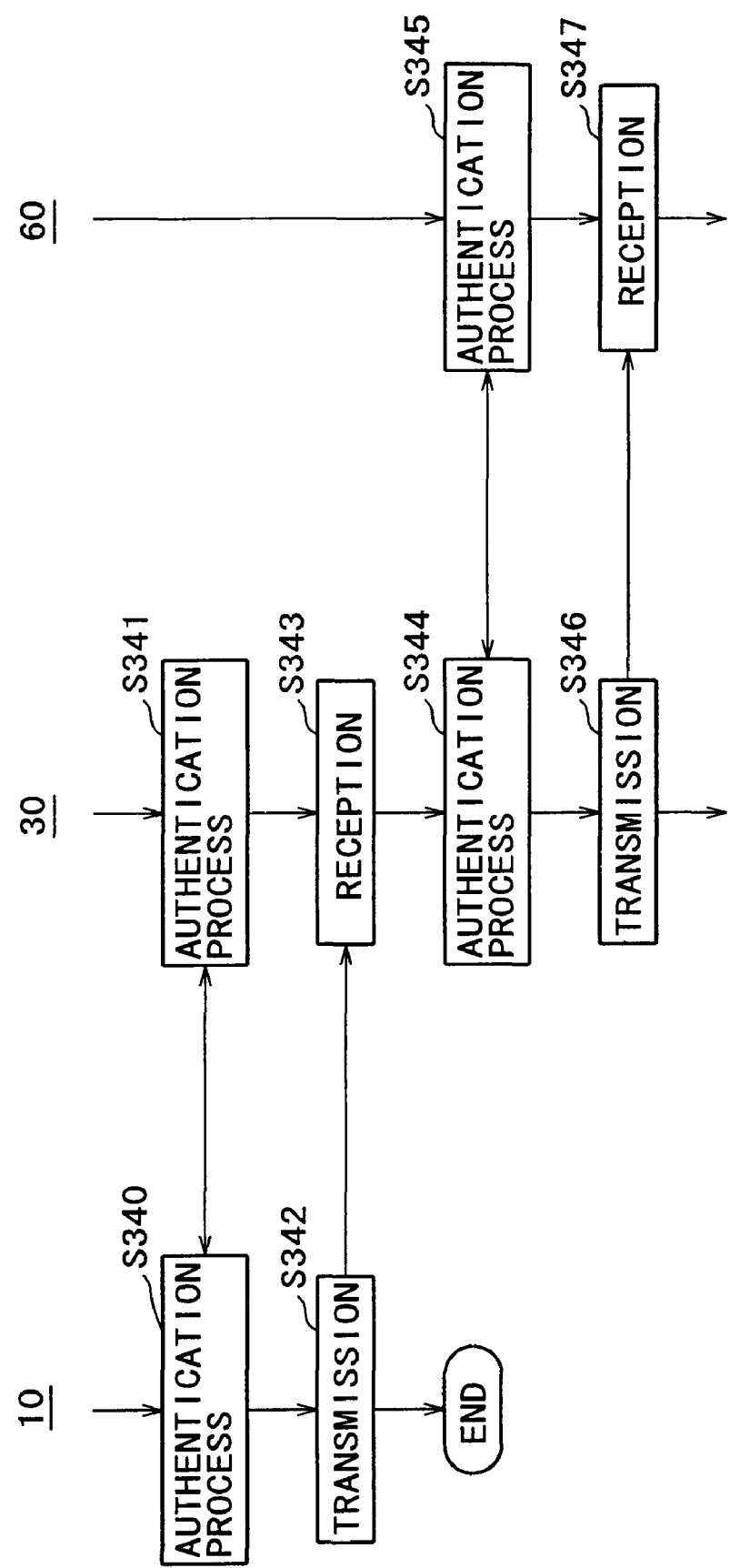
FIG. 26 is a flow chart for explaining an exemplary process performed among the portable phone, the server apparatus, and a computer apparatus in the information provision system.

Next, a fifteenth exemplary process illustrating an example according to a preferred embodiment of the present invention, in which the server apparatus 30 acquiring the position and the time from the portable phone terminal 10 is used as a so-called authentication server will be described with reference to the schematic view as show in FIG. 25 and the flow chart as shown in FIG. 26.

As shown in FIG. 25, an information provision system 2 according to this example includes a portable phone terminal 10, a plurality GPS satellites 20, a server apparatus 30 having an authentication server function, a communication network 40, a communication base station 50, and a plurality of computer apparatuses 60 which is connected with the server apparatus 30 via the communication network 40 and transmits/receives a variety of information data to/from the server apparatus 30.

In this example of preferred embodiment of the present invention, except for having the plurality of computer apparatuses 60, the structure is equivalent to that shown in FIG. 1, so that the description of equivalent portions will not be repeated and the same reference numerals will be used in FIG. 25. The computer apparatus 60 has a structure equivalent to that of the server apparatus 30 as shown in FIG. 3, and has a function where a communication route to the server apparatus 30 via the communication network 40 is established so as to transmit/receive a variety of information data to/from the server apparatus 30.

In the thus constituted information provision system 2, the portable phone terminal 10 authenticates only a predetermined server apparatus 30 set in advance to which the information related to the position and the time (position/time information) is transmitted by means of the GPS function. When trying to acquir the position/time information of the portable phone terminal 10, each computer apparatus 60 authenticates the server apparatus 30. Only if the server apparatus 30 permits the authentication, the server apparatus 30 provides the computer apparatus 60 with the position/time information of the portable phone terminal 10, In other words, the server apparatus 30 in the information provision system 2 has an intermediate server function of performing a relay process when the computer apparatus 60 acquires the position/time information of the portable phone terminal 10, or the authentication server function of representing the authentication between the computer apparatus 60 and the portable phone terminal 10. In the following, in light of the above function of the server apparatus 30, a schematic procedure where the computer apparatus 60 acquires the position/time information from the portable phone terminal 10 will be described with reference to the flow chart as shown in FIG. 26.

The server apparatus 30 in the information provision system 2 performs the authentication between the server apparatus 30 and the portable phone terminal 10 when acquiring the position/time information from the portable phone terminal 10 (reference to step S340, S341). The authentication process carried out between the portable phone terminal 10 and the server apparatus 30 as shown in step S340 and step S341 of FIG. 26 is not particularly limited in terms of its procedure and may be performed according to any one of the authentication processes in the above described exemplary processes or a combination of the authentication processes in the above described exemplary processes.

Upon permission of the authentication process between the portable phone terminal 10 and the server apparatus 30, in step S342 the portable phone terminal 10 transmits the information related to the current position and the current time (position/time information) acquired by means of the GPS function to the server apparatus 30. Then, in step S343 the server apparatus 30 receives the position/time information transmitted from the portable phone terminal 10. Then the server apparatus 30 stores and holds the received position/time information in the RAM 201, the HDD 203, for example. Further, if there is a plurality of portable phone terminal 10 for connection, information for identifying each portable phone terminal 10 may be linked to the position/time information acquired from each portable phone terminal 10 so as to be registered and stored in a database.

In the situation where the position/time information has been acquired from the portable phone terminal 10 as described above, when the computer apparatus 60 requests for acquiring the position/time information, the server apparatus 30 carries out authentication between the server apparatus 30 and the computer apparatus 60 (reference to step S344, S345). The authentication process carried out between the server apparatus 30 and the computer apparatus 60 as shown in step S344 and step S345 of FIG. 26 is not particularly limited in terms of its procedure and may be performed according to any one of the authentication processes in the above described exemplary processes or a combination of the authentication processes in the above described exemplary processes.

Upon permission of the authentication process between the server apparatus 30 and the computer apparatus 60, in step S346 the server apparatus 30 transmits the position/time information of the portable phone terminal 10 in response to a request from the computer apparatus 60. Then, in step S347 the computer apparatus 60 receives the position/time information transmitted from the server apparatus 30, so that the computer apparatus 60 may acquire the position/time information of the portable phone terminal 10. Based on the acquired position/time information, the computer apparatus 60 performs a process of providing the portable phone terminal 10 with a variety of services related to the position and the time and does a process of seeing the current position of each portable phone terminal 10 by acquiring the position/time information of a plurality of portable phone terminal 10 from the server apparatus 30 in a similar manner, for example.

The authentication process in the portable phone terminal 10, the server apparatus 30, the computer apparatus 60 is realized in such a way that a CPU provided for each apparatus performs a variety of calculation processes. Further, each apparatus may include the authentication circuit or the DSP (Digital Signal Processor) dedicated to the authentication process so as to perform the authentication process by means of the authentication circuit or the DSP.

As described above, in the information provision system 2, the counterpart to which the portable phone terminal 10 transmits the position/time information is limited to the predetermined server apparatus 30. Other computer apparatuses may acquire the position/time information of the portable phone terminal 10 by inquiring the server apparatus 30 for it. Thus, while the number of targets to be authenticated by the portable phone 10 is limited to the minimum, the server apparatus 30 functions as the authentication server and performs the relay process so as to respond to enquiries from many computer apparatuses 60.

Therefore, it is not necessary for the portable phone terminal 10 to perform authentication for each of many counterparts for connection, thereby simplifying the procedure necessary for authentication in the portable phone terminal 10. Accordingly, the computation capability and the memory capacity necessary for the portable phone terminal 10 may be reduced. Further, counterparts to which the portable phone terminal 10 transmits the position/time information are limited to the minimum, thereby considerably reducing a possibility that the position/time information may be leaked.

In the information provision system 2 according to this example, when communicating information among the portable phone terminal 10, the server apparatus 30, and the computer apparatus 60, the information may be encrypted in a similar manner that described above for other processes, to thereby improve confidentiality of the information communicated among them and more securely prevent the position/time information related to the user's personal information from being leaked.

In the information provision system 2 according to this example, the server apparatus 30 acquires the position/time information of the portable phone terminal in advance, and according to the request from the computer apparatus 60, the position/time information of the portable phone terminal 10 stored in the server apparatus 30 is transmitted to the computer apparatus 60. However, as to the information provision system 2, procedures in the portable phone terminal 10, the server apparatus 30, and the computer apparatus 60 may be modified according to a function necessary for the whole system.

For example, at the time when the server apparatus 30 is inquired by the computer apparatus 60 for the current position of a specific portable phone terminal 10, the server apparatus 30 may perform a process of acquiring the position/time information from the portable phone terminal 10 so as to transmit the acquired position/time information to the computer apparatus 60. By providing the structure, the computer apparatus 60 may acquire the current position of the specific portable phone terminal 10 in real time.

Figure 27:
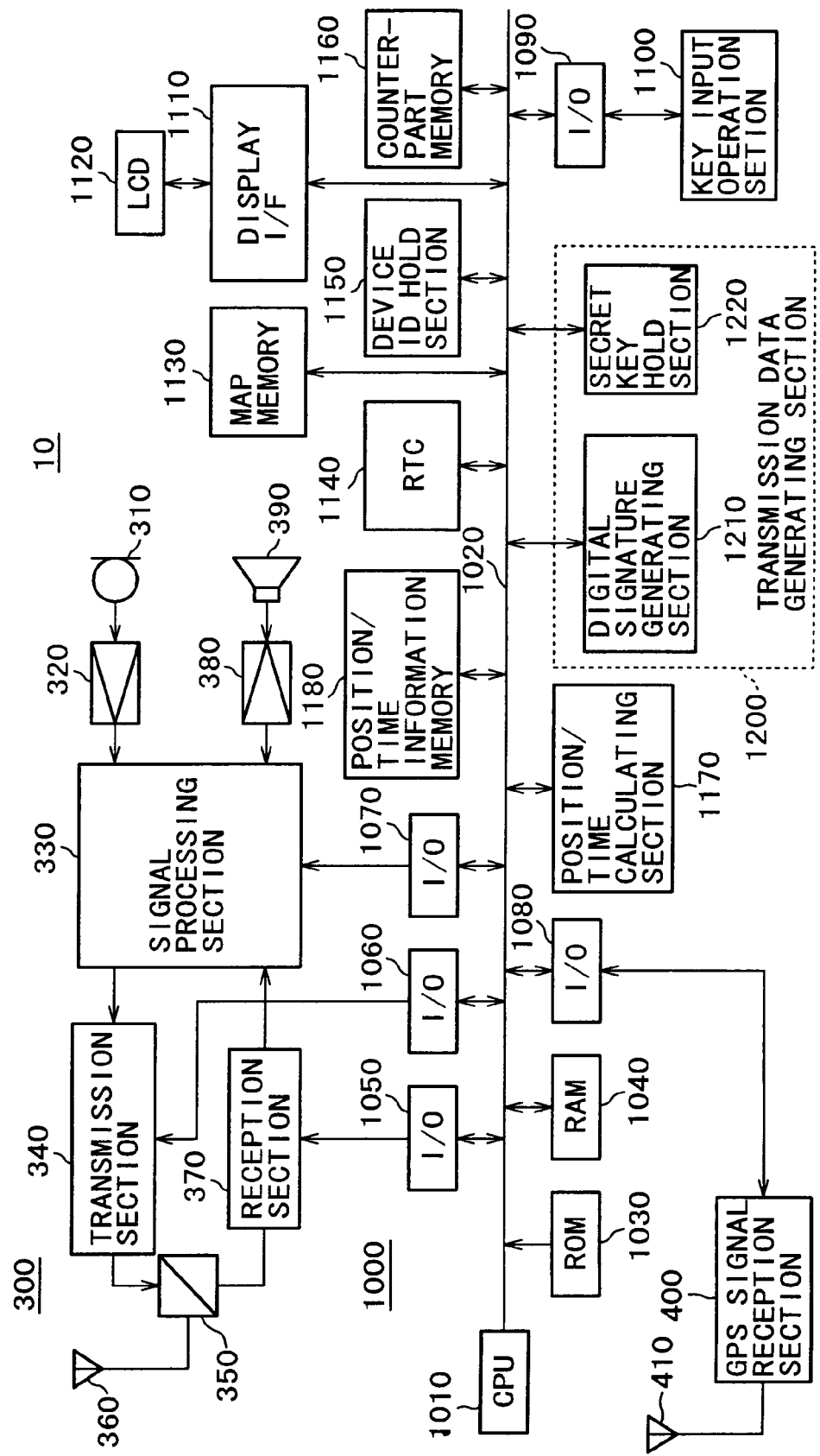
FIG. 27 is a schematic block diagram showing an example of structure for a portable phone terminal as a portable apparatus according to a first preferred embodiment with respect to authentication employing identification information of a apparatus user.

Structure of a Preferred Embodiment of the Present Invention Utilizing Authentication by Means of Identification Information for Portable Apparatus User FIG. 27 shows another structure for the portable phone terminal 100 as an example of the portable apparatus according to a preferred embodiment of the present invention.

A portable phone terminal 10 according FIG. 27 includes a telephone communication section 300, a GPS signal reception section 400, and a control section 1000 which includes a function of calculating the position/time and a function of generating transmission data to be transmitted to a server apparatus 2000.

In the telephone communication section 300, an audio signal from a microphone 310 for telephone communication is supplied to a signal processing section 330 through an amplifier 320 so as to be converted into a transmission signal by applying a digital signal processing and predetermined modulation process, for example, in the signal processing section 330. The transmission signal passes through a transmitter section 340, is supplied to an antenna 360 through a distributor 350, and is transmitted to a radio base station 2. The transmission signal passed via the radio base station 2 is transmitted through a communication network 3 to a counterpart designated by means of the portable phone terminal 300.

Further, a radio wave of a signal sent from the counterpart through the radio base station 2 is received at the antenna 360, and is supplied to the signal processing section 330 through the antenna distributor 350 and a receiver section 370, and the modulated signal is demodulated in the signal reception section 330. When the demodulated signal is the audio signal, it is converted back into an analog audio signal then supplied through the amplifier 380 to a speaker 390 where the audio signal is reproduced.

The GPS signal reception section 400 carries out a synchronizing process for an electromagnetic wave received from the GPS satellite by means of a GPS antenna 410. Information of a phase of a spread spectrum pseudo noise for a GPS satellite which has been synchronized and of a carrier frequency is supplied to the control section 1000. As will be described, in this example of preferred embodiment of the present invention, the control section 1000 includes the positioning function that may determine a position of its own machine when the GPS signal reception section 400 synchronizes electromagnetic waves from not less than four GPS satellites.

In addition, the GPS signal reception section 400 may be detachably included within the portable phone terminal 10, or may have a structure in which it is attachable to the portable phone terminal 10 with an adapter. However, in order to secure a validity of the position/time information, it is preferred that the GPS signal reception section 40 is integrated to the portable phone terminal 10.

The control section 1000 is constituted by a microcomputer, and a CPU (Central Processing Unit) 1010 is connected through a system bus 1020 to a ROM (Read Only Memory) 1030 holding programs and data therein, a RAM (Random Access Memory) 1040 for a work area, I/O ports 1050 to 1080, an interface 1090 for connecting to a key-input operating section 1100, a display interface 1110 for connecting to an LCD (Liquid Crystal Display) 1120, a map memory 1130, a clock circuit 1140, a apparatus ID holding section 1150, a counterpart memory 1160, a position/time calculation section 1170, a position/time information memory 1180, and a transmission data generating section 1200. Through the I/O ports 1050 and 1060, control signals are supplied from the reception section 37, the transmission section 340 and the control section 1000 so that communication control is carried out. Through the I/O port 1070, a control signal is supplied to the signal processing section 330 so that the signal processing section 330 is controlled.

Further, of the signals supplied to the signal processing section 330 through the reception section 370, data except the audio signal and a signal for the communication control are supplied from the signal processing section 330 to the control section 1000. Data to be transmitted, such as position/time data to be described hereafter and the signal for the communication control which are from the control section 1000 are supplied to the signal processing section 330 through the I/O port 1070 so as to be transmitted through the transmission section 340 and the antenna 360.

The phase of the spread spectrum pseudo noise of the GPS satellite, from the GPS signal reception section 400, which has been synchronously captured and the information of the carrier frequency are supplied to the control section 1000 through the I/O port 1080. The control section 1000 provides a control signal to the GPS signal reception section 400.

In the map memory 1130, a predetermined area map data is stored in advance, and through the communication network, a necessary map data such as a map data of the vicinity of a current position is downloaded and stored from a predetermined server. The map data in the map memory 1130 is read by means of the CPU 1010 following a program and data of the ROM 1030 so as to be a map displaying data, supplied to the LCD 1120 through the display interface 1110, and displayed as a map on a screen of the LCD 1120.

In the apparatus ID holding section 1150, different apparatus IDs are stored and held for different portable phone terminals 10. As for apparatus ID's of this example, controlled serial numbers are used so as to be different ID's for different apparatuses. As described above, in the preferred embodiment of the present invention related to the authentication employing the user identification information, the apparatus ID is used as a user ID, the apparatus ID is passed to a server apparatus 2000, so that the server apparatus 2000 may acknowledge from which portable phone terminal or from which user the information has been received.

In the counterpart memory 1160, besides a telephone number of the information collection server apparatus 2000, telephone numbers of the telephone counterpart registered by the user are stored. The telephone number of the server apparatus 2000, as will be described, is read automatically at a timing of informing the server apparatus 2000 of the position/time information of its own apparatus so as to be used for an auto dial.

By employing the phases of the spread spectrum pseudo noise for not less than four GPS satellites which have been synchronized by means of the GPS signal reception section 400, and the information of the carrier frequency, the position/time calculation section 1170 calculates the position of its own apparatus and the time at the moment. The position/time information acquired as the result of calculating in the position/time calculation section 117 is transmitted to the transmission data generating section 1200.

The transmission data generating section 1200 of the preferred embodiment of the present invention includes a digital signature generating section 1210 and the secret key holding section 1220. In the secret key holding section 1220, the secret key uniquely corresponding to the apparatus ID held in the apparatus ID holding section 1150, is secretly stored and held.

Under the command of the CPU 1010, the digital signature generating section 1210 digitally signs the position/time information transmitted from the position/time calculation section 1170 through the system bus 1020 by means of the secret key held in the secret key holding section 1202. The position/time information attached the digital signature thereto generated in the digital signature generating section 1210 is treated as the transmission data, delivered to the signal processing section 330 through the I/O port 1070, and transmitted to the server apparatus 2000.

The position/time information attached the digital signature thereto generated in the transmission data generating section 1200 is also stored in a position/time information memory 1180. The position/time information stored in the memory 1180 may be transmitted, at a later time, to the server apparatus 200 or the other necessary counterpart arbitrarily according to a delivery request using the key-input operating section 1100, for example.

Although not shown, the portable phone terminal 10 of this example may be connected to a personal computer through the adapter. According to instructions from the personal computer, the position/time information stored in the position/time information memory 1180 may be taken up by the personal computer at an appropriate timing.

Figure 28:
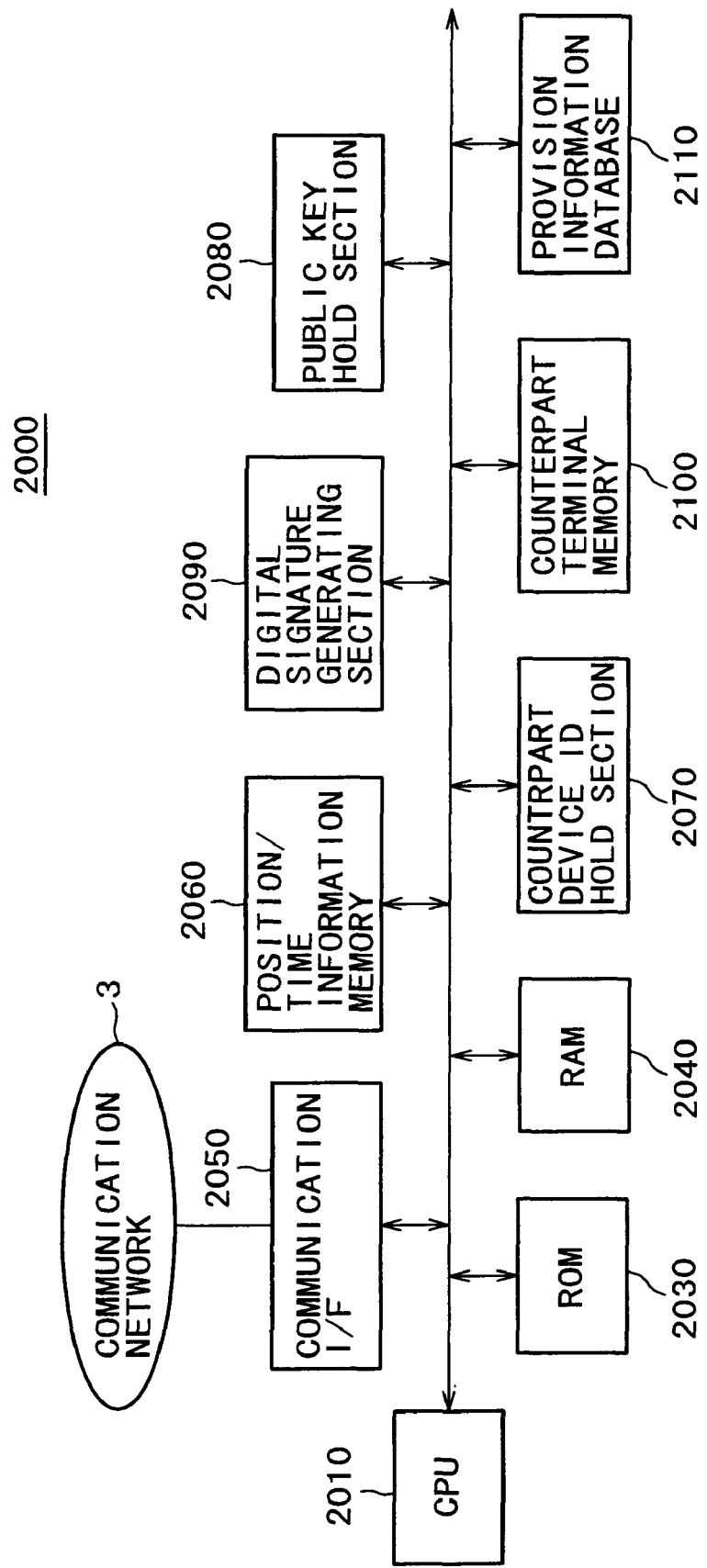
FIG. 28 is a schematic block diagram showing an example of structure for an information collection server apparatus for the portable phone terminal according to the first preferred embodiment with respect to the authentication employing the apparatus user identification information.

Second Example of Structure for a Server Apparatus 20 Related to Authentication Utilizing Apparatus User Identification Information FIG. 28 shows an example of structure for the information collection server apparatus 2000 related to an authentication employing the apparatus user identification information, which is constituted by the microcomputer. In other words, the information collection server apparatus 2000 includes a CPU 2010 and a ROM 2030 having the programs and data therein, a RAM 2040 for the work area, a communication interface 2050 for connecting to a communication network 3, a position/time information memory 2060 for storing the position/time information transmitted from the portable phone terminal 10, a counterpart apparatus ID holding section 2070 for holding the apparatus ID of the portable phone terminal 10, a public key holding section 2080 for holding a public key uniquely corresponding to each of apparatus ID's, a digital signature verification section 2090, a counterpart terminal memory 2100, and a provision information database 2110, which are connected to the CPU 2010 through a system bus 2020.

The apparatus ID of the portable phone terminal 10 registered in advance with the server apparatus 2000 is held in the counterpart apparatus ID holding section 2070. In addition, when using a telephone number assigned to the portable phone terminal 10, a number configured by the user and a identification information comprising a symbol as the user ID, and relationship data between each apparatus ID and corresponding telephone number or the identification information are held in the counterpart apparatus ID holding section 2070. Related to the authentication by means of the apparatus user identification information, since the apparatus ID is used as the user ID, it is not necessary to hold the relationship data in the counterpart apparatus ID holding section 2070.

In the public key holding section 2080, public keys for all portable phone terminals 10 assumed to transmit the position/time information are stored and held, by means of downloading in advance, for example. Further, according to a command from the CPU 2010, a corresponding public key is read from the public key holding section 2080 by means of the apparatus ID as a retriever or a search key.

The digital signature verification section 2090 verifies the digital signature attached to the received position/time information, by using a public key read from the public key holding section 2080 by means of the apparatus ID as the retriever. In this example of preferred embodiment of the present invention, as will be described below, when verification of the digital signature is completed, judging that the position/time information is legitimate, the process writes the position/time information into the position/time information memory 2060 linking with the apparatus ID, and stores it. However, when verification of the digital signature is not completed, judging that the position/time information is illegitimate, the position/time information is discarded.

The counterpart terminal memory 2100 is a memory for storing, for example, personal information and a telephone number of the portable phone 10 which transmits the position/time information. As described above, in this preferred embodiment of the present invention, the user of the portable phone terminal 10 accesses the server apparatus 2000, then downloads an application program informing the position/time information. In doing so, the telephone number of each terminal for receiving a provision of valuable information from the server apparatus 2000 and a profile of each user are registered with and stored in the memory 2100. The profile of each user can be used when narrowing down provision information from the server apparatus 2000.

In the provision information database 2110, information to be provided to the portable phone 10 is stored. In the provision information database 2110, the provision information from a provider is uploaded and stored at an appropriate timing, or the provision information read from a storage medium which is provided by the provider is stored.

In this example of preferred embodiment of the present invention, based on the position/time information stored in the position/time information memory 2060, the server apparatus 2000 retrieves a portable phone terminal 10 which is assumed to be within a particular area at the period of time, reads the telephone number from the counterpart terminal memory 2100 for the portable phone terminal 10 detected as a result of this retrieval, calls the portable phone terminal 10, and transmits proper information retrieved from the provision information database 211 to these portable phone terminal 10.

Next, a transmission operation of the position/time information from the portable phone terminal 10 and a reception operation in the server apparatus 2000 according to a system of the preferred embodiment of the present invention related to the authentication employing the apparatus user identification information will be described with reference to the flow charts of FIG. 29 and FIG. 30.

Figure 29:
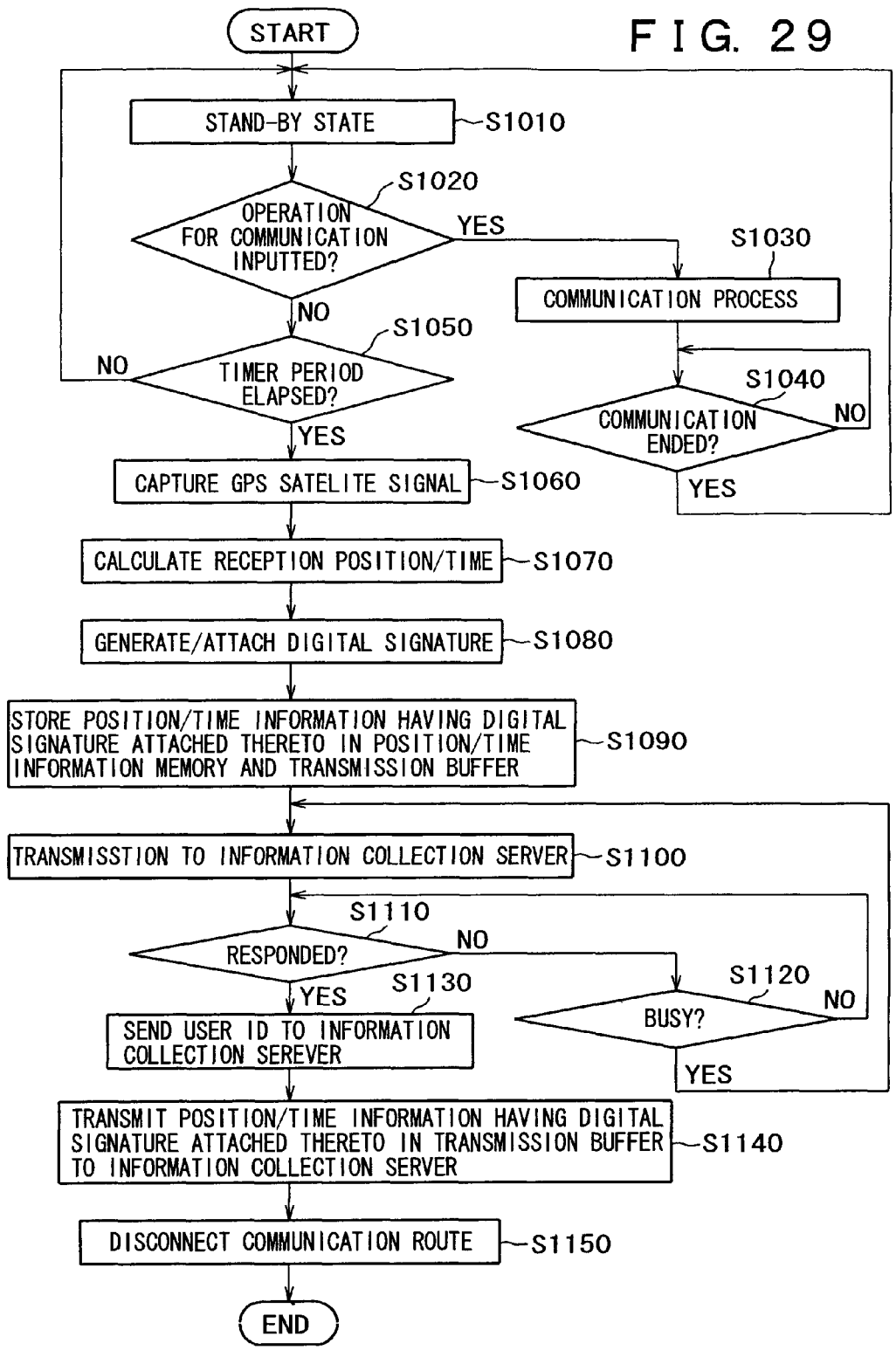
FIG. 29 is a flow chart for explaining transmission operation of position/time information from the portable apparatus according to the first preferred embodiment with respect to the authentication employing the apparatus user identification information.

Transmission Operation from Portable Phone Terminal 10 (Preferred Embodiment of the Present Invention Related to Authentication Utilizing Apparatus User Identification Information), FIG. 29

In this Preferred Embodiment of the Present Invention, the application for transmitting the position/time information to the server apparatus 2000 with which a portable phone terminal 10 is equipped, informs the position/time information on its own apparatus to the server apparatus 2000 at regular time intervals. The CPU 1010 uses time information of the clock circuit 1140 as a timer for measuring informing timing of the position/time information. In addition, an operation of each step of FIG. 29 describes mainly the operation of the CPU 1010.

In other words, firstly in a stand-by state (reference to step S1010) in the portable phone terminal 10, the process judges whether operation input for communication (a call) is completed (reference to step S1020), and when judging that the operation is completed, and a process for the communication (the call) is carried out (reference to step S1030). Then, when judging the communication (the call) is ended (reference to step S4), the process returns to the stand-by state of step S1010. The process from step S1020 to step S1040 is aimed at giving preference to the communication (the call) over the informing to the server apparatus 2000 of the position/time information.

In step S1020, when judged that no operation input for the communication (the call) has been carried out, it is determined if it is the informing timing of the position/time information, referring to a time of the clock circuit 1140 (reference to step S1050). When it is not the informing timing of the position/time information, the process returns to the stand-by state of step S1010.

In step S1050, when judged that it is the informing timing of the position/time information, the process instructs the GPS signal reception section 400 to capture the GPS satellite signal (reference to step S1060). Then, when a result of capturing not less than four GPS satellites through the I/O port 1070 from the GPS signal reception section 400, the CPU 1010 instructs the position/time calculation section 1170 to calculate a reception position and a time of its own apparatus (reference to step S1070).

Next, when the position/time information is calculated, the CPU 1010 instructs the transmission data generating section 1200 to carry out a generating and attaching process of the digital signature (reference to step S1080). In the transmission data generating section 1200, the digital signature generating section 1210 encrypts the position/time information from the position/time calculation section 1170, by means of the secret key from the secret key holding section 1220, and performs the digital signature.

Next, the CPU 1010 writes the position/time information having attached the digital signature thereto from the digital signature generating section 1210 into the position/time information memory 1180, and stores it in a transmission buffer constituted at a part of the RAM 1040 (reference to step S1090).

Then, the CPU 1010 reads the telephone number of the information collection server apparatus 2000 from the counterpart memory 1160, and calls by an auto dial (reference to step S1100). According to this, the process determines whether the information collection server apparatus 2000 has responded (reference to step S1110). When it judges there has been no response, then the process determines whether the server apparatus 2000 is in a busy-state (reference to step S1120). When it is not in the busy-state, the process returns to step S1110 and waits for response. If it is in busy-, the process returns to step S1100, and repeats dialing out to the information collection server apparatus 2000.

Further, in step S1110, when judging that the information collection server apparatus 2000 has responded, firstly the process transmits the apparatus ID as the user ID to the information collection server apparatus 2000 (reference to step S1130). Secondly, the process transmits the position/time information having the digital signature attached thereto temporarily stored in the transmission buffer to information collection server apparatus 2000 (reference to step S1140).

Upon completion of the transmission, the process disconnects a communication route to the server apparatus 2000 (reference to step S1150).

In addition, although the above explanation is for a case where the portable phone terminal 10 notifies the server apparatus 2000 of the position/time information automatically at regular time intervals, the portable phone terminal 10 in this preferred embodiment of the present invention is constituted such that the user can perform instructions to inform the server apparatus 2000 of the position/time information at an arbitrary timing, by operating the key input operation section 1100. A processing routine thereof differs only in that an activation of the transmission to the server apparatus 2000 was a timer period whereas the activation is a key input operational instruction by the user. Thus, steps after step S1060 in the flow chart as shown in FIG. 29 are entirely the same.

Figure 30:
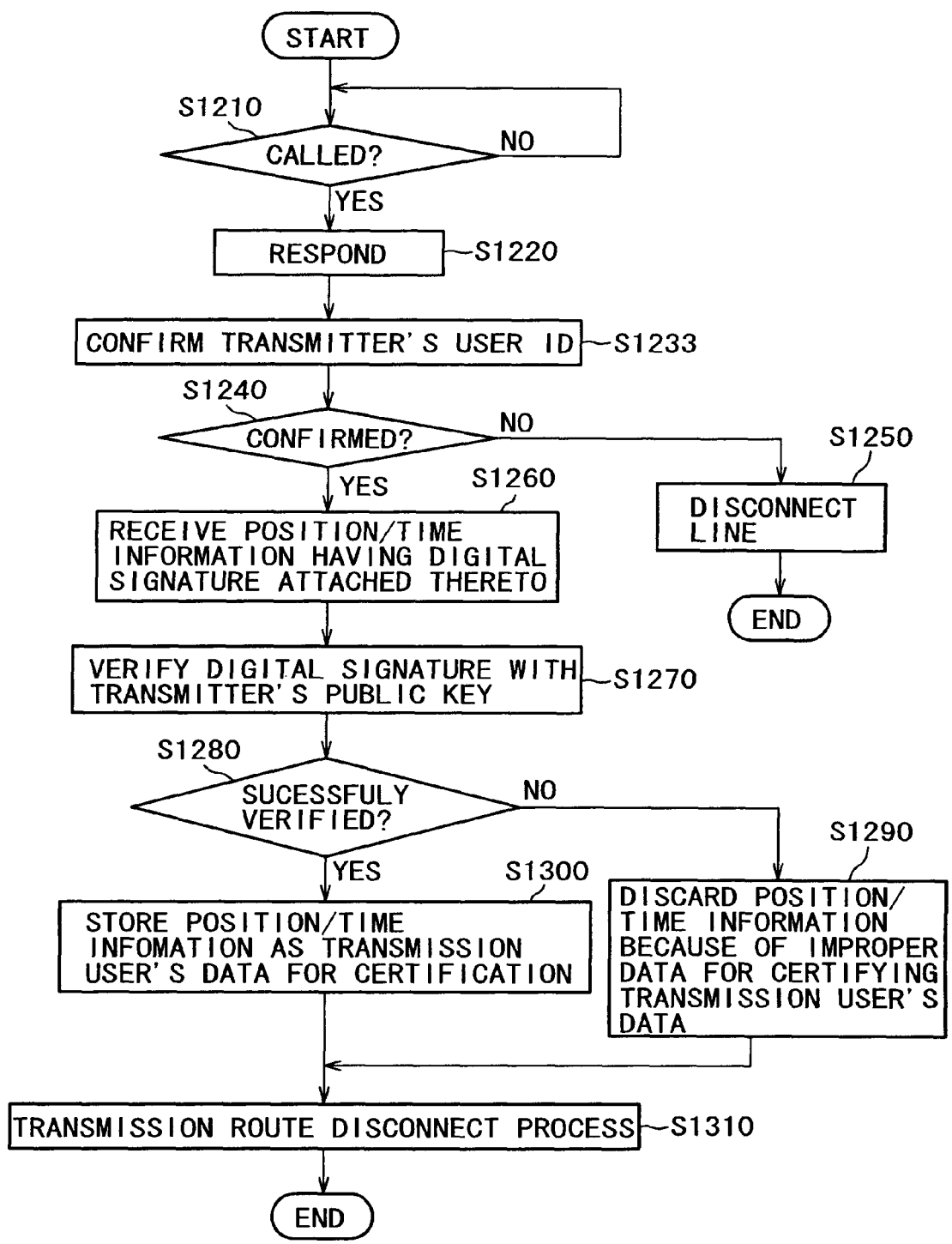
FIG. 30 is a flow chart for explaining reception operation of the position/time information carried out by the server apparatus which receives the position/time information from the portable apparatus according to the first preferred embodiment with respect to the authentication employing the apparatus user identification information.

Reception Operation in Server Apparatus 2000 (the Preferred Embodiment of the Present Invention Related to the Authentication Employing Identification Information of User), FIG. 30

Next, an operation of the server apparatus 2000 when receiving the position/time information from the portable phone terminal 10 will be described with reference to the flow chart of FIG. 30. Operations of each step S of FIG. 5 are shown focusing on the process which CPU 2010 performs.

Firstly, the process determines whether there has been an incoming call from the portable phone terminal 10 or not (reference to step S1210), and automatically responds when the call has arrived (reference to step S1220). If it is the portable phone terminal 10 transmitting the position/time information as described above, it transmits the apparatus ID as a transmitter's user ID, so that the process confirms it (reference to step S1230). As a result of the confirmation, the process determines whether it is OK or NG (reference to step S1240).

In other words, when the process cannot confirm the reception of the apparatus ID, or when the received apparatus ID is not the one registered with in the counterpart apparatus ID holding section 2070, in the preferred embodiment of the present invention, the process disconnects a line as the confirmed NG (reference to step S1250). Also, when the process judges the received apparatus ID is the one which is registered with the counterpart apparatus ID holding section 2070, the process receives the position/time information having the digital signature attached thereto transmitted from the portable phone terminal 10 in the next time, as the confirmed OK (reference to step S1260).

By setting the received apparatus ID to a retriever, the process reads a public key for the user (the portable phone terminal), who transmitted the position/time information, from the public key holding section 2080, transfers this public key to the digital signature verification section 2090, and instructs to perform the verification of the digital signature for the received position/time information (reference to step S27). Then, the CPU 2010 determines whether the verification is OK or not (reference to step S1280).

When determining to have successfully verified the digital signature, the CPU 2010 links the receive position/time information with the user ID such as the apparatus ID, and stores it in the position/time information memory 2060 as a certification data that a transmitter user is in the place at the time (reference to step S1300).

Further, when determining to have failed to verify the digital signature, since the received position/time information is illegitimate information, it cannot be used for the certification data that the transmitter user is in the place at the time. Therefore, the process discards the position/time information, without storing it in the memory 2060 (reference to step S1290). Then, the process disconnects the communication route to the portable phone terminal 10 (reference to step S1310), and ends the reception process routine.

In this way, according to the preferred embodiment of the present invention related to the authentication employing the user identification information, since the position/time information transmitted from the portable apparatus has attached the digital signature thereto by means of the secret key held in the portable apparatus secretly, it is possible to certify at least that the position/time information has been transmitted from the portable phone terminal 10.

Consequently, for example, if the position/time information which masqueraded a position and a time of the portable apparatus is transmitted from other than the portable apparatus, the masquerade is instantly detected, so that only legitimate position/time information is accumulated in the position/time information memory 2060 of the server apparatus 2000.

In the position/time information memory 1180 of the portable phone terminal 10, the position/time information having the digital signature attached thereto is stored so as to be read according to instructions for reading from the key input operation section 1100, so that it may be possible to use the information stored in the position/time information memory 1180 as so-called alibi information. Similarly, since the information stored in the position/time information memory 2060 of the server apparatus 2000 is linked and recorded with the user ID, it may be possibly used as the user's alibi information.

In addition, in the above description, although the user ID (apparatus ID) is sent to the server apparatus 2000 before the transmission of the position/time information, it may be transmitted after the position/time information having the digital signature attached thereto.

Further, the user ID (apparatus ID) may not be transmitted with the position/time information separately, but be transmitted being included in the position/time information. In this case, in the server apparatus 2000, before the digital signature, the process may retrieve the user ID (the apparatus ID) included in the position/time information; based on this, the public key for the digital signature verification may be read from the public key holding section 2080.

In addition, in the above described preferred embodiment of the present invention related to the authentication employing the apparatus user identification information, although the position/time information is transmitted only to the server apparatus 2000, it may be similarly transmitted to the arbitrary counterpart which the user of the portable phone terminal 10 assigns. In this case, the counterpart may perform the digital signature by acquiring the public key of the transmitter.

In addition, the server apparatus may transfer the position/time information to the specified counterpart again. In this case, the position/time information is preferably encrypted. The position/time information may be set to be decrypted only by a specific counterpart, so that the server apparatus can be used only for relaying the information. It may be easier to increase information secrecy and to limit a target for use of the information to only a specified organization.

Figure 31:
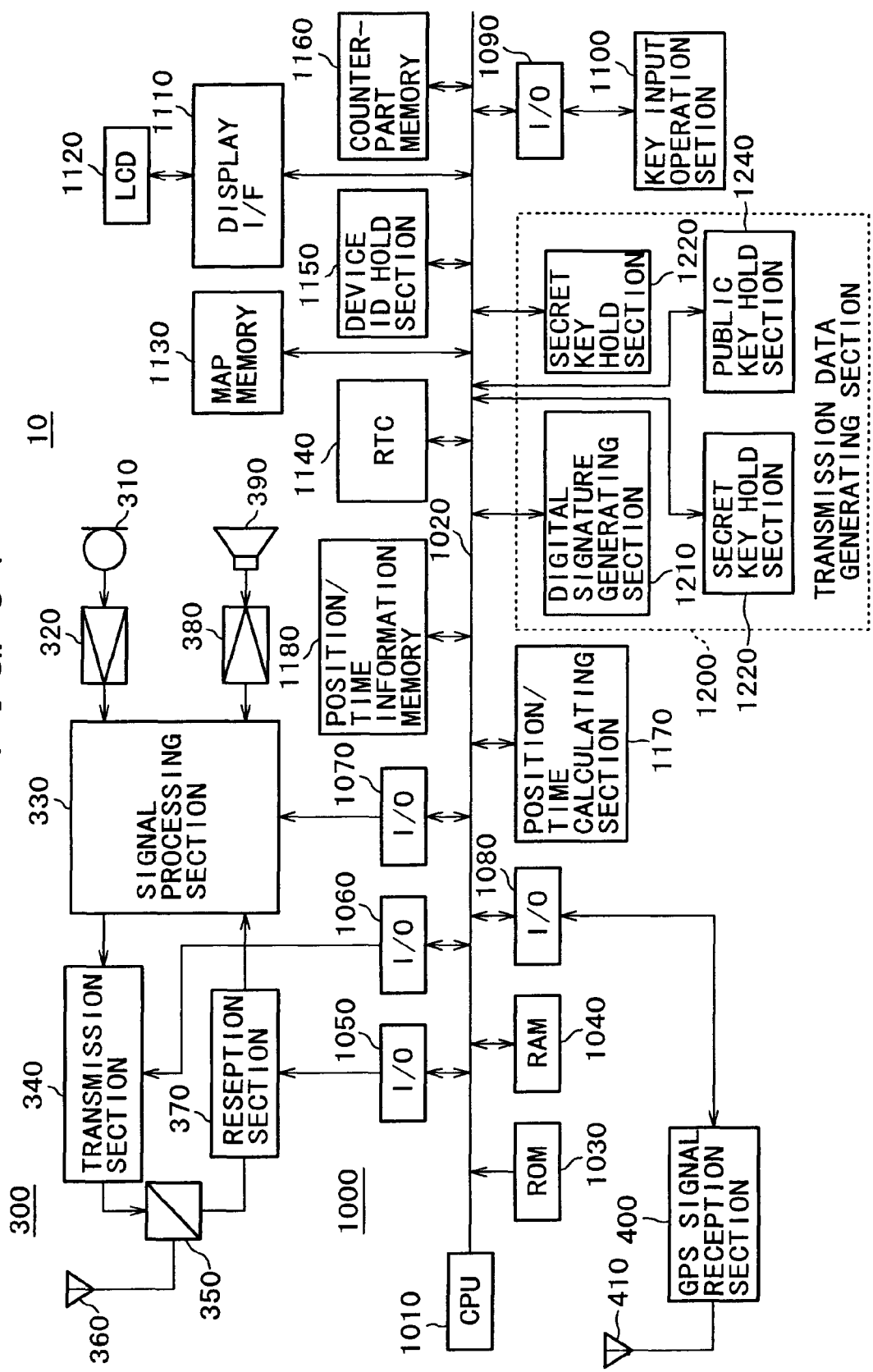
FIG. 31 is a schematic block diagram showing an example of structure for the portable phone terminal as a portable apparatus according to a second preferred embodiment with respect to authentication employing identification information of a user.

Structure of a Second Preferred Embodiment of the Present Invention Related to Authentication Employing Identification Information of Portable Apparatus User FIG. 31 shows an example of structure for a second preferred embodiment with respect to authentication employing identification information of the portable phone terminal 10 user as an example of the portable apparatus. The second preferred embodiment with respect to authentication employing user identification information differs from the preferred embodiment of the present invention related to the authentication employing the apparatus user identification information showed in FIG. 27 only in the structure of the transmission data generating section 1200, other part of the preferred embodiment of the present invention related to the authentication employing the apparatus user identification information are completely the same.

In the preferred embodiment with respect to authentication employing user identification information, the information transmitting from the portable phone terminal 10 to the server apparatus 2000 is made to enhance the secrecy when transmitting the information, by encrypting it. Thus, only a counterpart capable of decrypting (decoding/deciphering) the encryption may verify the digital signature of the position/time information, so that it is possible to avoid a possibility that the position/time information may be used by an arbitrary third person who intercepts it.

The portable phone terminal according to the preferred embodiment of the present invention related to the authentication employing the user identification information is constructed, by taking this advantage into account, in such a way that the server apparatus 2000 includes a function of transmitting the position/time information in a similar manner to the above, as well as the user specifies a counterpart whose public key is held for the encryption in advance and can transmit the position/time information.

Accordingly, as shown in FIG. 31, the transmission data generating section 1200 in the second preferred embodiment of the present invention related to the authentication employing the user identification information includes the encryption/decryption section 1230 and the public key holding section 1240, in addition to the digital signature generating section 1210 and the secret key holding section 1220.

The public key with respect to the counterpart who may transmit the position/time information is held in the public key holding section 1240, besides the public key of the server apparatus 2000. When transmitting the position/time information, the encryption/decryption section 1230 encrypts the position/time information having the digital signature attached thereto by means of the counterpart's public key retrieved from the public key holding section 1240.

Further, when receiving the position/time information, the encryption/decryption section 1230, decrypts (deciphers) an encrypted information by means of using the secret key held in the secret key holding section 1220, reads the public key of a transmitter from the public key holding section 1240, and verifies the digital signature.

Figure 32:
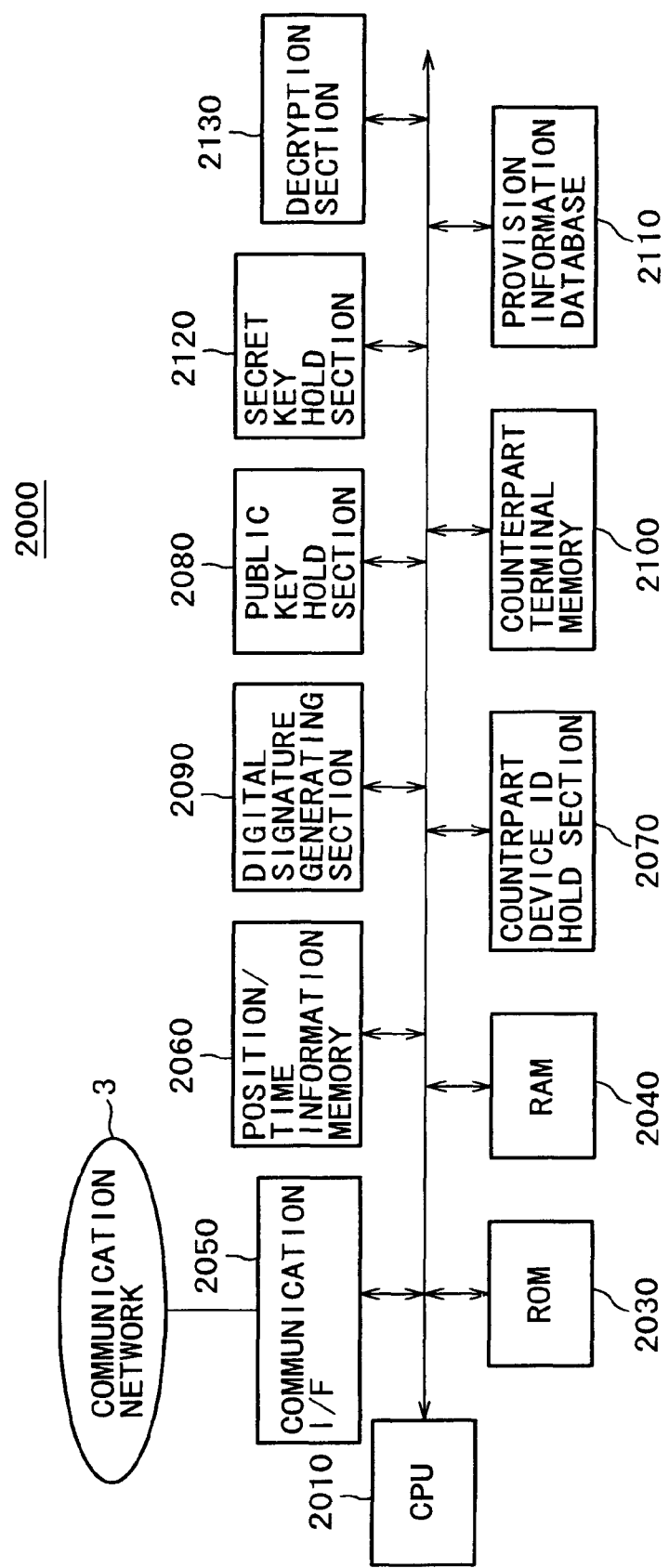
FIG. 32 is a schematic block diagram showing an example of structure for an information collection server apparatus for the portable phone terminal according to the second preferred embodiment with respect to the authentication employing the user identification information.

An Example of Structure for Server Apparatus 2000 in the Second Preferred Embodiment of the Present Invention Related to Authentication Employing Identification Information of User FIG. 32 shows the example of structure for the information collecting server apparatus 2000 in the second preferred embodiment of the present invention related to a authentication employing the user identification information, and it is constituted such that a secret key holding section 2120 and a decryption section 2130 are added to the server apparatus 2000 related to the authentication employing the apparatus user identification information which is showed in FIG. 28.

In the secret key holding section 2120, the secret key of the server apparatus 2000 is secretly stored and held. The decryption section 2130 decrypts (decrypts) an encrypted information transmitted from the portable phone terminal 10, by means of the secret key held in the secret key holding section 2120. Then, it transfers the decrypted (decrypted) position/time information having the digital signature attached thereto to the digital signature verification section 2090.

Figure 33:
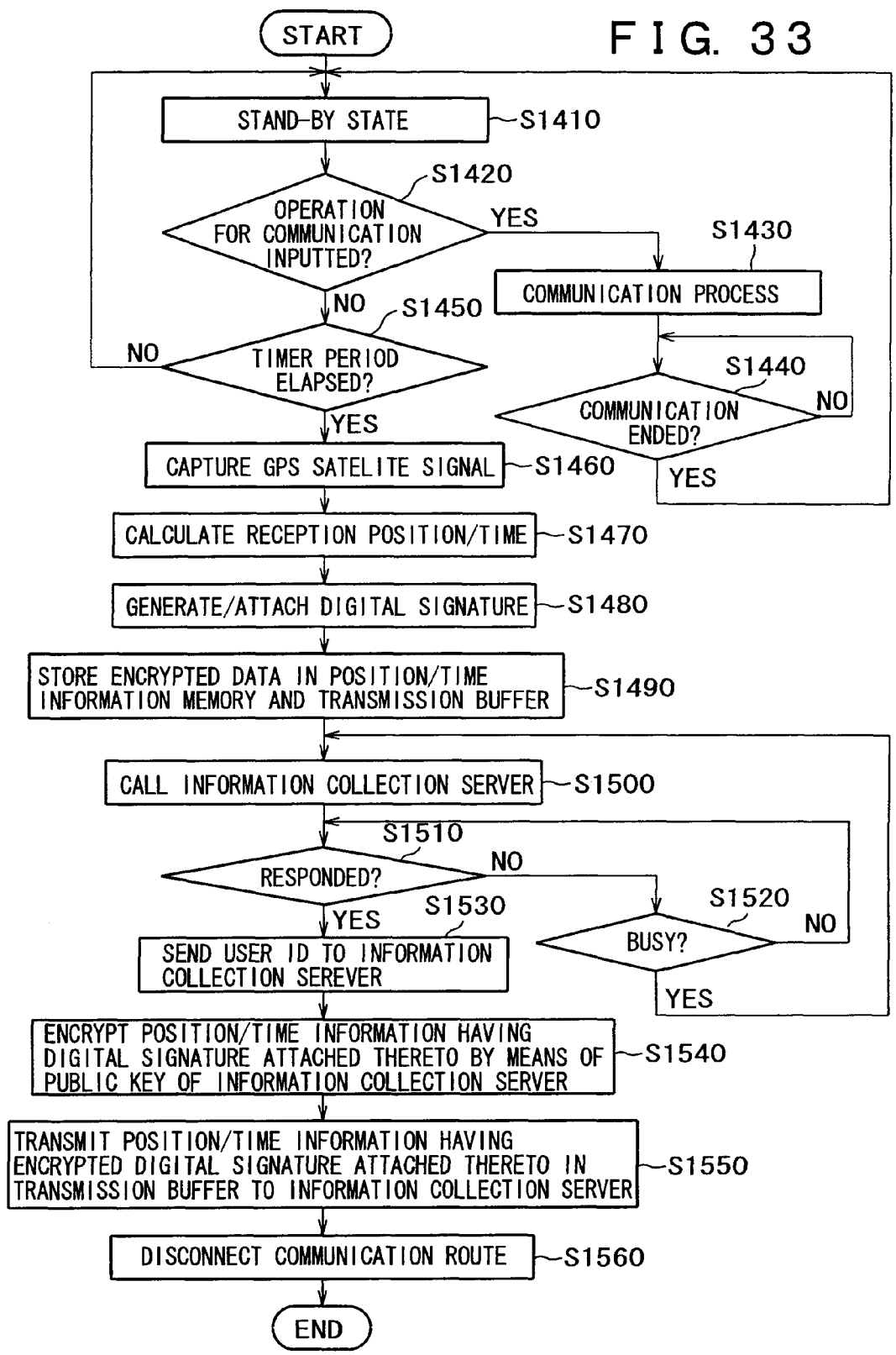
FIG. 33 is a flow chart for explaining transmission operation of position/time information from the portable apparatus according to the second preferred embodiment with respect to the authentication employing the user identification information.

Transmission Operation from Portable Phone Terminal 10 to Server Apparatus 2000 (Second Preferred Embodiment of the Present Invention Related to Authentication Employing Identification Information of User), FIG. 33

FIG. 33 is a flow chart showing the transmission processing operation of the position/time information from the portable phone terminal 10 to the server apparatus 2000, in the second preferred embodiment of the present invention related to the authentication employing the user identification information. In the case of this example, along with the case described referring to FIG. 29, the portable phone terminal 10 informs the server apparatus 2000 of the position/time information at regular time intervals.

In other words, the portable phone terminal 10, firstly in the stand-by state (reference to step S1410), determines whether an operation for a communication (a call) is inputted or not (reference to step S1420). When judging the operation has been completed, the process carries out the processing for the communication (the call) (reference to step S1430). Then, when judging the communication (the call) is ended (reference to step S1440), the process returns to the stand-by state in step S1410. The process from step S1420 to step S1440 is aimed at putting to perform the communication (the call) prior to informing the server apparatus 2000 of the position/time information.

In step S1420, when judging that the operation for the communication (the call) has not been inputted, the process determines whether it is the informing timing of the position/time information, referring to a time of the clock circuit 1140 (reference to step S1450). When it is not the informing timing of the position/time information, the process returns to the stand-by state of step S1410.

In step S1450, when judging that it is informing timing of the position/time information, the process instructs the GPS signal reception section 400 to capture the GPS satellite signal (reference to step S1460). When the GPS signal reception section 400 acquires the resulting capture of not less than four GPS satellites, through the I/O port 1070, the CPU 1010 instructs the position/time calculation section 1170 to calculate the reception position and time of its own apparatus (reference to step S1470).

Next, when the position/time information is calculated, the CPU 1010 instructs the transmission data generating section 1200 to process the generating/attaching of the digital signature. In the transmission data generating section 1200, the digital signature generating section 1210 encrypts the position/time information from the position/time calculation section 1170 by means of the secret key from the secret key holding section 1220 in order to perform the digital signature (reference to step S1480).

Next, the CPU 1020 writes the position/time information of the digital signature attached thereto into the position/time information memory 1180, and also stores it in the transmission buffer constituted by the part of the RAM 1040 (reference to step S1490).

The CPU 1010 reads the telephone number of the information collecting server apparatus 2000 from the counterpart memory 1160, and makes a call by means of the automatic dialing (reference to step S1500). Then, the process determines whether the information collecting server apparatus 2000 has responded to the call (reference to step S1510). When judging it has not responded, the process determines whether it is in a busy-state (reference to step S1520). If it is not in the busy-state, the process returns to step S1510 and waits for its response. If it is in the busy-state, the process returns to step S1500 and repeats the dialing out to the information collecting server apparatus 2000.

Also, in step S1520, when judging there has been a response from the information collecting server apparatus 2000, the CPU 1010 firstly transmits the apparatus ID as the user ID to the information collecting server apparatus 2000 (reference to step S1530).

Secondly, the process hands over the encrypted position/time information having the digital signature attached thereto temporarily held in the transmission buffer and the public key of the server apparatus 2000 held in the public key holding section 1240 to the encryption/decryption section 1230, and instructs to perform the encryption. In the encryption/decryption section 1230, by using the public key of the server apparatus 2000, the process encrypts the position/time information having the digital signature attached thereto from the transmission buffer (reference to step S1540) so as to be transmitted to the information collecting server apparatus 2000 (reference to step S1550). Upon completion of the transmission, the process disconnects the communication route to the server apparatus 2000.

In addition, although the above description is for the case where the portable phone terminal 10 automatically notifies the server apparatus 2000 of the position/time information at regular time intervals, the portable phone terminal 10 according to the preferred embodiment of the present invention is constituted such that, by means of operating the key input operation section 1100, the user can instruct to inform the position/time information to the server apparatus 2000 at an arbitrary timing. A processing routine thereof differs only in that an activation of the transmission to the server apparatus 2000 was a timer period whereas the activation is a key input operational instruction by the user. Thus, steps after step S1660 in the flow chart as shown in FIG. 33 are entirely the same.

Figure 34:
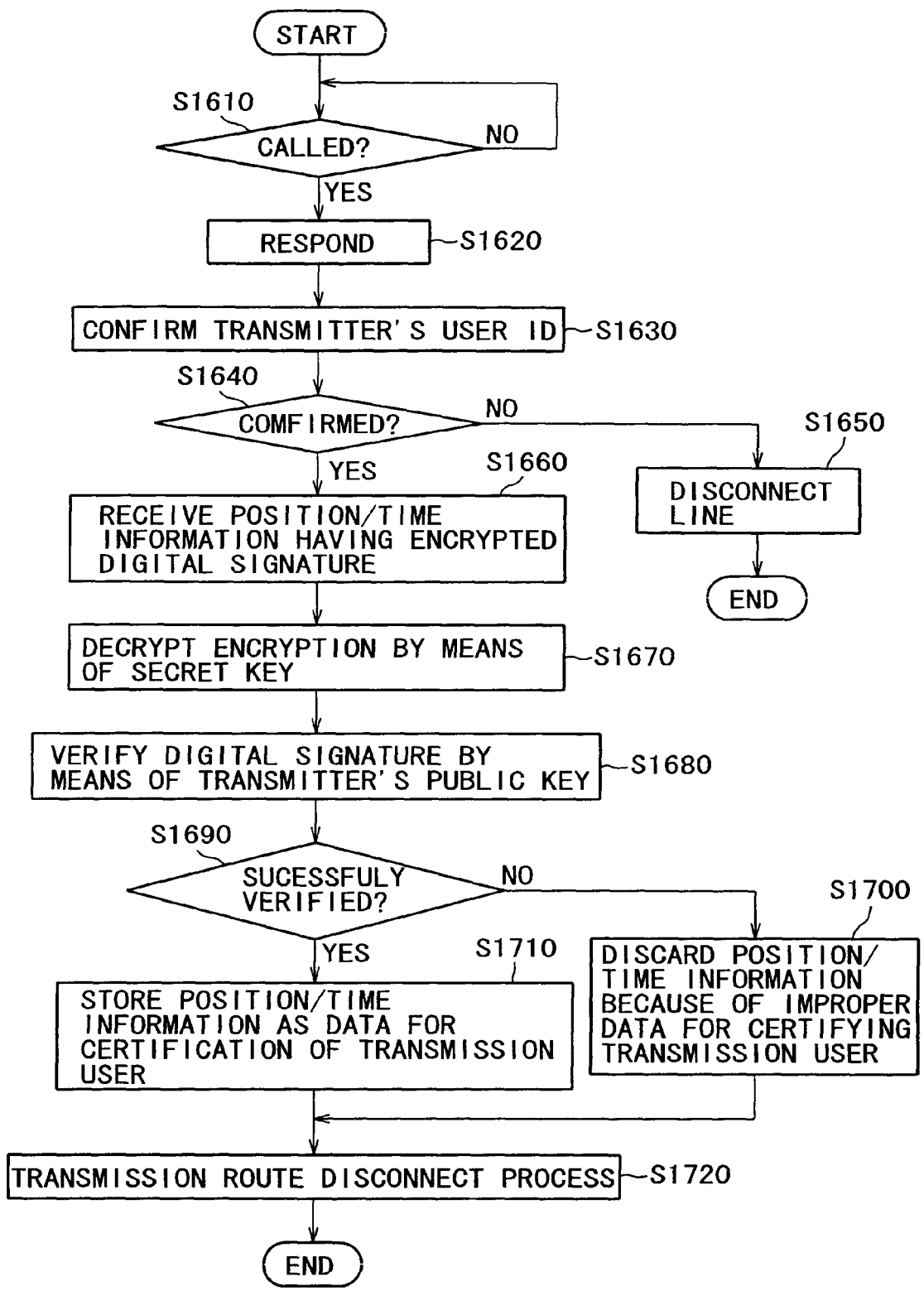
FIG. 34 is a flow chart for explaining reception operation of the position/time information carried out by the server apparatus which receives the position/time information from the portable apparatus according to the second preferred embodiment with respect to the authentication employing the user identification information.

Reception Operation in Server Apparatus 2000 (Second Preferred Embodiment of the Present Invention Related to Authentication Employing Identification Information of User), FIG. 34

Next, an operation of the server apparatus 2000 when receiving the encrypted position/time information having the digital signature attached thereto from the portable phone terminal 10 will be described with reference to the flow chart of FIG. 34. Operations of each step S of FIG. 34 are focused on the processing that CPU 2010 performs.

Firstly, the process determines whether there has been an incoming call from the portable phone terminal 10 (reference to step S1610). When there is a call, the process automatically responds to the call (reference to step S1620). If it is the portable phone terminal 10 transmitting the position/time information, as described above, it transmits the apparatus ID as a transmitter's user ID, so that the process confirms it (reference to step S1630). Then, as a result of the confirmation, the process determines whether it is OK or NG (reference to step S1640).

In other words, when the process cannot confirm the reception of the apparatus ID, or when the process receives the apparatus ID that has not been registered with the counterpart apparatus ID holding section 2070, in this preferred embodiment of the present invention, the process disconnects a line because of the confirmation NG (reference to step S1650). Further, when the process judges the received apparatus ID is the one which is registered with the counterpart apparatus ID holding section 2070, then the process receives the encrypted position/time information having the digital signature attached thereto which is transmitted from the portable phone terminal 10 as the confirmed OK (reference to step S1660).

Next, the CPU 2010 reads the secret key held in the secret key holding section 2120, hands over it to the decryption section 2130, and instructs to decrypt (decrypt) the encryption. To that end, the decryption section 2130 performs the decryption processing of the received information (reference to step S1670). The position/time information having the digital signature attached thereto after the decryption is handed over to the digital signature verification section 2090.

The CPU 2010, then, reads a public key with respect to the user (the portable phone terminal) who transmitted the position/time information thereto, from the public key holding section 2080 by means of the received apparatus ID as a key word or retriever, hands over this public key to the digital signature verification section 2090, and instructs to perform the verification of the digital signature for the received position/time information (reference to step S1680). Then, the CPU 2010 determines whether the verification is OK or not. (reference to step S1690).

When determining to have successfully verified the digital signature, the CPU 2010 links the received position/time information with the user ID such as the apparatus ID, and stores it in the position/time information memory 2060 as a certification data that a transmission user is in the place at the time (reference to step S1710).

Further, when determining to have failed to verify the digital signature, the received position/time information is an illegitimate information, so that it cannot be used for the certification data that the transmission user is in the position at the time. Therefore, the process discards the position/time information, without storing it in the memory 2060 (reference to step S1700). Then, the process disconnects the communication route to the portable phone terminal 10 (reference to step S1720), and ends the reception process routine.

Further, although it is omitted from the explanation of FIG. 34 for purposes of simplification, when it is not possible to decrypt the encryption in step S1670, the process goes to step S1700 and processes the discarding of data as illegitimate, in a similar way to the case where the verification is NG.

Figure 35:
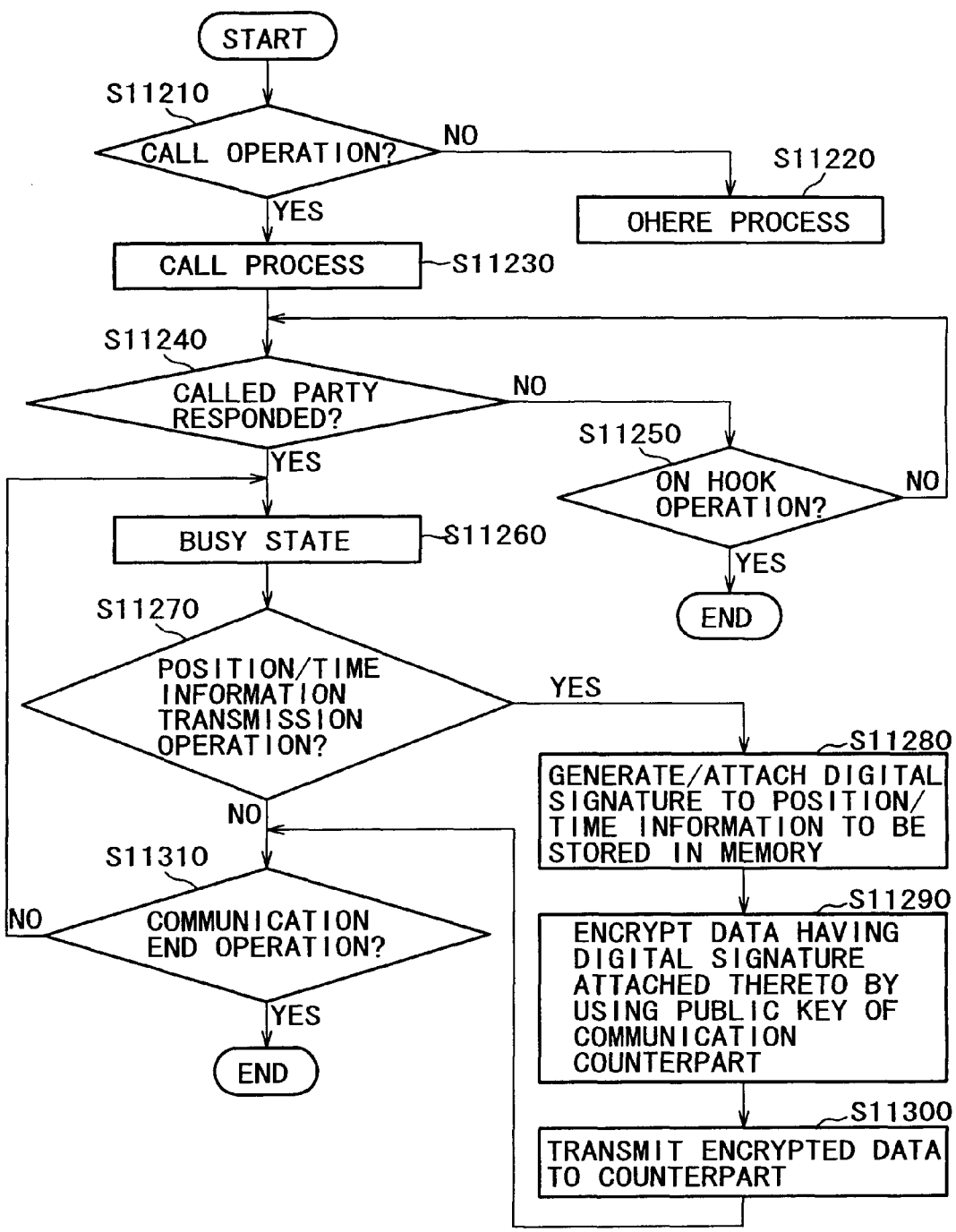
FIG. 35 is a flow chart for explaining transmission operation of the position/time information from the portable apparatus according to the second preferred embodiment with respect to the authentication employing the user identification information.

Transmission Operation from One Portable Phone Terminal 10 to Another Portable Phone Terminal 10 (the Second Preferred Embodiment of the Present Invention Related to the Authentication Utilizing Apparatus User Identification Information), FIG. 35

As for the portable phone terminal 10 in the second preferred embodiment of the present invention related to the authentication employing the user identification information, the user can transmit the encrypted position/time information having the digital signature attached thereto not only to the server apparatus as described above but also to a portable phone terminal 10 of the communication counterpart, if designated by the user. In this case, as to the second preferred embodiment of the present invention related to the authentication employing the user identification information, both of the portable phone terminals 10 hold each other's public key in each public key holding section 1240 while setting each other's telephone number as a retriever or a key.

In the portable phone terminal 10, the CPU 1010 firstly determines whether a calling operation has been performed or not (reference to step S11210). If the call operation has not been performed, the process performs another process (reference to step S11220). When judging that the calling operation has been performed in step S121, the CPU 1010 carries out a calling process (reference to step S11230)

Then, the process waits for a response from a called party (reference to step S11240), determines whether an on-hook operation has been performed without any response from the called party (reference to step S11250). If the on-hook operation has been performed, and the process ends this routine as the calling was stopped. If the on-hook operation has not been performed, the process waits for the response from the called party in step S11240.

When the response from the called party is confirmed in step S11240, the process establishes a communication route, and becomes busy or in communication with the counterpart (reference to step S11260). During the communication, the process determines whether the transmission operation of the position/time information has been performed or not (reference to step S11270). If judging that the transmission operation has not been performed, determines whether a communication ending operation has been performed or not (reference to step S11310). Further, when judging that the communication ending process has been performed, the process ends this routine. When judging that the communication ending operation has not been performed, the process returns to step S11260.

And in step S11270, when judging the transmission operation of the position/time information has been performed, the process transmits the position/time information calculated in the position/time calculation section 1170 to the digital signature generating section 1210, and carries out the digital signature by means of the secret key of the secret key holding section 1220. Then the process stores the position/time information having the digital signature attached thereto to the position/time information memory 1180 (reference to step S11280).

Further, the process transmits the position/time information having the digital signature attached thereto to the encryption/decryption section 1230, acquires the public key of the communication counterpart from the public key holding section 1240, and encrypts the position/time information having the digital signature attached thereto by means of the public key in the encryption/decryption section 1230 (reference to step S11290). Then, the process transmits the encrypted information to the communication counterpart (reference to step S11300), and returns to step S11310.

Figure 36:
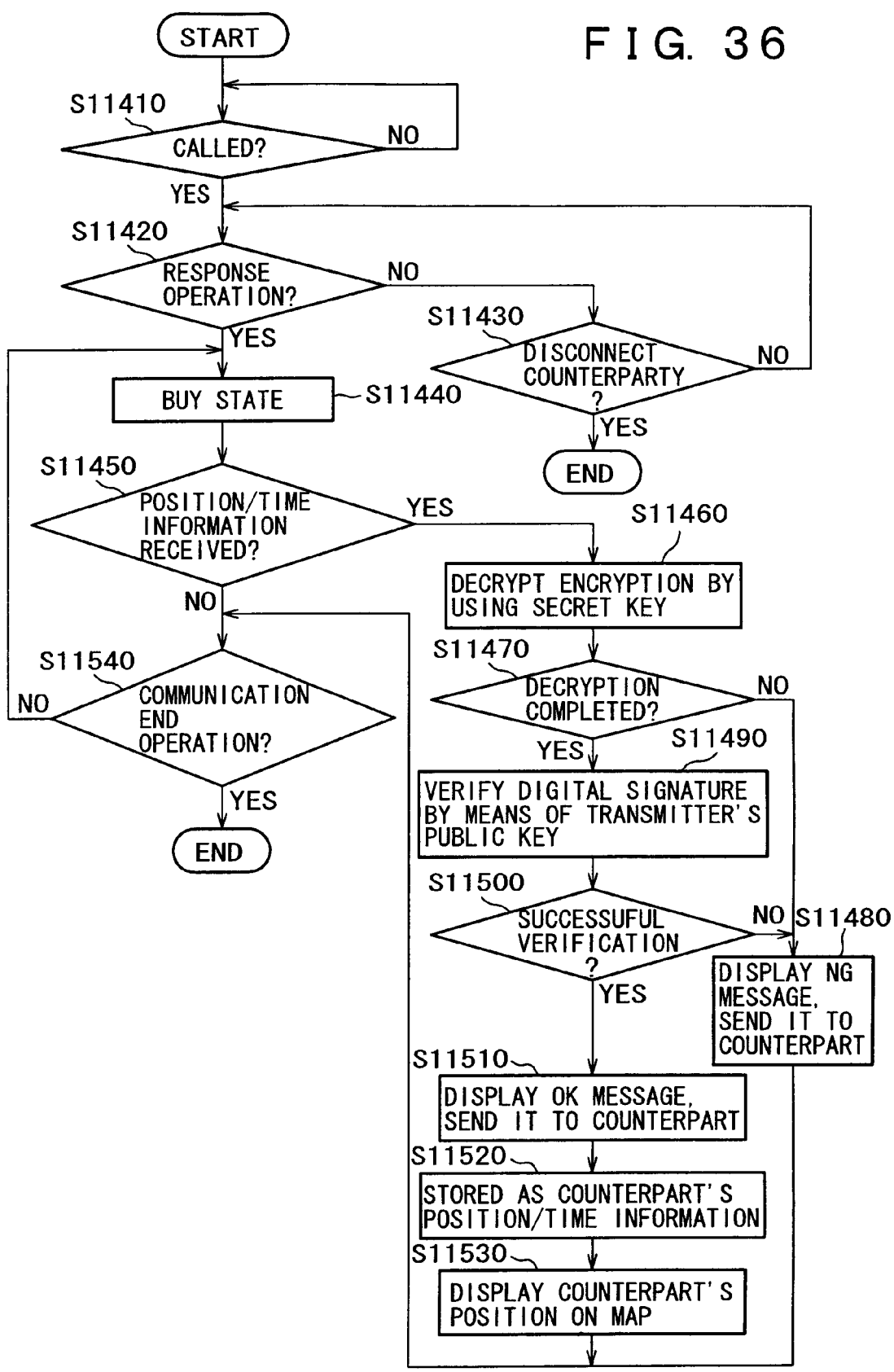
FIG. 36 is a flow chart for explaining reception operation of the position/time information carried out by a counterpart portable apparatus which receives the position/time information from the above portable apparatus according to the second preferred embodiment with respect to the authentication employing the user identification information.

Reception Operation of the Position/Time Information from Another Portable Phone Terminal 10 (the Second Preferred Embodiment of the Present Invention Related to the Authentication Employing Identification Information of User), FIG. 36

In a similar way as shown in FIG. 35, the position/time information transmitted to other portable phone terminal 10 performs the reception process shown in FIG. 36 in the portable phone terminal 10 on the reception side.

In other words, in the portable phone terminal 10, the process determines whether there has been an incoming call or not (reference to step S11410), and determines whether a responding operation has been performed or not when judging that there has been a call (reference to step S11420). Then, before the responding operation is performed, the process determines whether the counterpart has disconnected or not (reference to step S11430). Judging that the counterpart has been disconnected, the process ends the call reception process. If the counterpart has not been disconnected, the process returns to step S11420 so as to wait for a responding operation. Upon confirmation of the responding operation, it becomes busy or in a communication state (reference to step S11440). In addition, the CPU 1010 recognizes which counterpart has sent the call from, by means of the telephone number included in a calling message.

Then, in the busy or communication status, the process determines whether position/time information is received or not (reference to step S11450). When judging the position/time information is not received, the process determines whether the communication ending operation is performed or not (reference to step S11540). When judging that the communication ending operation is performed, the process ends this routine. Also, when judging the communication ending operation is not performed, the process returns to step S11440.

In step S11450, when the process judges the position/time information is received, the CPU 1010 controls the encryption/decryption section 1230 to perform the decryption processing by means of using the secret key held in the secret key holding section 1220 (reference to step S11460).

If the decryption processing in step S11460 is not successfully completed, the process displays the NG message indicative of the fact on a LCD 1120, and at the same time transmits the NG message to a calling party (reference to step S11480). Then, the process goes to step S11540.

When the decryption is successfully performed by the decryption processing in step S11460, the process retrieves the public key of the transmitter from the public key holding section 1240, and verifies the digital signature (reference to step S11490). Note that the digital signature verification section is not shown in FIG. 31.

The process judges the result of the verification of the digital signature (reference to step S11500). When the verification is NG, the process goes to step S11480 so as to display the NG message on the screen of the LCD 1120 and also transmit the NG message to the counterpart terminal.

As a result of the verification of the digital signature, if the verification is OK, the process displays the OK message on the screen of the LCD 1120, and transmits the OK message to the counterpart terminal (reference to step S11510). Then, the process links the verified counterpart's position/time information with the counterpart user ID, and stores it in the position/time information memory 1180 (reference to step S11520). This is because it may be used for the counterpart's position/time certification at a later time.

Then, the process displays the position of the counterpart with an distinct indication such as a counterpart's name on a map of the LCD 1120 (reference to step S11530), and returns to step S11540. Note that the processing of step S11530 is merely an example of the utilization of the position/time information.

As described above, according to the second preferred embodiment of the present invention related to the authentication employing the user identification information, in addition to similar effects of the preferred embodiment of the present invention related to the authentication employing the apparatus user identification information, there is an advantage in that the secrecy of the transmitting information may be enhanced by means of the encryption in the communication between the portable phone terminal 10 and the server apparatus 2000 or between the portable phone terminals 10.

Third Preferred Embodiment of the Present Invention Related to Authentication Employing Identification Information of Portable Apparatus User and Server Apparatus in the Case of Third Preferred Embodiment of the Present Invention Related to Authentication Employing Identification Information of User In the a third preferred embodiment of the present invention related to the authentication employing the identification information of the portable apparatus user, prior to digitally signing, the position/time information is encrypted by means of a public key of a specified counterpart, and the digital signature is carried out by the receiver, but the position/time information may be kept secret behind the receiver and informed only to the other counterpart.

An example of structure for the portable phone terminal 10 and an example of structure for the server apparatus 2000 in the third preferred embodiment of the present invention related to the authentication employing the user identification information are completely the same as those in the case of the second preferred embodiment of the present invention related to the authentication employing the user identification information as shown in FIG. 31 and FIG. 32. However, the transmission processing operation and reception processing operation are different from those in the case of the second preferred embodiment of the present invention related to the authentication employing the user identification information.

Figure 37:
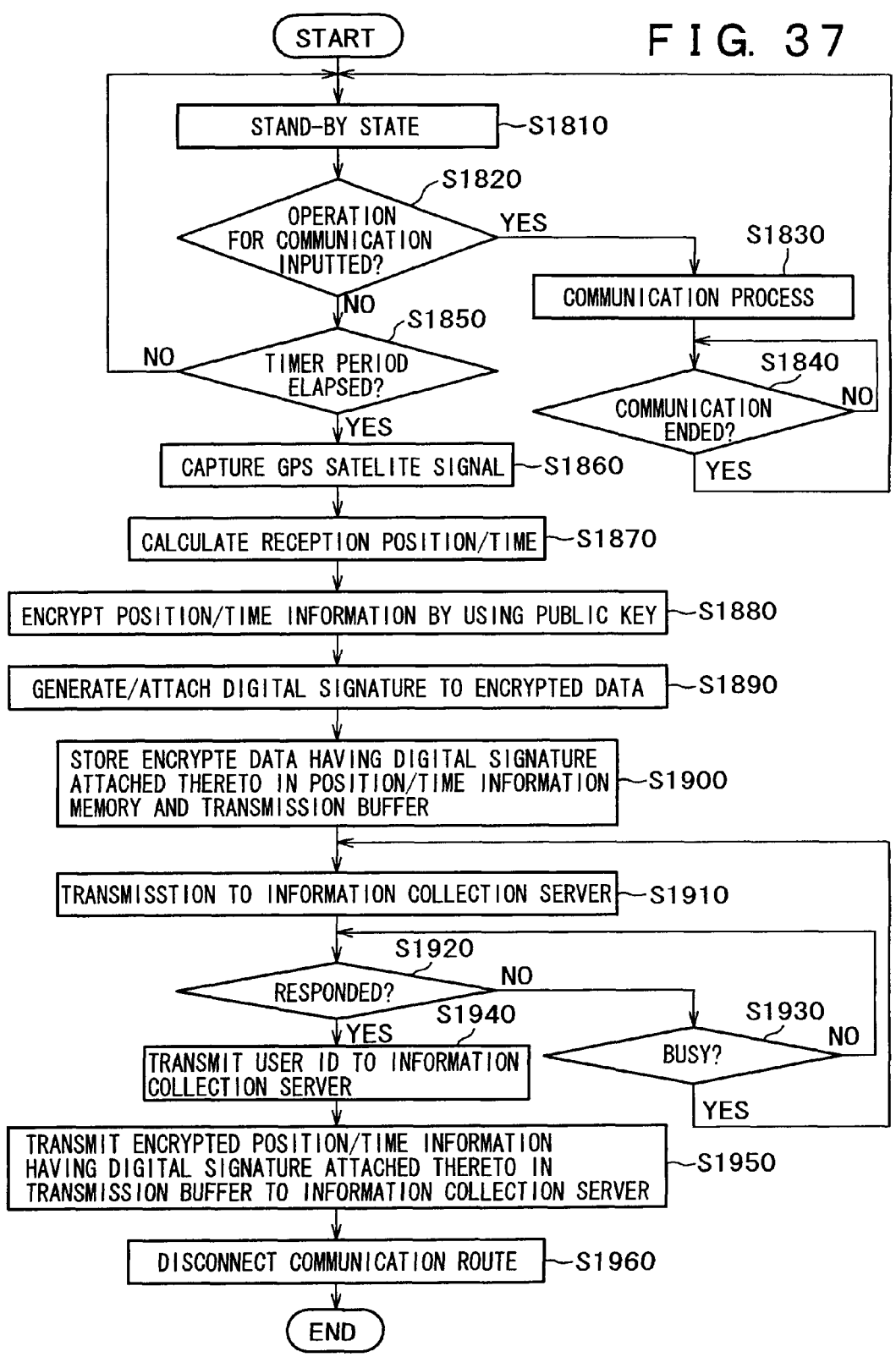
FIG. 37 is a flow chart for explaining transmission operation of position/time information from the portable apparatus according to a third preferred embodiment with respect to authentication employing user identification information.

Transmission Operation from Portable Phone Terminal 10 to Server Apparatus 2000 (Third Preferred Embodiment of the Present Invention Related to Authentication Employing Identification Information of User), FIG. 37

FIG. 37 is a flow chart showing the transmission processing operation of the position/time information from the portable phone terminal 10 to the server apparatus 2000, in the third preferred embodiment of the present invention related to the authentication employing the user identification information. In the case of this example, along with the cases as in FIG. 29 and FIG. 33, the portable phone terminal 10 informs the server apparatus 2000 of the position/time information at regular time intervals.

In other words, the portable phone terminal 10, in the stand-by state (reference to step S1810), firstly determines whether an operation for a communication (a call) is inputted or not (reference to step S1820). When judging the operation is completed, the process carries out the processing for the communication (the call) (reference to step S1830). When judging the communication (the call) is ended (reference to step S1840), the process returns to the stand-by state of step S1810. The processing of step S1820 to step S1840 is aimed at putting the performing of the communication (the call) prior to notifying the server apparatus 2000 of the position/time information.

In a step S1820, when judging that the operation for the communication (the call) is not inputted, the process determines whether it is the informing timing of the position/time information by referring to a time of the clock circuit 1140 (reference to step S1850). When it is not the informing timing of the position/time information, the process returns to the stand-by state of step S1810.

In step S1850, when judging that it is informing timing of the position/time information, the process instructs the GPS signal reception section 40 to capture the GPS satellite signal (reference to step S1860). When the GPS signal reception section 400 acquires the resulting capture of not less than four GPS satellites, through the I/O port 1070, the CPU 1010 instructs the position/time calculation section 1170 to calculate the receiving position and time of its own apparatus (reference to step S1870).

Next, when the position/time information is calculated, the CPU 1010 instructs the transmission data generating section 1200 to perform encryption. In other words, the process retrieves the public key of a counterpart who is designated by the user and who the user wants to notify the position/time information, from the public key holding section 1240, and hands over it to the encryption/decryption section 1230. The position/time information from the position/time calculation section 1170 is also handed over to the encryption/decryption section 1230. Then, the process instructs the encryption/decryption section 1230 to encrypt the position/time information by using the public key (reference to step S1880). In this case, the counterpart who the user wants to notify the position/time information can be the communication counterpart, server apparatus 2000, and other counterparts different from the communication counterpart.

Then, the CPU 1010 instructs the transmission data generating section 1200 to perform the generating/attaching processing of the digital signature. In the transmission data generating section 1200, the digital signature generating section 1210 encrypts, by means of the secret key from the secret key holding section 1220, the encrypted position/time information in the encryption/decryption section 1230, and digitally signs (reference to step S1890).

Next, the CPU 1020 writes the position/time information having the digital signature attached thereto into the position/time information memory 1180, and stores it in the transmission buffer constituted by a part of the RAM 1040 (reference to step S1900).

The CPU 1010 reads the telephone number of the information collecting server apparatus 2000 from the counterpart memory 1160, and makes a call by means of the automatic dialing (reference to step S1910). Then, the process determines whether the information collecting server apparatus 2000 has responded to the call or not (reference to step S1920). When judging there is no response, the process determines whether it is in a busy state (reference to step S1930). If it is not in the busy state or in communication, the process returns to step S1920 and waits for the response. If it is in the busy state, the process returns to step S1910 and repeats the dialing out to the information collecting server apparatus 2000.

Further, in step S1920, when judging there is the response in the information collecting server apparatus 2000, the CPU 1010 firstly transmits the apparatus ID as the user ID to the information collecting server apparatus 2000 (reference to step S1940).

Secondly, the process transmits the encrypted position/time information having the digital signature attached thereto temporarily held in the transmission buffer to the information collecting server apparatus 2000 (reference to step S1950). Upon completion of the transmission, the process disconnects the communication route to the server apparatus 2000 (reference to step S1960).

In addition, although the above description is for the case where the portable phone terminal 10 informs automatically the server apparatus 2000 of the position/time information at regular time intervals, the portable phone terminal 10 according to this preferred embodiment of the present invention is constituted such that the user can instructs to inform the position/time information to the server apparatus 2000 at the arbitrary timing by operating the key input operation section 1100. A processing routine for it differs only in that an activation of the transmission to the server apparatus 2000 was a timer period whereas the activation is a key input operational instruction by the user. Thus, steps after step S1860 in the flow chart as shown in FIG. 12 are entirely the same.

Figure 38:
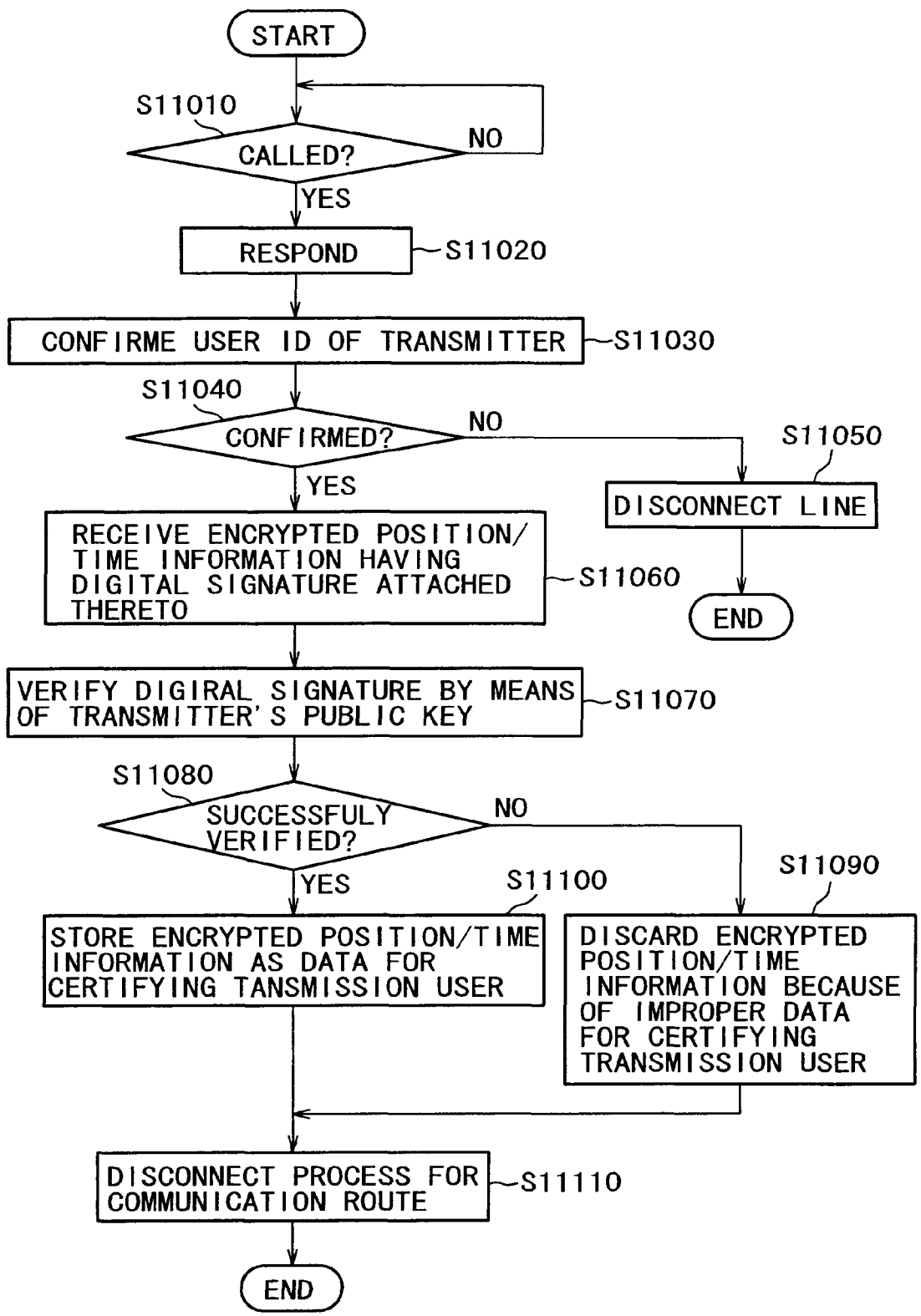
FIG. 38 is a flow chart for explaining reception operation of the position/time information carried out by a server apparatus which receives the position/time information from the portable apparatus according to the third preferred embodiment with respect to the authentication employing the user identification information.

Reception Operation in Server Apparatus 2000 (Third Preferred Embodiment of the Present Invention Related to Authentication Employing Identification Information of User), FIG. 38

Next, an operation of the server apparatus 2000 when receiving the encrypted position/time information having the digital signature attached thereto from the portable phone terminal 10 will be described with reference to the flow chart of FIG. 38. Operations of each step S of FIG. 38 shows in light of the process which is carried out by the CPU 2010.

Firstly, the process judges whether there has been a call from the portable phone terminal 10 or not (reference to step S11010). When there is an incoming call, the process automatically responds to the call (reference to step S11020). If it is the portable phone terminal 10 transmitting the position/time information as described above, it transmits the apparatus ID as a transmitter's user ID, so that the process confirms it (reference to step S11030). As a result of the confirmation, the process determines whether it is OK or NG (reference to step S11040).

In other words, when the process cannot confirm the reception of the apparatus ID, or when the received apparatus ID is not the one registered with the counterpart apparatus ID holding section 2070, in the preferred embodiment of the present invention, the process disconnects a line as the confirmation is NG (reference to step S11050). Further, when the process judges the received apparatus ID is the one registered with the counterpart apparatus ID holding section 2070, the process receives the encrypted position/time information having the digital signature attached thereto transmitted from the portable phone terminal 10 next time, as the confirmed OK (reference to step S11060).

Next, the CPU 2010 reads the public key with respect to the user (the portable phone terminal) who transmitted the position/time information from the public key holding section 2080 by means of the received apparatus ID as a retriever, hands over this public key to the digital signature verification section 2090, and instructs to perform the verification of the digital signature for the received position/time information (reference to step S11070). Then, the CPU 2010 determines whether the verification is OK or not (reference to step S11080).

When determining to have failed to verify the digital signature, the received position/time information is illegitimate information, so that the CPU cannot use it for the certification data that the transmission user is in the position at the time. Therefore, the process discards the position/time information, without storing it in the memory 2060 (reference to step S11090). Then, the process disconnects the communication route to the portable phone terminal 10 (reference to step S11120), and ends the reception processing routine.

In addition, when the CPU 2010 judges successfully verified digital signature, the secret key held in the secret key holding section 2120 is read and handed over to the decryption section 2130, and then instructs to perform the processing of the decryption (decoding/deciphering) of the encryption. To that end, the decryption section 2130 carries out the decryption processing of the position/time information (reference to step S11100).

Furthermore, the CPU 2010 associates the received position/time information with the user ID such as the apparatus ID and stores it in the position/time information memory 2060 as a certification data that the transmission user is in the position at the time (reference to step S11110). The process goes to step S11120, disconnects the communication route and ends the reception processing routine.

Further, although it is omitted from the explanation of FIG. 38 for purposes of simplification, when it is not possible to decrypt the encryption in step S11110, the process goes to step S11090 and processes the discarding of data as illegitimate in a similar way to the case where the verification is NG.

In the case of the third preferred embodiment of the present invention as described above, since the position/time information before digitally being signed is encrypted, the public key used for the encryption can be another counterpart who is not communication counterpart. Therefore, there is an advantage that it is possible to transmit personal position/time information a particular communication counterpart while keeping it secret.

For example, it is possible for a particular underwriter or a particular receptionist to carry out the digital signature and for another particular person except the underwriter or the receptionist to decrypt and read the position/time information.

An Example of Structure for a Fourth Preferred Embodiment of the Present Invention with Respect to Authentication Employing Identification Information of the Portable Apparatus User Although the user ID is used as the apparatus ID in the above example, it is possible to use an IC (Integrated Circuit) card for personal use such as a so-called SIM (Subscriber Identity Module) card and PKI (Public Key Infrastructure) card, to thereby use an ID for each person as the user ID. In other words, even when a few people use the same portable phone terminal, it is possible to identify the users, thus providing a communication of the position/time information for each user.

Figure 39:
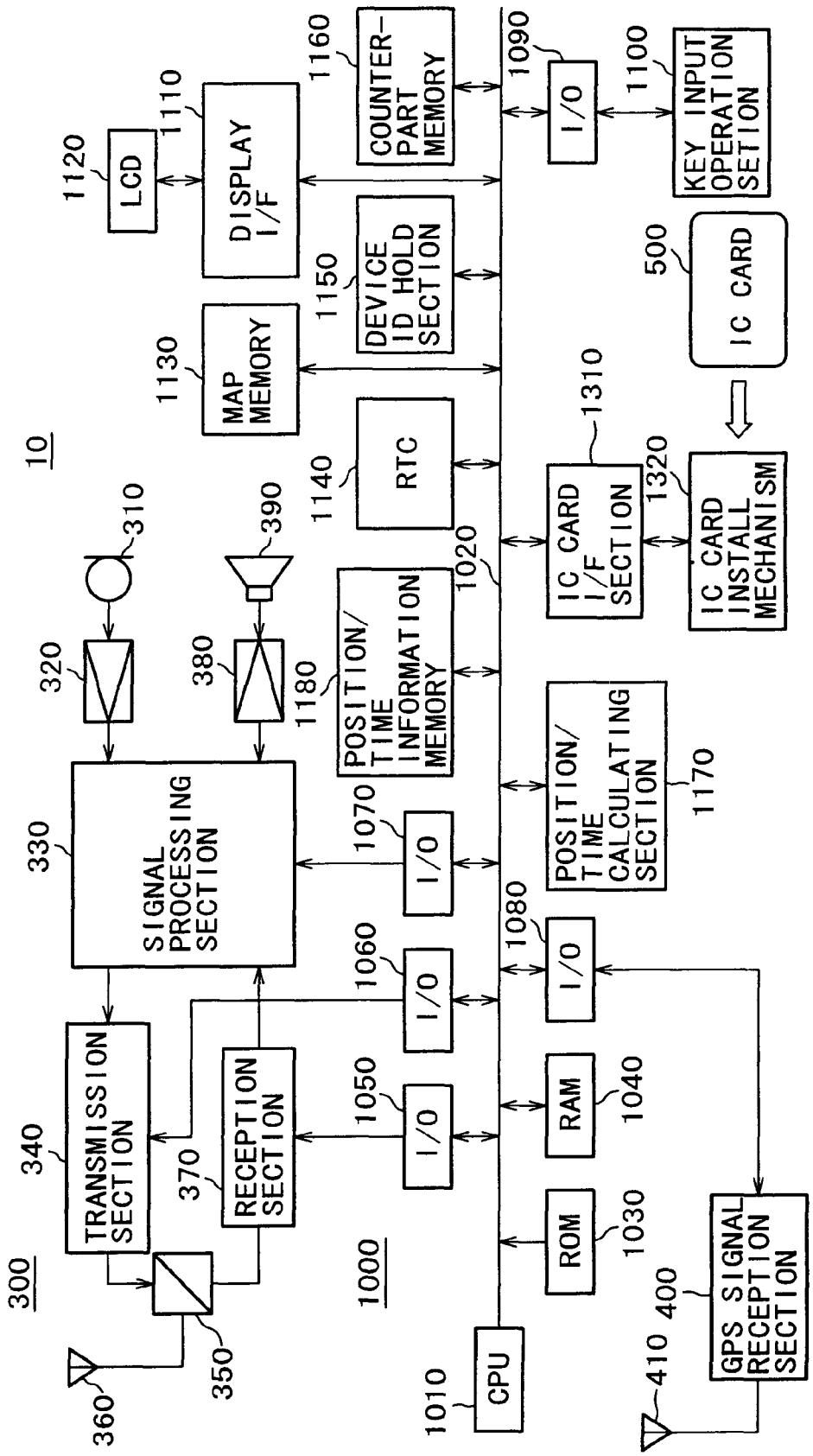
FIG. 39 is a schematic block diagram showing an example of structure for the portable phone terminal as a portable apparatus according to a fourth preferred embodiment with respect to authentication employing identification information of a user.

FIG. 39 shows an example of structure of the portable phone terminal 10 for the fourth preferred embodiment of the present invention with respect to authentication employing user identification information. In the example of FIG. 39, the transmission data generating section 1200 is not provided. Alternatively, an IC card install mechanism 1320 is connected to a system bus 1020 through a IC card interface 1310. Then, an IC card 500 can be installed in the IC card install mechanism 1320.

In the fourth preferred embodiment of the present invention with respect to authentication employing user identification information, the user ID comprising a personal identification information held in the IC card 500 is used as the user ID. Further, since the position/time information memory is provided in the IC card 500, it is not necessary for the portable phone terminal 10 to include the position/time information memory 1180. Except for that, it has substantially the same structure as that of the portable phone terminal 10 of FIG. 27.

Figure 40:
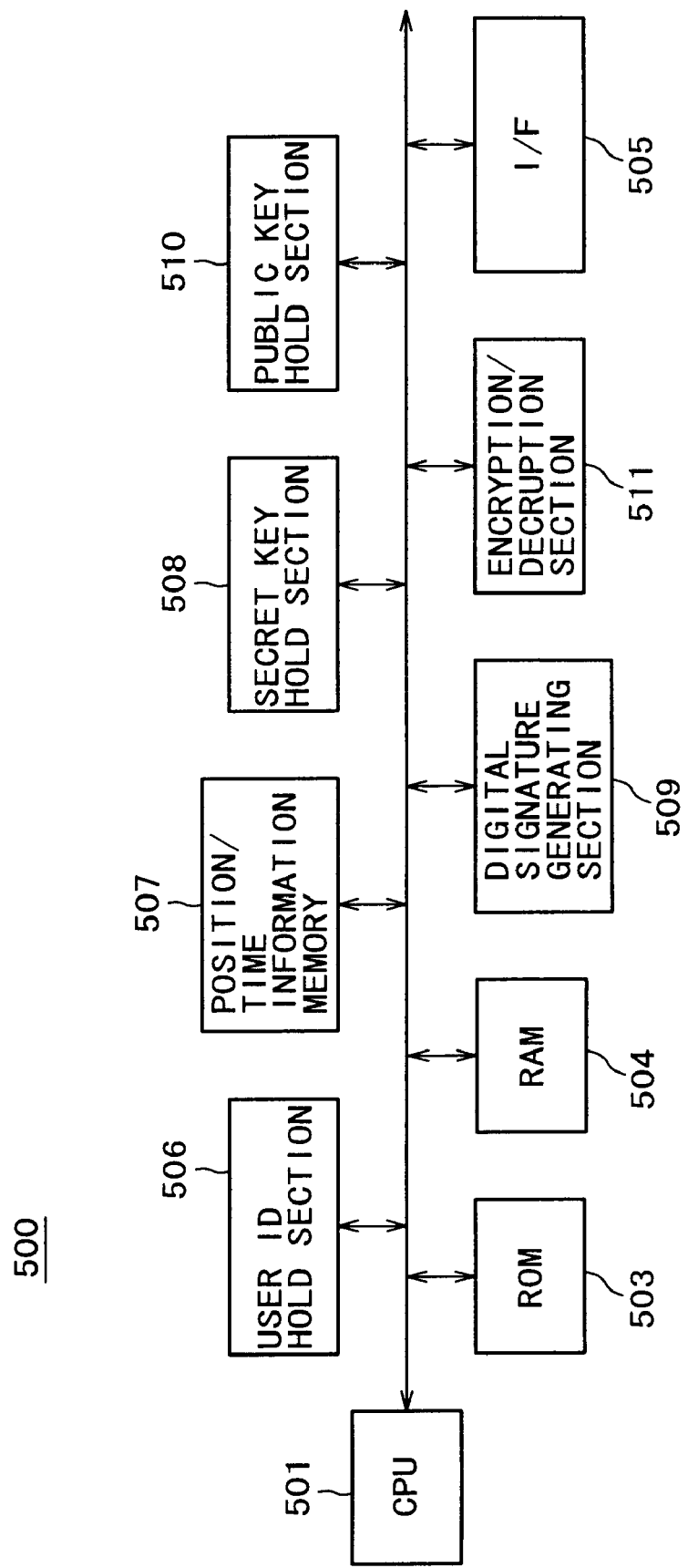
FIG. 40 is a schematic block diagram showing an example of structure for an IC card installed in the portable phone terminal according to the fourth preferred embodiment with respect to the authentication employing the user identification information.

Next, an example of structure of the IC card 500 is shown in FIG. 40. In other words, the IC card 500 is constituted by connecting a ROM 503 stored programs and data, a RAM 504 for a work area, an interface 505 to connect to the portable phone terminal 10 when installed in the IC card install mechanism 1320 of the portable phone terminal 10, a user ID holding section 506, a position/time information memory 507, a secret key holding section 508 where a different secret key is written with every IC card secretly, a digital signature generating section 509, a public key holding section 510 where holds a public key of itself and such as communication counterpart, and an encryption/decryption section 511, to the CPC 501, through the system bus 502.

Figure 41:
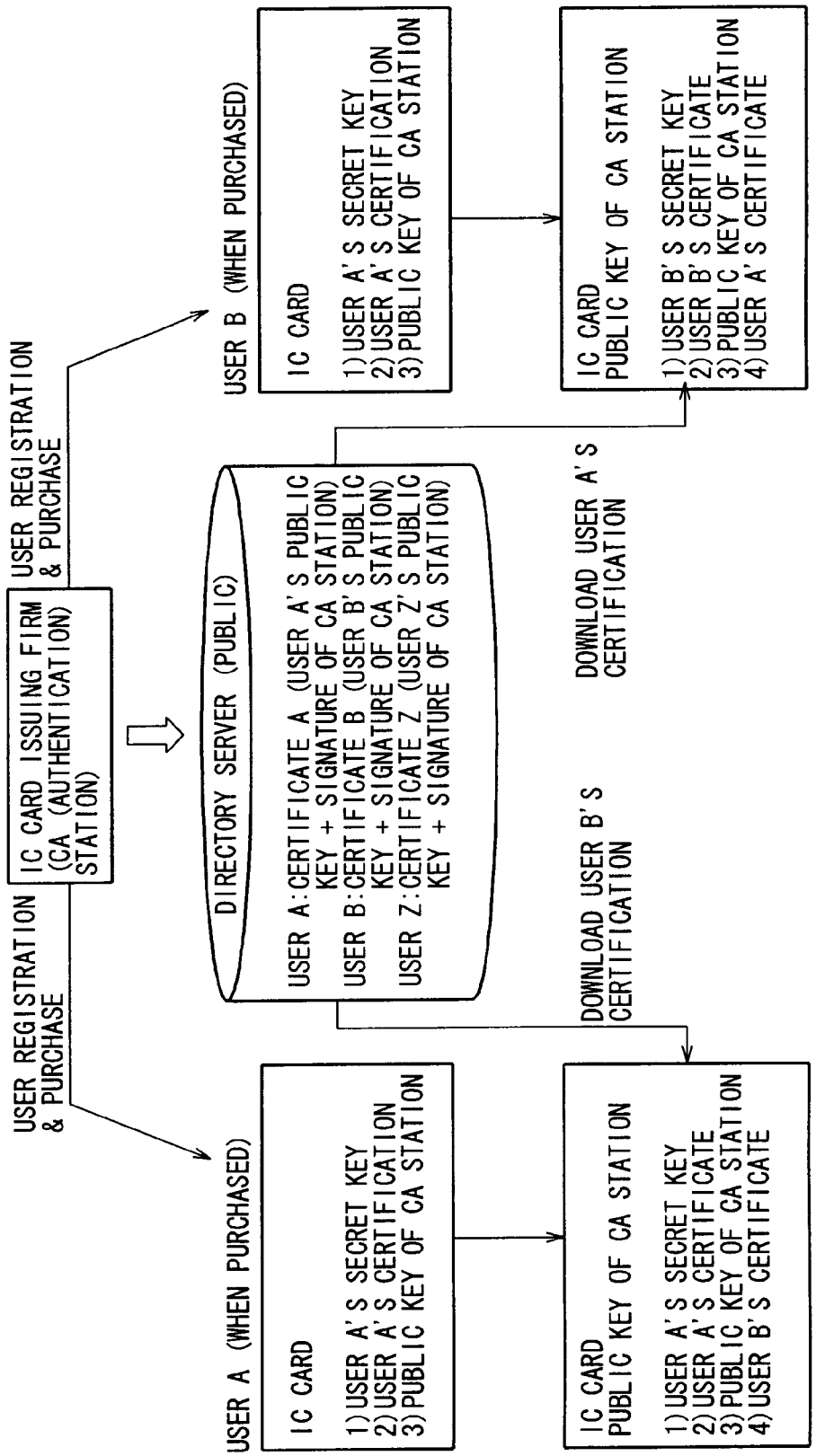
FIG. 41 is a schematic block diagram for explaining a procedure for issuing the IC card according to the fourth preferred embodiment of the present invention.

An issuing procedure of the IC card 500 and a necessary procedure in the communication with the counterpart are explained in FIG. 41.

For example, user A registers with an IC card issuing company that also functions as a CA (Certification Authority) station, and purchases the IC card. When purchasing, the IC card is written the information as follows by the CA station. Firstly, the registered user ID is secretly stored in the user ID holding section 506, and the secret key for the registered user A is stored in the secret key holding section 508. Also, certificate A of user A including the public key of user A having the digital signature of the CA station attached thereto is stored in the public key holding section 510, and the public key of the CA station is stored in the public key holding section 510.

In a similar way, as to other user B, responding to a user registration and a request for purchase, an IC card for user B is issued. In this IC card, in a similar way, the secret key of user B is stored in the secret key holding section 508, and the user B's certificate B having the digital signature of the CA station and the public key of the CA station is stored in the public key holding section 510.

The CA station discloses all the registered user certificates in a directory server. When the communication between user A and user B is performed, user A downloads the certificate B of user B from the directory server in advance, and user B downloads the certificate A of user A from the directory server in advance. Then both of users store them in the public key holding section 510.

In the fourth preferred embodiment of the present invention with respect to authentication employing user identification information, applying the preferred embodiment of the present invention related to the authentication employing apparatus user identification information, when transmitting the position/time information, for example, from user A to user B, user A installs its own IC card 500 in the IC card install mechanism 1320, designates user B as the communication counterpart, and performs the transmission operation of the position/time information.

If it is carried out, the CPU 1010 first acquires the user ID held in the user IC holding section 506 of the IC card 500, transmits it to user B and transmits the position/time information calculated in the position/time calculation section 117 to the IC card 500. Then, in the IC card 500, under control of the CPU 501, the process signs digitally at the digital signature generating section 509, stores the resulting position/time information having the digital signature attached thereto in the position/time information memory 507, and transmits it to the portable phone terminal 10 through the interface 505.

The portable phone terminal 10 receives the position/time information having the digital signature through the IC card interface section 1310, sends it to the antenna 360 through the I/O port 1170, the signal processing section 330 and the transmission section 340, and transmits it to user B.

In the fourth preferred embodiment of the present invention with respect to authentication employing user identification information, applying the above described second preferred embodiment of the present invention related to the authentication employing user identification information, when the position/time information is transmitted, for example, from user A to user B, in the IC card 500, after the process generates/attaches the digital signature to the position/time information received from the portable phone terminal 10 in the digital signature generating section 509, the process stores the position/time information having the digital signature in the position/time information memory 507. Further, in the encryption/decryption section 511, by using the public key of user B held in the public key holding section 510, the process encrypts the position/time information having the digital signature attached thereto. Then, the process transmits the encrypted position/time information having the digital signature attached thereto to the portable phone terminal 10 through the interface 505.

In this case, in addition to the position/time information, the information of user B to be a communication counterpart is transmitted to the IC card 500 in order to retrieve the public key of user B in the IC card 500.

Moreover, in the fourth preferred embodiment of the present invention with respect to authentication employing user identification information, applying the above described third preferred embodiment of the present invention related to the authentication employing user identification information, when the process transmits the position/time information, for example, from user A to user B, in the IC card 500, the process, by using the public key of user B held in the public key holding section 510, encrypts the position/time information received from the portable phone terminal 10 in the encryption/decryption section 511. Then, in the digital signature generating section 509, after the process generates/attaches the digital signature to the encrypted position/time information, the process stores the position/time information having the digital signature attached thereto in the position/time information memory 507 and transmits the encrypted position/time information having the digital signature to the portable phone terminal 10 through the interface 505.

In this case, in addition to the position/time information, the information of user B of a communication counterpart is transmitted to the IC card 500 in order to search for the public key of user B in the IC card 500.

Figure 42:
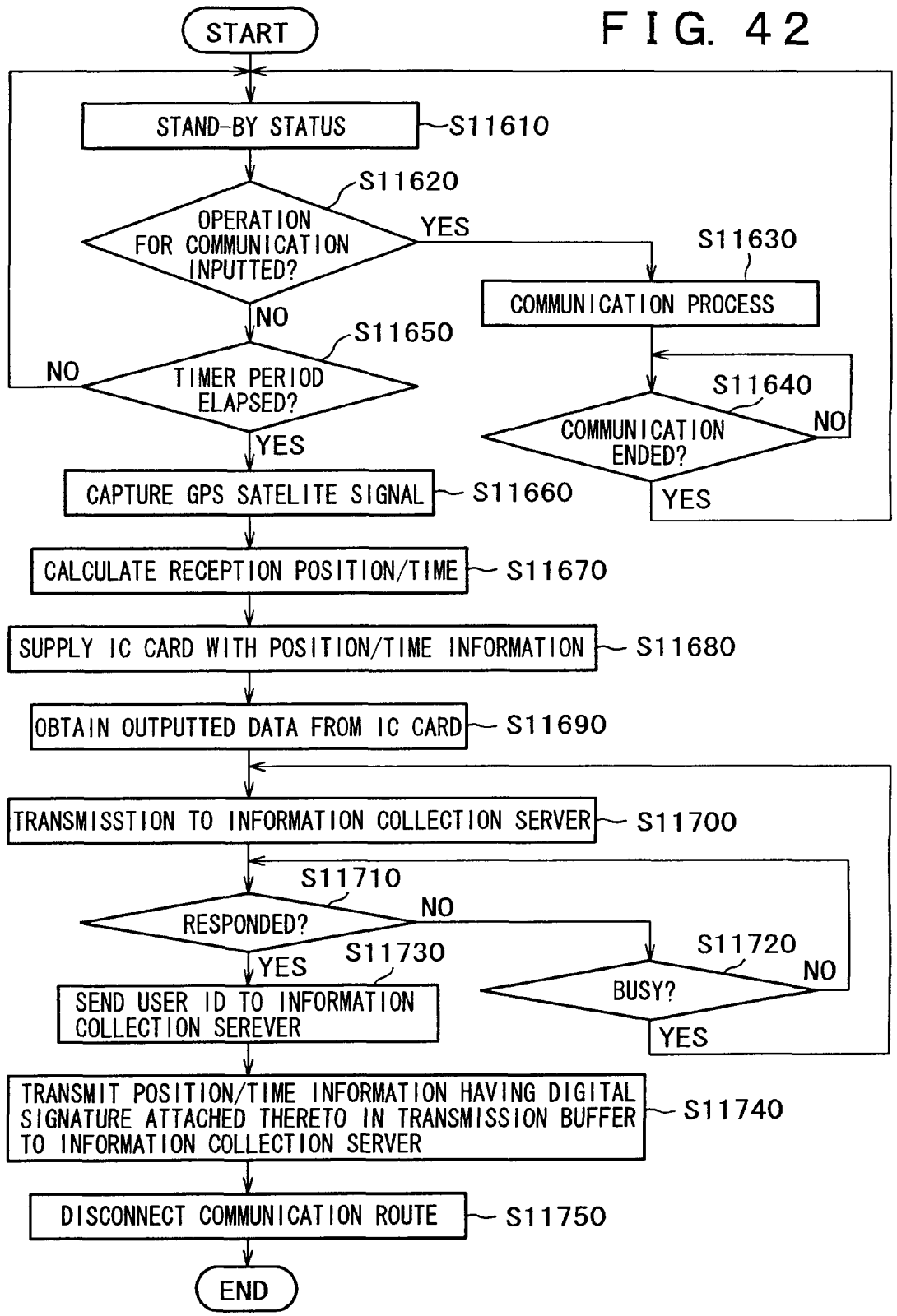
FIG. 42 is a flow chart for explaining transmission operation of position/time information from the portable apparatus according to a fourth preferred embodiment with respect to authentication employing user identification information.
Figure 43:
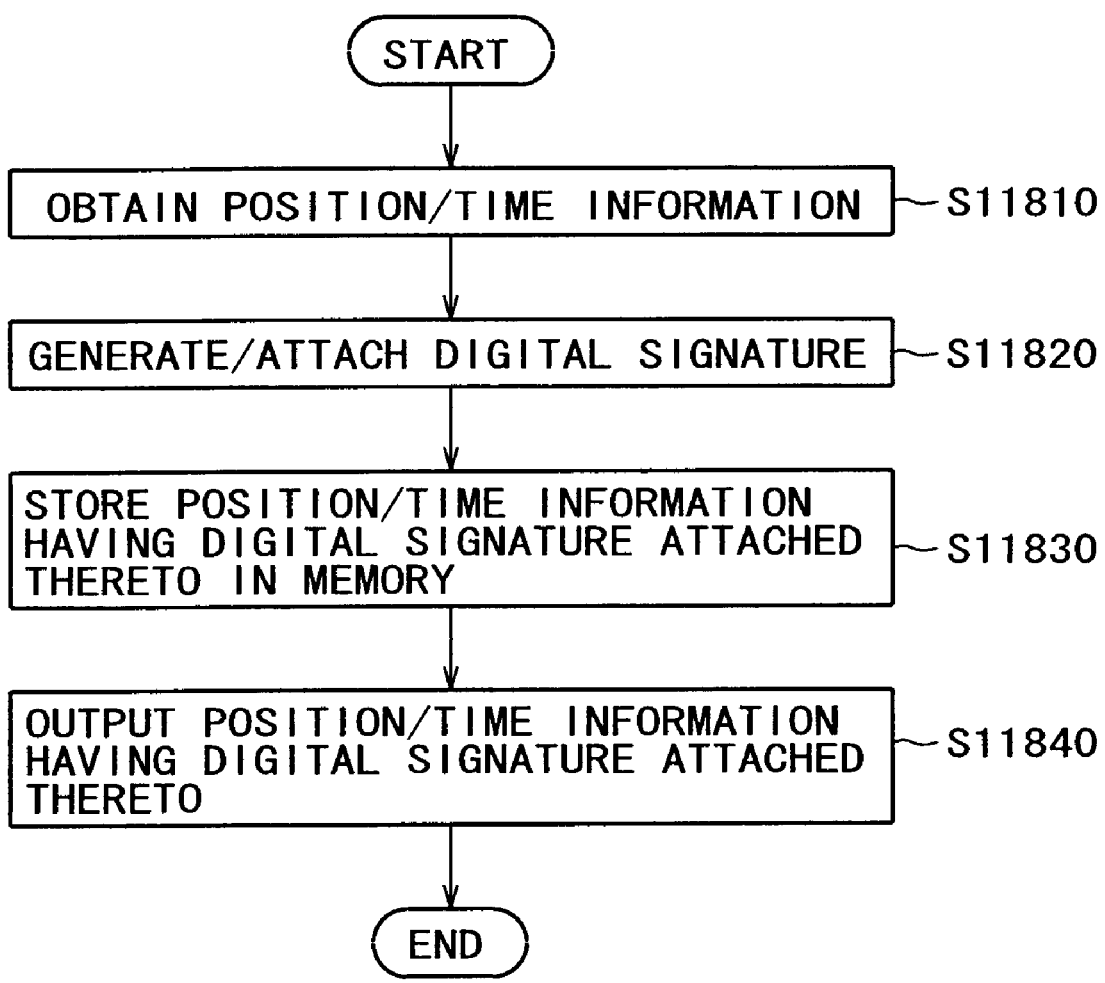
FIG. 43 is a flow chart for explaining a signal processing operation of the IC card installed in the portable phone terminal according to the fourth preferred embodiment with respect to the authentication employing the user identification information.
Figure 44:
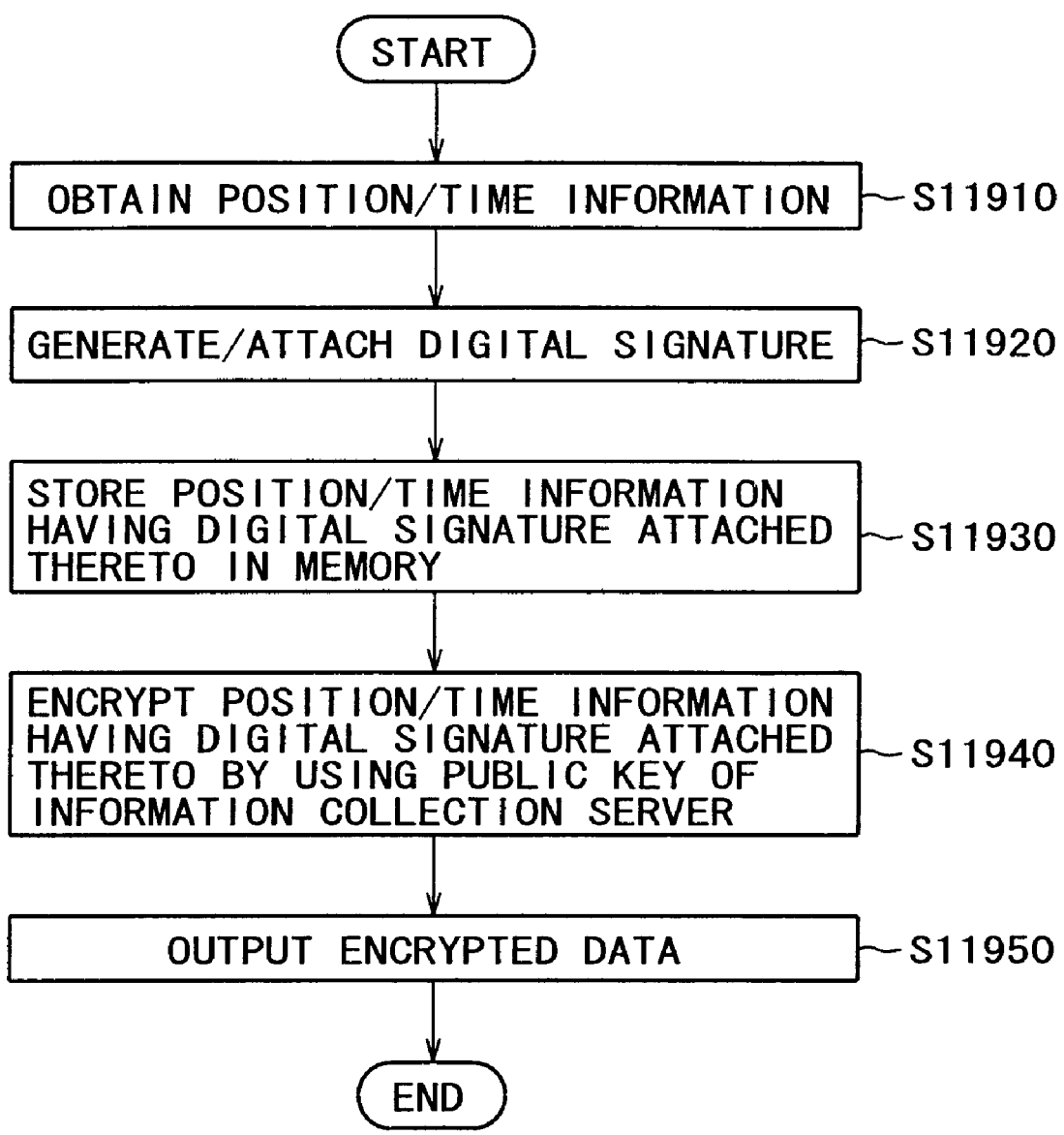
FIG. 44 is a flow chart for explaining a signal processing operation of the IC card installed in the portable phone terminal according to the fourth preferred embodiment with respect to the authentication employing the user identification information.

Reception Operation from Portable Phone Terminal 10 to Server Apparatus 2000 (Fourth Preferred Embodiment of the Present Invention Related to Authentication Employing Identification Information of User), FIG. 42 to FIG. 44

In the fourth preferred embodiment of the present invention with respect to authentication employing user identification information, in a similar way to the above described first to third preferred embodiment of the present inventions related to the authentication employing user identification information, when the position/time information is collected in the information collecting server apparatus 2000, the public key of each user is stored in the public key holding section 2080 of the server apparatus 2000 in a searchable condition by means of the user ID held in the user ID holding section 506 of the IC card 500 as a search key, instead of the apparatus ID.

Next, a transmission operation of the position/time information from the portable phone terminal 10 to the server apparatus 2000 when using the IC card 500 will be described with reference to FIG. 42. Note that, in this example of preferred embodiment of the present invention, the portable phone terminal 10 notifies the server apparatus 2000 of the position/time information at regular time intervals in a similar way to the case as described above referring to FIG. 29, FIG. 33 and FIG. 37, In other words, in the portable phone terminal 10 in a stand-by state (reference to step S11610), firstly it is determined whether the input operation for a communication (a call) is completed or not (reference to step S11620). When being judged that the operation is completed, a process for the communication (the call) is carried out (reference to step S11630). When judging the communication (the call) is finished (reference to step S11640), the process returns to the stand-by state in step S11610. The operation in step S11620 to step S11640 is aimed at giving preference to the communication (the call) over the informing the server apparatus 2000 of the position/time information.

In step S11620, when judging that the operation for the communication (the call) has not been inputted, the process determines whether it is the informing timing of the position/time information, referring to a time of the clock circuit 1140 (reference to step S11650). When it is not the informing timing of the position/time information, the process returns to the stand-by state in step S11610.

In step S11650, when judging that it is informing timing of the position/time information, the process instructs the GPS signal reception section 400 to capture the GPS satellite signal (reference to step S11660). When the GPS signal reception section 400 acquires the resulting capture of not less than four GPS satellites, through the I/O port 1070, the CPU 1010 instructs the position/time calculation section 1170 to calculate the reception position and time of its own apparatus (reference to step S11670).

Next, when the position/time information is calculated, the CPU 1010 instructs to transfer the position/time information from the position/time calculation section 1170 to the IC card 500 (reference to step S11680).

As in the above described preferred embodiment of the present invention with respect to authentication employing apparatus user identification information, when it generates/attaches the digital signature to the position/time information to be transmitted to the server apparatus 20, the process as shown in FIG. 43 is carried out in the IC card 500. Note that the process of FIG. 43 is described in light of the process of the CPU 501.

In other words, firstly the process acquires the position/time information through the interface 505 (reference to step S11810). Next, the CPU 501 transfers the acquired position/time information to the digital signature generating section 509. In the digital signature generating section 509, by using the secret key held in the secret key holding section 508, the process generates a digital signature with respect to the position/time information and attaches the digital signature thereto (reference to step S11820).

Next, the CPU 501 stores the position/time information having the digital signature attached thereto in the position/time information memory 507 (reference to step S11830). Further, the process returns the position/time information having the digital signature attached thereto to the portable phone terminal 10 through the interface 505 (reference to step S11840).

The CPU 1010 of the portable phone terminal 10 acquires an output data from the IC card 500 through the IC card interface section 1310, and stores it in the transmission buffer constituted by part of the RAM 1040 (reference to step S11690 in FIG. 42).

Then, the CPU 1010 reads a telephone number of the information collecting server apparatus 2000 from the counterpart memory 1160, and places a call by means of the automatic dialing (reference to step S11700). Then, the process determines whether the information collecting server apparatus 2000 responds to the call or not (reference to step S11710). When judging there is no response, the process determines whether it is in a busy-state or not (reference to step S11720). If it is not in the busy-state or in communication, the process returns to step S11710 and waits for a response. If it is in the busy-state, the process returns to step S11700 and repeats the dialing out to the information collecting server apparatus 2000.

Further, in step S11710, when judging there is the response in the information collecting server apparatus 2000, firstly the process transmits the user ID acquired from the user ID holding section 506 of the IC card 500 to the information collecting server apparatus 2000 (reference to step S11730). Next, the process transmits the position/time information with the digital signature temporarily held in the transmission buffer to the information collecting server apparatus 2000 (reference to step S11740). Upon completion of the transmission, the process disconnects the communication route to the server apparatus 2000. (reference to step S11750).

Although the above description has been made for the case where the information is transmitted to the sever apparatus 2000 in accordance with the preferred embodiment of the present invention with respect to authentication employing apparatus user identification information, if the information is transmitted to the sever apparatus 2000 according to the second preferred embodiment of the present invention with respect to authentication employing user identification information, the process generates the transmission data in the IC card 500 as shown in FIG. 43. Further, if the information condition is transmitted to the sever apparatus 2000 according to the third preferred embodiment of the present invention with respect to authentication employing user identification information, the process generates the transmission data in the IC card 500 as shown in FIG. 44.

Now, the process in the IC card 500 according to the second preferred embodiment of the present invention with respect to the authentication employing the user identification information will be described with reference to the flow chart of FIG. 43.

In other words, firstly the process acquires the position/time information through the interface 505 (reference to step S11910). Next, the CPU 501 transfers the acquired position/time information to the digital signature generating section 509. In the digital signature generating section 509, by using the secret key held in the secret key holding section 508, the process generates a digital signature of the position/time information and attaches the digital signature thereto (reference to step S11920).

Then, the CPU 501 stores the position/time information having the digital signature attached thereto in the position/time information memory 507 (reference to step S11930). Further, the CPU 501 transmits the position/time information having the digital signature to the encryption/decryption section 511. In the encryption/decryption section 511, based on the information of the communication counterpart from the portable phone terminal 10, the process acquires the public key of the server apparatus 2000 from the public key holding section 510, and encrypts the position/time information having the digital signature by means of the acquired public key (reference to step S11940). Then, the process returns the encrypted position/time information having the digital signature attached thereto to the portable phone terminal 10 through the interface 505 (reference to step S11950).

Next, the process in the IC card 500 according to the third preferred embodiment of the present invention with respect to the authentication employing the user identification information will be described with reference to the flow chart of FIG. 44.

In other words, firstly, the process acquires the position/time information through the interface 505 (reference to step S12010). Secondly, the CPU 501 transfers the acquired position/time information to the encryption/decryption section 511. In the encryption/decryption section 511, based on the information of the counterpart who the user wants to inform the position/time information specified by the user, the process acquires the public key of the counterpart who the user wants to inform the position/time information from the public key holding section 510, and encrypts the position/time information having the digital signature by means of the acquired public key (reference to step S12020).

Next, the CPU 501 transfers the encrypted position/time information to the digital signature generating section 509. In the digital signature generating section 509, by using the secret key held in the secret key holding section 508, the process generates a digital signature of the encrypted position/time information so as to attach the digital signature thereto (reference to step S12030).

Next, the CPU 501 stores the encrypted position/time information having the digital signature in the position/time information memory 507 (reference to step S12040). Then, the CPU 501 returns the encrypted position/time information having the digital signature attached thereto to the portable phone terminal 10 through the interface 505 (reference to step S12050).

Although the above description is for the case where the portable phone terminal 10 automatically notifies the server apparatus 2000 of the position/time information at regular time intervals. The portable phone terminal 10 according to the fourth preferred embodiment of the present invention with respect to the authentication employing the user identification information is constituted such that, by means of operating the key input operation section 1100, the user can instructs to inform the position/time information to the server apparatus 2000 at an arbitrary timing. A processing routine for it differs only in that an activation of the transmission to the server apparatus 2000 was a timer period whereas the activation is a key input operational instruction by the user. Thus steps after step S11660 in the flow chart showed in FIG. 42 are entirely the same.

In the thus described fourth preferred embodiment of the present invention with respect to the authentication employing the user identification information, the position/time information is digitally signed by the secret key of the IC card 500, whereby certifying the position/time for each user carrying the IC card 500 and not for each portable phone terminal.

It should be understood that, in the above description of the fourth preferred embodiment of the present invention with respect to the authentication employing the user identification information, although there has been described the usage of installing the IC card in the portable phone terminal as the portable apparatus, taking into account the usage not only of transmitting the position/time information but also of storing in the IC card memory, it may be applied to a PDA having the GPS reception function, a mobile personal computer having the GPS reception function, a digital camera having the GPS reception function, a car navigation system having the GPS function, and a clock having GPS reception function, for example.

In this case, as described above, the GPS reception function may connect to each portable apparatus as an adapter.

Variations of Preferred Embodiments of the Present Invention

It should be understood that, in the above description of FIG. 29, FIG. 33, FIG. 35, FIG. 42, before sending out a calling to the server apparatus 2000, the process instructs the GPS signal reception section 400 to capture the GPS satellite signal, performs the capturing of the electromagnetic wave from not less than four GPS satellites, and ends the calculation of the position/time. However, it is assumed that at the timing of informing the position/time information to the server apparatus 2000 the GPS signal reception section 400 is not in operation and it takes time to perform positioning.

When it is a timing of informing the position/time information to the server apparatus 2000, if the GPS signal reception section 400 is in operation, and the position/time information has been already acquired in the portable phone terminal 10, step S1060 and step S7, step S1460 and step S1470, step S86 and step S1870, step S11660 and step S11670 may not be necessary. Then, in this case, after the process sends out the calling to the server apparatus 2000 and confirms the respond of the server apparatus 2000, the process performs the digital signature for the position/time information already calculated, stores it in the position/time information memory 1180, and transmits it to the server apparatus 20.

Other Preferred Embodiments of the Present Invention

In the above description, it has been described a variety of particular processing examples of the information provision services to which the preferred embodiments of the present invention are applied, but such preferred embodiments of the present invention may be implemented by any appropriate variation, combination or sub-combination of the above described exemplary processes.

In the above description, a GPS (Global Positioning System), which is conventionally used in Japan, is assumed to be a global navigation system, however, other various global navigation systems may be used. Therefore, in the above preferred embodiment of the present inventions, the cases where the GPS satellite are employed as positioning satellites may be applied also to cases where the positioning is carried out by receiving electromagnetic waves from other positioning satellites.

In addition, the present invention is not limited to application to a portable phone. It may include a positioning function by means of the artificial satellite, and may be widely applied to a mobile terminal capable of communicating information with another information processing apparatus through the communication network. An example of such a mobile terminal may be a laptop personal computer, a portable positioning terminal, various PDA apparatuses, and an in-vehicle navigation apparatus. Also, the portable apparatus is not limited to a portable phone terminal, but may apply to a PDA, a mobile personal computer, a digital camera, etc.

Furthermore, the present invention may be applied, for example, to a variety of home-delivery services, logistic systems, and postal mailing systems. In this case, the information terminal apparatus having the GPS function and the network function is provided in each package and mail to be delivered. By inquiring the information terminal apparatus for the current position, it is possible to see the current position of the package or mail accurately.

Accordingly, the present invention is not limited to the above-mentioned preferred embodiments of the present invention and may be applied to other embodiments. It is therefore to be understood to those of ordinary skill in the art that any changes, variations, combinations and sub-combinations may be practiced otherwise than as specifically described herein without departing from the scope and spirit of the present invention.

What is claimed is:

1. An apparatus comprising:
a secret key holding section for holding a secret key for the apparatus;
an identification information holding section for holding identification information of an apparatus or identification information of a user of said apparatus;
a digital signature means for providing a digital signature of a position/time information indicating position and time of reception of a signal received from a positioning satellite, by means of said secret key held in said secret key holding section;
a communication means for transmitting to a communication counterpart said identification information held in said identification information holding section and said position/time information having said digital signature attached thereto, said communication means also receiving position/time information having a digital signature attached thereto from another apparatus transmitting communication data input by another user to the apparatus; and
display means for displaying position information of the another apparatus when the apparatus is receiving the data input by the another user from the another apparatus.

2. The apparatus according to claim 1, further comprising:
a public key holding section for holding a public key of the communication counterpart for notification of said position/time information; and
an encryption means for encrypting said position/time information prior to said digital signature by means of said public key of said communication counterpart.

3. The apparatus according to claim 1, further comprising:
a public key holding section for holding a public key of said communication counterpart; and
an encryption means for encrypting said position/time information having said digital signature attached thereto by means of the public key of said communication counterpart.

4. An apparatus comprising:
a secret key holding section for holding a secret key for the apparatus;
an identification information holding section for holding identification information of an apparatus or identification information of a user of said apparatus;
a digital signature means for providing a digital signature for a position/time information indicating position and time of reception of a signal received from a positioning satellite, by means of said secret key held in said secret key holding section;
a storage means for storing in externally readable form said position/time information having said digital signature attached thereto;
communication means for receiving position/time information having a digital signature attached thereto from another apparatus transmitting communication data input by another user to the apparatus; and
display means for displaying the position information of the another apparatus when the apparatus is receiving the data input by the another user from the another apparatus.

5. The apparatus according to claim 4, further comprising:
a public key holding section for holding a public key of the communication counterpart for notification of said position/time information; and an encryption means for encrypting said position/time information prior to said digital signature by means of said public key of said communication counterpart.

6. The apparatus according to claim 4, further comprising:
a public key holding section for holding a public key of said communication counterpart; and
an encryption means for encrypting said position/time information having said digital signature attached thereto by means of the public key of said communication counterpart.

7. An apparatus comprising:
an IC card mounting section for mounting an IC card;
a means for providing said IC card with position/time information measured based on a signal received from a positioning satellite, the position/time information indicating position and time of reception of said signal; and
a communication means for transmitting to a communication counterpart an IC card user identification information held in said IC card and said position/time information from said IC card, having a digital signature attached thereto, said communication means also receiving position/time information having a digital signature attached thereto from another apparatus transmitting communication data input by another user to the apparatus; and
display means for displaying position information of the another apparatus when the apparatus is receiving the data input by the another user from the another apparatus.

8. The apparatus according to claim 7, wherein:
data having said digital signature attached to said position/time information encrypted is outputted from said IC card by means of a public key of said communication counterpart; and
said communication means transmits said encrypted position/time information having said digital signature attached thereto to said communication counterpart.

9. The apparatus according to claim 7, wherein
said position/time information having said digital signature attached thereto and encrypted by means of the public key of said communication counterpart is outputted from said IC card; and
said communication means transmits said encrypted information from said IC card to said communication counterpart.

10. An apparatus comprising:
an IC card mounting section for mounting an IC card;
a means for providing said IC card with position/time information measured based on a signal received from a positioning satellite, the position/time information indicating position and time of reception of said signal; and
a storage means for storing in externally readable form an IC card user identification information held in said IC card and said position/time information from said IC card, having a digital signature attached thereto;
communication means for receiving position/time information having a digital signature attached thereto from another apparatus transmitting communication data input by another user to the apparatus; and
display means for displaying the position information of the another apparatus when the apparatus is receiving the data input by the another user from the another apparatus.

11. The apparatus according to claim 10, wherein
data having said digital signature attached to said position/time information encrypted is outputted from said IC card by means of the public key of said communication counterpart; and
said encrypted position/time information from said IC card, having said digital signature attached thereto is stored in said storage section.

12. The apparatus according to claim 10, wherein
said position/time information having said digital signature attached thereto and encrypted by means of the public key of said communication counterpart is outputted from said IC card; and
said encrypted information from said IC card is stored in said storage section.

13. The apparatus according to claim 1, wherein the display means displays the location of the another apparatus on a map.

14. The apparatus according to claim 4, wherein the display means displays the location of the another apparatus on a map.

15. The apparatus according to claim 7, wherein the display means displays the location of the another apparatus on a map.

16. The apparatus according to claim 10, wherein the display means displays the location of the another apparatus on a map.

17. An apparatus comprising:
a secret key holding unit configured to hold a secret key for the apparatus;
an identification information holding unit configured to hold identification information of the apparatus or identification information of a user of said apparatus;
a digital signature unit configured to provide a digital signature of a position/time information indicating position and time of reception of a signal received from a positioning satellite by using said secret key held in said secret key holding unit;
a communication unit configured to transmit to a communication counterpart said identification information held in said identification information holding unit and said position/time information having said digital signature attached thereto, said communication unit configured to receive position/time information having a digital signature attached thereto from another apparatus transmitting communication data input by another user to the apparatus; and
a display configured to display the position information of the another apparatus when the apparatus is receiving the data input by the another user from the another apparatus.

18. A method comprising:
storing a secret key for an apparatus;
storing identification information of the apparatus or identification information of a user of the apparatus;
providing, using a processor, a digital signature of a position/time information indicating position and time of reception of a signal received from a positioning satellite by using said secret key;
transmitting to a communication counterpart said identification information and said position/time information having said digital signature attached thereto;
receiving position/time information having a digital signature attached thereto from another apparatus transmitting communication data input by another user to the apparatus; and displaying the position information of the another apparatus when the apparatus is receiving the data input by the another user from the another apparatus.

19. An information communication system comprising:
a first information terminal apparatus including
- a secret key holding unit configured to hold a secret key for the first information terminal apparatus;
- an identification information holding unit configured to hold identification information of the first information terminal apparatus or identification information of a user of said first information terminal apparatus;
- a digital signature unit configured to provide a digital signature of a position/time information indicating position and time of reception of a signal received from a positioning satellite by using said secret key held in said secret key holding unit;
- a communication unit configured to transmit to a second information terminal apparatus said identification information held in said identification information holding unit and said position/time information having said digital signature attached thereto, said communication unit configured to receive position/time information having a digital signature attached thereto from the second information terminal apparatus transmitting communication data input by another user to the first information terminal apparatus; and
- a display configured to display the position information of the second information terminal apparatus when the first information terminal apparatus is receiving the data input by the another user from the second information terminal apparatus; and the second information terminal apparatus includes a communication unit configured to receive said identification information held and said position/time information having said digital signature attached thereto from the first information terminal apparatus, said communication unit configured to send the position/time information having the digital signature attached thereto to the first information terminal apparatus.

20. The apparatus according to claim 17, wherein the display is configured to display the location of the another apparatus on a map along with an indicator identifying the another apparatus.

21. The apparatus according to claim 1, wherein the communication means receives voice data input by the another user from the another apparatus.

* * * * *